(12) United States Patent
Yang et al.

(10) Patent No.: US 12,194,880 B1
(45) Date of Patent: Jan. 14, 2025

(54) RESERVING A CHARGING STATION

(71) Applicant: TOYOTA MOTOR NORTH AMERICA, INC., Plano, TX (US)

(72) Inventors: Christopher E. Yang, Frisco, TX (US); James G. Swartz, Prosper, TX (US); James D. Wilder, Dallas, TX (US)

(73) Assignees: TOYOTA MOTOR NORTH AMERICA, INC., Plano, TX (US); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/430,629

(22) Filed: Feb. 1, 2024

(51) Int. Cl.
- G06Q 10/02 (2012.01)
- B60L 53/66 (2019.01)
- B60L 53/67 (2019.01)
- B60L 53/68 (2019.01)

(52) U.S. Cl.
CPC ............. *B60L 53/665* (2019.02); *B60L 53/67* (2019.02); *B60L 53/68* (2019.02); *G06Q 10/02* (2013.01)

(58) Field of Classification Search
CPC ......... G06Q 10/02; B06L 53/67; B06L 53/60; B06L 53/00
See application file for complete search history.

(56) References Cited

U.S. PATENT DOCUMENTS

| | | | |
|---|---|---|---|
| 9,725,002 B2 | 8/2017 | Hauptenbuchner et al. | |
| 9,770,993 B2 | 9/2017 | Zhao et al. | |
| 9,851,213 B2 | 12/2017 | Oh et al. | |
| 10,220,713 B2 | 3/2019 | Badger et al. | |
| 10,809,085 B2 | 10/2020 | North et al. | |
| 11,524,600 B2 * | 12/2022 | Treadway | B60L 53/62 |
| 11,748,788 B2 | 9/2023 | Khoo et al. | |
| 2011/0025267 A1 * | 2/2011 | Kamen | B60L 53/665 |
| | | | 320/109 |
| 2012/0233077 A1 | 9/2012 | Tate, Jr. et al. | |
| 2014/0312839 A1 | 10/2014 | Uyeki | |
| 2015/0298565 A1 * | 10/2015 | Iwamura | G06Q 10/04 |
| | | | 701/22 |
| 2016/0352113 A1 | 12/2016 | Zhao et al. | |
| 2019/0070970 A1 * | 3/2019 | Chan | B60L 53/65 |
| 2019/0351783 A1 * | 11/2019 | Goei | B60L 53/63 |
| 2020/0353836 A1 | 11/2020 | Imberger | |
| 2021/0065073 A1 | 3/2021 | Maeda et al. | |
| 2021/0086651 A1 * | 3/2021 | Maeda | B60L 53/66 |
| 2022/0012647 A1 | 1/2022 | Lee et al. | |
| 2022/0172129 A1 * | 6/2022 | Hou | G06Q 10/02 |

(Continued)

FOREIGN PATENT DOCUMENTS

WO WO-2023049998 A1 * 4/2023 ............. B60L 53/63

OTHER PUBLICATIONS

Boosting the Productivity of Charging Stations with Go To-U: A New Level of EV Charging, https://go-tou.com/en/news/boosting-the-productivity-of-charging-stations-with-gotou, Oct. 10, 2023. (Year: 2023).*

(Continued)

*Primary Examiner* — Maria C Santos-Diaz

(57) ABSTRACT

An example operation includes one or more of reserving an available charging point at a charging station for a vehicle at an arrival time at the charging station when one other charging point at the charging station will be available for one other vehicle in a time less than a threshold time after the arrival time.

18 Claims, 26 Drawing Sheets

(56) References Cited

U.S. PATENT DOCUMENTS

| | | | |
|---|---|---|---|
| 2022/0176842 A1 | 6/2022 | Cun et al. | |
| 2022/0305948 A1* | 9/2022 | Munemoto | B60L 53/68 |
| 2022/0344957 A1 | 10/2022 | Fergadiotou et al. | |
| 2023/0152111 A1* | 5/2023 | Maeda | G01C 21/3476 |
| | | | 701/423 |
| 2023/0266138 A1* | 8/2023 | Yang | G01C 21/3469 |
| | | | 701/423 |
| 2023/0294546 A1* | 9/2023 | Takahashi | H02J 7/0071 |
| | | | 320/109 |
| 2024/0034184 A1* | 2/2024 | Al Gafri | B60L 53/305 |
| 2024/0157837 A1* | 5/2024 | Lee | B60L 53/67 |

OTHER PUBLICATIONS

How to Charge an EV Using the Go To-U App, https://go-tou.com/en/news/how-to-charge-an-ev-using-the-gotou-app, May 19, 2023 (Year: 2023).*

Andrenacci, N., Caputo, G., & Balog, I. (2023). Comparing charging management strategies for a charging station in a parking area in north italy. Future Transportation, 3(2), 684. doi:http://dx.doi.org/10.3390/futuretransp3020040 (Year: 2023).*

Lambert, A new app for Tesla Superchargers allows you to check-in and hopes to provide near-real-time status for available stalls, Dec. 31, 2015, https://electrek.co/2015/12/31/a-new-app-for-tesla-superchargers-allows-you-to-check-in-and-hopes-to-provide-near-real-time-status-for-available-stalls/.

* cited by examiner

RESERVING A CHARGING STATION

BACKGROUND

Vehicles or transports, such as cars, motorcycles, trucks, planes, trains, etc., generally provide transportation needs to occupants and/or goods in a variety of ways. Functions related to vehicles may be identified and utilized by various computing devices, such as a smartphone or a computer located on and/or off the vehicle.

SUMMARY

One example embodiment provides a method that includes one or more of reserving an available charging point at a charging station for a vehicle at an arrival time at the charging station when one other charging point at the charging station will be available for one other vehicle in a time less than a threshold time after the arrival time.

Another example embodiment provides a system that includes a memory communicably coupled to a processor, wherein the processor one or more of reserves an available charging point at a charging station for a vehicle at an arrival time at the charging station when one other charging point at the charging station will be available for one other vehicle in a time less than a threshold time after the arrival time.

A further example embodiment provides a computer readable storage medium comprising instructions, that when read by a processor, cause the processor to perform one or more of reserving an available charging point at a charging station for a vehicle at an arrival time at the charging station when one other charging point at the charging station will be available for one other vehicle in a time less than a threshold time after the arrival time.

DETAILED DESCRIPTION

Figure 1A:
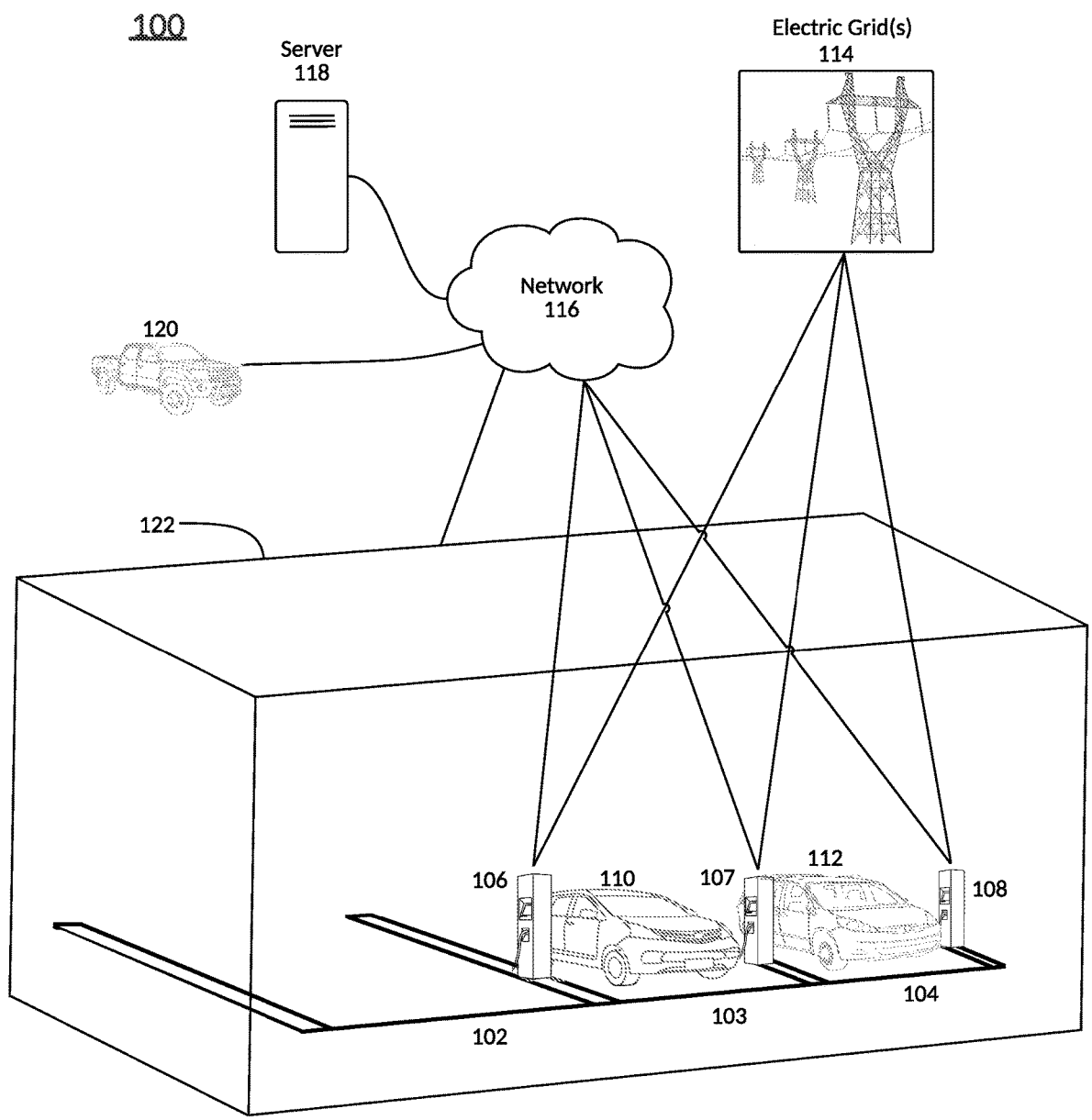
FIG. 1A illustrates an example network diagram, according to example embodiments.

It will be readily understood that the instant components, as generally described and illustrated in the figures herein, may be arranged and designed in a wide variety of different configurations. Thus, the following detailed description of the embodiments of at least one of a method, apparatus, computer readable storage medium and system, as represented in the attached figures, is not intended to limit the scope of the application as claimed but is merely representative of selected embodiments. Multiple embodiments depicted herein are not intended to limit the scope of the solution. The computer-readable storage medium may be a non-transitory computer readable media or a non-transitory computer readable storage medium.

Communications between the vehicle(s) and certain entities, such as remote servers, other vehicles, and local computing devices (e.g., smartphones, personal computers, vehicle-embedded computers, etc.) may be sent and/or received and processed by one or more 'components' which may be hardware, firmware, software, or a combination thereof. The components may be part of any of these entities or computing devices or certain other computing devices. In one example, consensus decisions related to blockchain transactions may be performed by one or more computing devices or components (which may be any element described and/or depicted herein) associated with the vehicle(s) and one or more of the components outside or at a remote location from the vehicle(s).

The instant features, structures, or characteristics described in this specification may be combined in any suitable manner in one or more embodiments. For example, the usage of the phrases "example embodiments," "some embodiments," or other similar language throughout this specification refers to the fact that a particular feature, structure, or characteristic described in connection with the embodiment may be included in at least one example. Thus, appearances of the phrases "example embodiments," "in some embodiments," "in other embodiments," or other similar language throughout this specification can all refer to the same embodiment. Thus, these embodiments may work in conjunction with any of the other embodiments, may not be functionally separate, and the described features, structures, or characteristics may be combined in any suitable manner in one or more embodiments. Although described in a particular manner by example only, more feature(s), element(s), and step(s) described herein may be utilized together and in various combinations, without exclusivity, unless expressly indicated otherwise herein. In the diagrams, any connection between elements can permit one-way and/or two-way communication, even if the depicted connection is a one-way or two-way arrow. In the current solution, a vehicle may include one or more of cars, trucks, Internal Combustion Engine (ICE) vehicles, battery electric vehicle (BEV), e-Palettes, fuel cell bus, motorcycles, scooters, bicycles, boats, recreational vehicles, planes, drones, Unmanned Aerial Vehicle (UAV) and any object that may be used to transport people and or goods from one location to another.

In addition, while the term "message" may have been used in the description of embodiments, other types of network data, such as, a packet, frame, datagram, etc. may also be used. Furthermore, while certain types of messages and signaling may be depicted in exemplary embodiments they are not limited to a certain type of message and signaling.

Example embodiments provide methods, systems, components, non-transitory computer readable media, devices, and/or networks, which provide at least one of a transport (also referred to as a vehicle or car herein), a data collection system, a data monitoring system, a verification system, an authorization system, and a vehicle data distribution system. The vehicle status condition data received in the form of communication messages, such as wireless data network communications and/or wired communication messages, may be processed to identify vehicle status conditions and provide feedback on the condition and/or changes of a vehicle. In one example, a user profile may be applied to a particular vehicle to authorize a current vehicle event, service stops at service stations, to authorize subsequent vehicle rental services, and enable vehicle-to-vehicle communications.

Within the communication infrastructure, a decentralized database is a distributed storage system which includes multiple nodes that communicate with each other. A blockchain is an example of a decentralized database, which includes an append-only immutable data structure (i.e., a distributed ledger) capable of maintaining records between untrusted parties. The untrusted parties are referred to herein as peers, nodes, or peer nodes. Each peer maintains a copy of the database records, and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In public or permissionless blockchains, anyone can participate without a specific identity. Public blockchains can involve cryptocurrencies and use consensus-based on various protocols such as proof of work (PoW). Conversely, a permissioned blockchain database can secure interactions among a group of entities, which share a common goal, but which do not or cannot fully trust one another, such as businesses that exchange funds, goods, information, and the like. The instant solution can function in a permissioned and/or a permissionless blockchain setting.

Smart contracts are trusted distributed applications which leverage tamper-proof properties of the shared or distributed ledger (which may be in the form of a blockchain) and an underlying agreement between member nodes, which is referred to as an endorsement or endorsement policy. In general, blockchain entries are "endorsed" before being committed to the blockchain while entries, which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol produces an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node, which submits an entry-invocation to an endorser (e.g., peer), and broadcasts entry proposals to an ordering service (e.g., ordering node). Another type of node is a peer node, which can receive client submitted entries, commit the entries and maintain a state and a copy of the ledger of blockchain entries. Peers can also have the role of an endorser. An ordering-service-node or orderer is a node running the communication service for all nodes and which implements a delivery guarantee, such as a broadcast to each of the peer nodes in the system when committing entries and modifying a world state of the blockchain. The world state can constitute the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which stores an immutable, sequenced record in blocks. The ledger also includes a state database, which maintains a current state of the blockchain. There is typically one ledger per channel. Each peer node maintains a copy of the ledger for each channel of which they are a member.

A chain is an entry log structured as hash-linked blocks, and each block contains a sequence of N entries where N is equal to or greater than one. The block header includes a hash of the blocks' entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Since the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log and can therefore be regenerated from the chain at any time. The state database may automatically be recovered (or generated if needed) upon peer node startup and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a service to a particular vehicle and/or a user profile that is applied to the vehicle. For example, a user may be the owner of a vehicle or the operator of a vehicle owned by another party. The vehicle may require service at certain intervals, and the service needs may require authorization before permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more vehicle and/or road sensors or cameras, which report sensed data to a central controller computer device in and/or apart from the vehicle. This data is forwarded to a management server for review and action. A sensor may be located on one or more of the interior of the vehicle, the exterior of the vehicle, on a fixed object apart from the vehicle, and on another vehicle proximate the vehicle. The sensor may also be associated with the vehicle's speed, the vehicle's braking, the vehicle's acceleration, fuel levels, service needs, the gear-shifting of the vehicle, the vehicle's steering, and the like. A sensor, as described herein, may also be a device, such as a wireless device in and/or proximate to the vehicle. Also, sensor information may be used to identify whether the vehicle is operating safely and whether an occupant has engaged in any unexpected vehicle conditions, such as during a vehicle access and/or utilization period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., owner, user, company, agency, etc.) may want to limit the exposure of private information, and therefore the blockchain and its immutability can be used to manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a consensus approach associated with the blockchain. Such an approach could not be implemented on a traditional centralized database.

Various driving systems of the instant solution can utilize software, an array of sensors as well as machine learning functionality, light detection and ranging (Lidar) projectors, radar, ultrasonic sensors, etc. to create a map of terrain and road that a vehicle can use for navigation and other purposes. In some embodiments, GPS, maps, cameras, sensors, and the like can also be used in autonomous vehicles in place of Lidar.

The instant solution includes, in certain embodiments, authorizing a vehicle for service via an automated and quick authentication scheme. For example, driving up to a charging station or fuel pump may be performed by a vehicle operator or an autonomous vehicle and the authorization to receive charge or fuel may be performed without any delays provided the authorization is received by the service and/or charging station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the vehicle and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record. A blockchain may be used for storing vehicle-related data and transactions.

Any of the actions described herein may be performed by one or more processors (such as a microprocessor, a sensor, an Electronic Control Unit (ECU), a head unit, and the like), with or without memory, which may be located on-board the vehicle and/or off-board the vehicle (such as a server, computer, mobile/wireless device, etc.). The one or more processors may communicate with other memory and/or other processors on-board or off-board other vehicles to utilize data being sent by and/or to the vehicle. The one or more processors and the other processors can send data, receive data, and utilize this data to perform one or more of the actions described or depicted herein.

In one embodiment, the charging point status at a charging station is monitored. The monitoring allows the system to be aware of vehicles at the charging station, which charging bay the vehicles occupy, their current charge, a desired charge, and the like. The system, aware of vehicles approaching the charging station, may calculate the time of arrival at the charging station and reserve a charging point for the arriving vehicle. The system's reservation of the charging bay may depend on factors such as how many bays are occupied, how many bays are predicted to be occupied, a length of time that the occupied vehicles will remain, etc. In one example, the reservation of the charging bay will occur only when another charging bay becomes available at a time that is less than a threshold. When the analysis reveals that another charging point will become available for another vehicle within a time shorter than the threshold after the calculated arrival time, the system proceeds to reserve the initially determined charging point at the charging station for the arriving vehicle. The system leverages real-time data to manage and allocate charging points at EV charging stations actively. Reserving a charging point when it's about to become available for another vehicle ensures that EV owners experience minimal waiting times and that charging stations are used efficiently.

FIG. 1A illustrates an example network diagram 100 managing the reservation of electric charging bays, according to embodiments. The network includes charging bays 102-104 of a charging station 122, charging points 106-108, vehicles at the charging bay 110, and 112, an energy provider 114, a network 116, a server 118, and an incoming vehicle 120. A processor in the vehicles, referred to as the vehicle processor, may include one or more of a navigation processor, a communication processor, a head unit processor, an electronic control unit (ECU), a sensor processor, and/or a combination of processors. The vehicle processor may communicate over wireless communication media, such as Wi-Fi, Bluetooth, cellular, dedicated short-range communication (DSRC) service, cellular V2X (C-V2X), or the like. The vehicle processor may be communicatively coupled to an occupant device associated with an occupant of the vehicle and the server 118 through network 116.

The network 116 may be a series of connected computers where communication may occur between nodes, such as processors in the charging station 122, processors in the charging points 106-108, vehicles 110, 112, 120, the server 118, and any other computer/processor in the system. In some embodiments, the network may be called the cloud or Internet.

Processors in vehicles 110, 112, and 120 may include a central vehicle processor, such as an Electronic Control Module (ECM). It may be communicably coupled to one or more other vehicle processors, including one or more processors associated with performing methods of the present application. Vehicle processors may also be communicably coupled to the processor(s) of other vehicles, servers, and the like. In one embodiment, a vehicle processor may transmit and receive messages through wireless communications interfaces to and from the alternate destination processor, such as a processor in the server, another vehicle, and/or occupant device(s) (not shown). In another embodiment, a vehicle processor may transmit and receive messages through wired communications interfaces (e.g., through a wired communication interface associated with a charging point connected to the vehicle, through a wired charging interface such as a universal serial bus (USB) connection for an occupant device, and the like) to and from another vehicle and/or other processors. Vehicle processors may have one or more associated memory devices for storing applications and data. They can be interconnected by various wired or wireless communications pathways, such as a Controller Area Network (CAN) bus or different wireless technologies known in the art.

The instant solution may entirely or partially execute on one or more of the processors in any of the vehicles, a processor residing onboard or off-board the vehicle, such as server 118, a device associated with the vehicle (such as a mobile device associated with an occupant of the vehicle), processors in the charging points 106-108, a processor associated with the charging station, or any other processor associated with a vehicle. The memory utilized by the one or more processors may likewise be located onboard or off-board the vehicle. The vehicle's processor may be an Electronic Control Module (ECM) or another processor, such as an ECU, the Head Unit (HU) processor, or another processor in the vehicle.

Server 118 may include one or more computers communicatively coupled to vehicles 110, 112, and 120, which may occur through network 116 and processors in charging station 122 and/or charging points 106-108. The server may include one or more processors and memory devices for storing applications and data. In one embodiment, the server may be associated with a vehicle manufacturer, including a repair facility, a sales facility, an entertainment establishment, and the like. In one embodiment, the server may be in the network or cloud and/or in or connected to a vehicle charging station.

Referring to FIG. 1A, there are three charging bays 102, 103, and 104, at charging station 122, and one of them 102 is currently unoccupied; the instant solution performs functionality to manage the allocation of the bays. The occupancy status of each of the charging bays is monitored. This monitoring may be through a bay sensor indicating if a vehicle is parked there. When an electric vehicle (EV) 120 approaches charging station 122, the expected arrival time of the EV at the station is determined. This calculation considers the vehicle's current location, speed, and estimated travel time to the charging station, as received by sensors and/or processors. As the EV's calculated arrival time approaches, the occupancy status of the charging bays is determined again. In this case, it recognizes that one bay is currently available (unoccupied), and two bays may or may not be available. The system decides to reserve the available bay for the arriving EV just before its estimated arrival time. This proactive reservation may ensure the EV owner has a charging bay ready as they arrive, minimizing waiting time. Simultaneously, the system monitors the other two bays and their potential availability. When one of the two potentially occupied bays becomes available (e.g., a vehicle finishes charging and leaves), the system may adjust the bay allocation. It may release the initial reservation and reserve the newly available bay if doing so aligns with the calculated arrival times of other EVs. The system operates to maximize the efficiency of charging bay allocation at the charging station while minimizing waiting times. It ensures that EV owners are provided with an available bay as soon as they arrive (if available) while continuously monitoring and adapting to the changing status of the charging bays, such as "I am running a few minutes late; my previous meeting has been extended".

In one embodiment, the system determines the availability of charging points, including using sensors at each bay or monitoring the status of charging points through the network 116. Each charging bay 102, 103, and 104 has a sensor to detect whether a vehicle occupies a bay. When a vehicle arrives and parks at a charging bay, the sensor detects the vehicle's presence and sends a signal indicating that the bay is occupied. The status of each charging bay, whether occupied or not, is monitored through the network, a series of connected computers that facilitate communication between various nodes. The processors in the charging points 106-108 are connected to this network and can communicate the charging status (e.g., charging, fully charged, fault, etc.) to the server 118. The server, which includes one or more processors and memory devices, receives data from the sensors at the charging bays and the processors in the charging points. It processes this data to determine the status of each bay (occupied/unoccupied, charging/not charging, etc.). Vehicles approaching the charging station (e.g., incoming vehicle 120) have onboard processors (ECMs) that can communicate wirelessly with server 118 through network 116. The vehicle processor can transmit a message to the server requesting a charging bay reservation. This message might include the vehicle's state of charge, desired charge level, and estimated arrival time. Upon receiving a request from an approaching vehicle, the server analyzes the charging bays' current and predicted availability. If a charging point is predicted to become available within a certain threshold of the vehicle's arrival, the server sends a reservation confirmation message to the vehicle processor.

In one embodiment, the system continuously monitors the status of all bays and dynamically updates reservations based on real-time data. If a vehicle leaves a bay earlier than expected or becomes unavailable due to a fault, the server can reallocate reservations and send updated messages to the affected vehicles.

In one embodiment, the system enables the reservation of a charging point at the anticipated arrival time of vehicle 120, contingent upon the availability of another charging point within a set threshold time. The solution utilizes an integrated system of sensors, networked communication, and predictive analytics, all orchestrated by a server 118. The system initially involves sensors at each charging bay 102-104 to detect occupancy and relay this information in real-time to the server through network 116. Charging points 106-108 report the status of ongoing charging sessions to server 118, including expected completion times. En route to the charging station equipped with processors, vehicles 120 communicate their estimated time of arrival (ETA) and charging requirements via wireless networks to the server through network 116.

Upon receiving an ETA from an approaching vehicle 120, server 118 calculates the availability of charging points 106-108, considering current usage, expected departure times of the vehicles currently charging 110-112, and the incoming vehicle's requirements. Suppose the server predicts that a charging point will free up shortly before or after the vehicle arrives within a predefined threshold. In that case, it will send a reservation message to its processor.

The predefined threshold within the management system may be implemented as a configurable parameter in the server's software. This threshold is the maximum time the system allows between a vehicle's 120 arrival and the availability of a charging point 106-108. When setting up the system, operators may define this threshold based on various considerations, such as average wait times, peak usage patterns, and customer service standards, determined by examining historical data that may be stored in a database. The server, equipped with the logic to handle reservations, incorporates this threshold into its decision-making functionality. As the server receives real-time data from the sensors about bay occupancy and from the charging points about the progress of charging sessions, it also calculates the expected time for each bay to become available. When a vehicle communicates its ETA, the server compares the expected vacancy times of the bays with the vehicle's ETA. If a bay is expected to become available within the predefined threshold time after the vehicle's ETA, the server will proceed to reserve this bay for the arriving vehicle. The server updates these calculations, ensuring the charging point reservations are dynamically adjusted to meet the threshold criteria.

The reservation message sent to the vehicle's 120 processor would confirm the charging bay reservation timed to coincide closely with the vehicle's arrival. For example, if a vehicle reports an ETA of 15 minutes and server 118 predicts that a charging point will become available in 10 minutes, the server will reserve this charging point for the incoming vehicle, given that the availability falls within an acceptable threshold time, such as 5 minutes. The server sends a confirmation message: "Charging Point Reservation: Bay 103, Expected Availability: 10 minutes, aligned with your ETA."

In one embodiment, determining the characteristics of the vehicle's 120 battery is a multi-faceted approach involving both the vehicle's onboard diagnostic systems and the server's 118 data processing capabilities. The vehicle's battery management system (BMS) continuously monitors the battery's health state, including charge cycles, age, temperature, and composition data. When vehicle 120 approaches charging station 122 or before departure towards one, the BMS collects the battery's health data and transmits it to the vehicle's 120 processor (ECM). This data may be sent over wireless communication networks 116 to the server. Upon receiving the battery's health data, the server processes it to understand its capacity and tolerance for various charging speeds. The system can select an appropriate charging point 106-108 depending on analyzing this battery data. For example, a battery with a high number of charge cycles or an older one may not tolerate fast charging well, which may further degrade its capacity. Conversely, a newer battery or one with fewer charge cycles may be able to handle faster charging speeds without adverse effects. The server, therefore, utilizes this information to match vehicle 120 with a charging point 106-108, offering a quickest possible charge within the safe charging parameters for that specific battery. The server might also consider the battery's temperature in one embodiment, as charging efficiency and safety can be temperature dependent. For example, a battery at a higher temperature might be at risk of overheating if charged too quickly, so the server would select a charging point 106-108 that provides a slower, more controlled charge to avoid damage. The battery's composition, such as lithium-ion, nickel-metal hydride, or lead-acid, also plays a role in determining the appropriate charging rate, as different materials have different optimal charging conditions and tolerances. The server, therefore, balances the need for a quick charge with the necessity of maintaining the health and longevity of the battery. It selects the charging station 122 and allocates the charging point 106-108 that best suit the vehicle's 120 battery characteristics, ensuring the battery is time-efficient and conducive to its long-term performance and durability.

In one embodiment, the instant solution includes a decision-making process that selects the optimal charging point 106-108 for vehicle 120 based on various parameters, including the estimated time to charge, the charging rate of each charging point, and the vehicle's current and desired battery charge levels. The vehicle's 120 onboard battery management system (BMS) assesses the current state of charge (SoC). It communicates this data and the desired SoC to the main vehicle processor, sending it to server 118 through the network 116. This initial data exchange may occur as the vehicle is en route to the station, leveraging wireless communication networks to facilitate information transfer. Upon receiving the vehicle's battery information, the server analyzes the data. It may query the charging points 106-108 to determine their status and charging rates. Each charging point may have a different maximum charging rate depending on its design and available power supply. The server stores data on the charging rates of each charging point and availability in its memory.

The instant solution computes the estimated time to charge for each available charging point. This computation involves calculating how long it would take for each charging point to raise the vehicle's battery from its current SoC to the desired SoC. The calculation considers the charging efficiency, which may vary with the battery's temperature and health, and the charging point's maximum rate. Server 118 applies decision-making logic to select the charging point. The selection criteria prioritize minimizing the total time vehicle 120 spends at the station, including the waiting time for a charging point to become available and the charging time itself. The server may assign weights to different factors, such as the proximity of the vehicle's arrival, the charging point's availability, and the estimated charging duration.

The server also considers real-time data on the charging station's overall occupancy and may predict the upcoming availability of charging points based on the charging sessions in progress. If the predicted wait time for an optimal charging point is less than the wait time for a suboptimal point that is available, the server may reserve the optimal point for the vehicle. The server 118 communicates the selection to the vehicle 120. The message may include the designated charging point number, the expected waiting time (if any), and the estimated charging duration. For example, the vehicle's 120 BMS may prepare for charging, including preconditioning the battery to the ideal temperature for charging.

In one embodiment, the instant solution employs predictive models to forecast the arrival times of vehicles at the charging station with a degree of precision necessary to optimize charging point allocation. These predictive models synthesize a variety of data inputs, including time of day, historical usage patterns of the charging station, real-time and historical vehicle telemetry, and typical charging behaviors and patterns. Other computers may obtain data in the predictive models communicatively coupled to server 118, such as computers and/or servers containing historical charging data from the charging station 122 and/or other charging stations with a same or similar configuration, location, throughput, etc. The time of day is a significant factor as it often correlates with predictable traffic patterns and charging station usage—for example, peak times such as morning or evening commutes or lunch hours. The historical data component of the functionality analyzes past trends in station usage, identifying times when the station is most likely to experience high demand. This analysis can be granular, considering specific days of the week or seasonal variations. Vehicle telemetry is another critical input; data such as location, speed, and direction of travel are transmitted by the vehicles to the server. This information allows the instant solution to calculate estimated arrival times by considering current traffic conditions and potential delays. The instant solution considers individual vehicle charging patterns, which may be derived from historical charging session data. For example, certain vehicles might have a pattern of charging at specific times or for particular durations, and this behavior can be factored into the predictions. The predictive models combine these diverse data sets using advanced statistical methods and/or machine learning functionality to create accurate predictions. They can adjust predictions in real time as new data comes in, improving the algorithm's accuracy and the efficiency of the charging station's operations. For example, if the model predicts a rush of vehicles arriving soon based on the time of day and real-time telemetry, it can preemptively suggest adjustments to charging point allocations to accommodate the influx and/or modify the threshold accordingly.

In one embodiment, the instant solution intelligently modulates the threshold time for charging point reservation based on the availability of subsequent charging stations along the vehicle's 120 intended route and the travel time to these stations. The system, aware of the vehicle's location and trajectory, first calculates the time it would take to reach the next charging station if the current one cannot serve it immediately. If the system predicts that a charging bay will become available at the current station 122 within a certain time that is less than the time it would take for the vehicle to travel to the next station, it will then increase the threshold time marginally to accommodate the vehicle at the current station. This increment is by a first amount of time and is deliberately kept shorter than the second amount required for the vehicle to reach an alternative charging station. This decision is based on a trade-off between the waiting time for a bay 102-104 to become available and the travel time to another station to minimize the vehicle's total time spent traveling or waiting.

For example, if the next charging station is 30 minutes away, and a charging bay is likely to become available in the next 20 minutes, the system might increase the threshold slightly, e.g., by 5 or 10 minutes, rather than directing the vehicle to the next station, allowing the vehicle to charge at the current station with a minimal wait, promoting convenience and efficiency.

The system's predictive algorithms consider real-time data, historical patterns, the current state of the network, and possibly the driver's charging preferences to make this decision.

In one embodiment, the instant solution determines the optimal threshold time for reserving a charging point for an EV. The threshold is configured to be less than the time it would take for the EV to travel from its current location to connect to the next available charging point on its route, which may be at the same charging station or an alternative one. This calculation serves to minimize the EV's downtime by avoiding unnecessary travel to another charging station if a charging point is expected to become available at the current station within a reasonable waiting period.

The system first determines the time required for the EV to travel to the next available charging point to calculate the appropriate threshold. This involves analyzing real-time traffic data, the EV's current speed, the distance to the next station, and predictive models that consider typical traffic patterns for the time of day or day of the week. The system also assesses the real-time status of charging points at the current and subsequent charging stations along the EV's route, including the expected time for currently occupied charging points to become available.

Once the system has these calculations, it sets the threshold time. For example, suppose the time to travel to the next station and connect to a charging point is 30 minutes. In that case, the system might set the reservation threshold at the current station to 20 minutes, meaning that if a charging point is expected to become available within 20 minutes at the current station, the EV will be directed to wait. However, if the wait time exceeds this threshold, and it would be quicker to travel to the next station, the system would advise the EV to proceed to the next charging point on its route. This strategic threshold setting ensures efficient use of both the EV's and the charging station's time, optimizing the charging network's throughput and reducing the overall time the EV spends charging or waiting to charge.

In one embodiment, the system enhances the efficiency of charging point allocation by considering the activity and location of the occupants of a vehicle currently occupying a charging point. The system integrates location-based services, personal schedules of the occupants, and vehicle-to-infrastructure communication technologies. The system leverages the occupants' connected mobile devices, sensors (e.g., cameras), or the vehicle's infotainment system to gain insights into their location and activities. For example, if the occupants have a calendar event nearby, the system can infer the likely duration the vehicle will occupy the charging point. The integration of location-based services allows the system to track the distance of the occupants from the vehicle. The system predicts a longer charging session when the occupants move away from the vehicle, especially with calendar events (like a movie showing or a scheduled meeting). Vehicle 120 may communicate with the charging infrastructure using vehicle-to-infrastructure (V2I) communication, allowing the charging station 122 to receive direct updates from the vehicle regarding the charging session's progress, which may be linked to the onboard occupancy sensing systems that detect if the vehicle has been vacated. The onboard occupancy sensing system may use sensors such as weight detection in seats, cameras, and the like to determine an occupancy status in the vehicle's cabin, allowing the system to make more informed predictions about the availability of the charging point. Suppose the occupants are detected to be engaged in an activity away from the vehicle, which suggests a longer time. In that case, the system may then adjust the availability status of that charging point to reflect a longer occupation period. Consequently, this data influences the reservation system for incoming vehicles, allowing it to dynamically adjust the threshold for reserving charging points based on the predicted availability, which is now informed by the activities and location of the occupants of the currently charging vehicles.

Figure 1B:
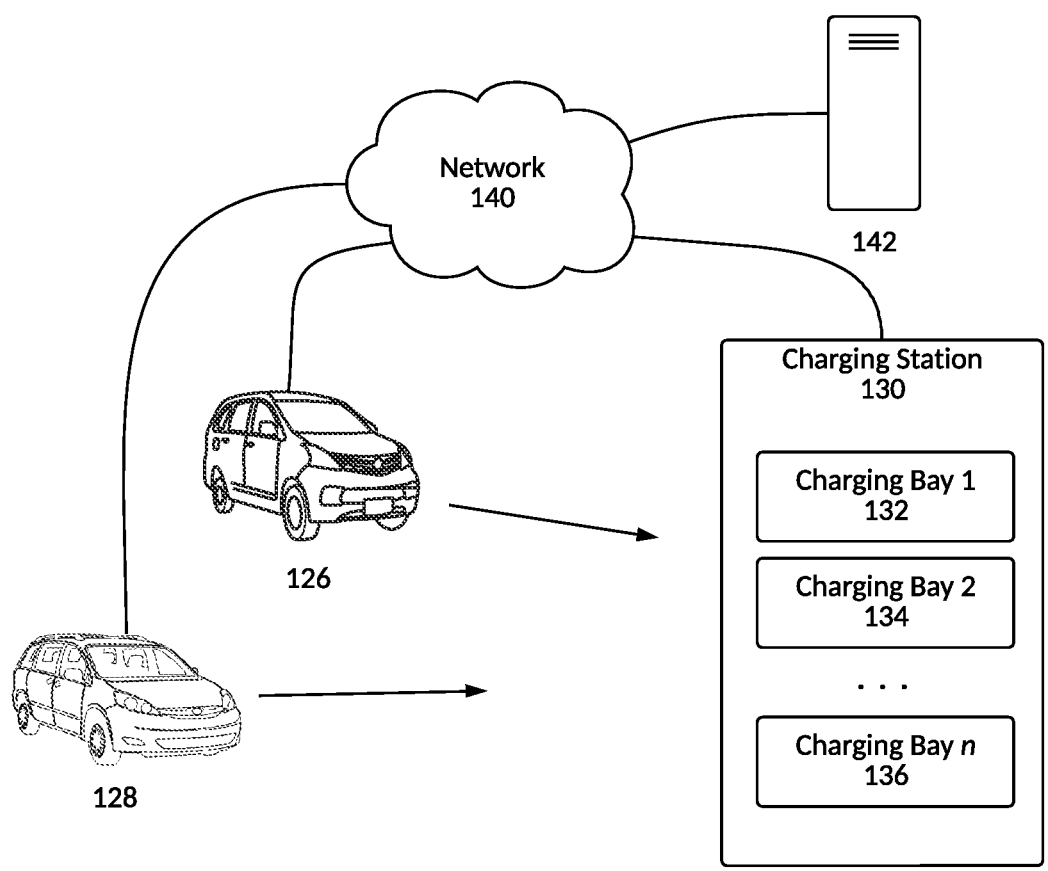
FIG. 1B illustrates a further network diagram, according to example embodiments.

FIG. 1B illustrates another example network diagram 125 of managing the reservation of electric charging bays, according to embodiments. There are n charging bays 132-136 at charging station 130. A server 142 is connected to the charging station 130 and two vehicles 126-128 heading towards the charging station 130. This connection may be a communicative coupling, such as through a network 140 (which may be a similar network as described in network 116, FIG. 1A). The system monitors the occupancy status of all charging bays 132-136 at charging station 130. The system determines the expected arrival times for both vehicle 126 and vehicle 128 independently. These determinations are based on the current locations of the vehicles, their speeds, and the estimated travel times to the station. As the determined arrival time for vehicle 126 approaches, the system assesses the charging bays' 132-136 status. It might find that some bays are occupied and others are unoccupied. If unoccupied bays exist, the system reserves one for vehicle 126 before its estimated arrival time, ensuring that vehicle 126 has a bay ready when it arrives, minimizing wait times. As the determined arrival time for vehicle 128 approaches, the system evaluates the status of the charging bays 132-136 again. It might be found that some bays are still occupied while others have become available due to vehicles finishing their charging sessions. The system reserves a bay for vehicle 128 before its estimated arrival time.

In one embodiment, when reserved charging bays remain unoccupied for a certain period after the vehicles have charged and left the station, the system may release these charging bays for future use. The system continually adjusts bay allocation based on incoming vehicles, bay availability, and predicted and actual departure times. In case both vehicle 126 and vehicle 128 arrive simultaneously at charging station 130, the system may assess the status of the charging bays and allocate the available bays based on priority, predefined rules, or other factors. For example, it may prioritize allocating a bay to the vehicle with a lower battery charge.

The system continuously monitors the charging bays and adjusts them in real-time based on vehicle arrivals and departures.

Fast charging of a vehicle may degrade a vehicle battery faster than charging the vehicle at a slower rate. Newer batteries may be able to support this, but batteries with characteristics that differ from a new battery may be adversely affected by fast charging.

In one embodiment, the selected charging point does not degrade the battery greater than a threshold, based on characteristics of the battery, where the characteristics include one or more of a number of spent cycles, the age of the battery, the temperature of the battery, or the composition of the battery. The instant solution, executing on a processor in the vehicle, communicates with a battery management system to obtain the characteristics of the battery. The instant solution may choose a lower energy transfer rate for those batteries based on the determined characteristics of the battery.

In one embodiment, server 142 plays a crucial role in gathering and analyzing data to implement the instant solution. This data includes station occupancy, vehicle arrival rates, local grid demand, and historical usage patterns. The server, equipped with advanced analytics and machine learning capabilities, processes this data to predict peak and off-peak periods, essential for setting the pricing strategy. A dynamic pricing algorithm adjusts charging rates in response to real-time data. It considers station occupancy levels, time of day, and energy prices from the local grid. Personalized pricing plans may be derived from individual user profiles and charging habits. The server updates charging points at charging bays 132, 134, 136 and user interfaces with the latest pricing information. This may include digital displays at charging stations 130, the station's mobile app, and notifications sent directly to registered users. Vehicles 126, 128 approaching the station receive real-time pricing updates through their smart communication systems, allowing drivers to make informed decisions about charging. User interaction is facilitated through a dedicated application or in-car infotainment systems, where users can view current prices, receive notifications about optimal charging times, and make reservations. The system also collects user feedback to refine the pricing model and personalize offers. The server calculates the cost of each charging session based on the dynamic pricing rate at the time of charging and may process payments automatically. Users receive detailed billing information, including the pricing rate applied and the amount of energy consumed, through digital means.

In one embodiment, the system includes renewable energy sources like solar panels or wind turbines connected to the charging station 130. These sources are managed by an advanced Energy Management System (EMS), which monitors and assesses the availability of renewable energy for charging EVs. The EMS may be located at charging station 130 or remote to the charging station, where it may reside on server 142 or a connected server communicatively coupled to the server through network 140. The EMS dynamically allocates this energy to the charging points at charging bays 132, 134, and 136, sending messages to adjust the power supply based on current availability and demand. The system's integration with the local smart grid enables two-way communication, allowing the EMS to receive real-time data on grid demand, energy prices, and grid health. This integration is crucial for managing surplus energy; when renewable sources generate more electricity than required for charging, the excess is supplied back to the grid, with the EMS informing grid operators of the available surplus. The system may actively participate in demand response strategies. During peak grid demand times, the EMS can reduce the charging station's draw from the grid by lowering charging rates or temporarily switching to stored renewable energy, thereby minimizing strain on the grid. Users receive notifications about optimal charging times through the charging station's 130 application or in-vehicle systems, aligning with high renewable energy availability or low grid demand. They can also schedule charging sessions to coincide with these optimal periods, with the system confirming scheduled times and providing updates on the energy source used. The billing system of this embodiment is designed to reflect the energy source used for each charging session. Users may earn renewable energy credits or rewards for charging during periods of high renewable energy availability.

In one embodiment, the EV charging station management system is enhanced with Vehicle-to-Grid (V2G) technology, enabling EVs 126, 128 to contribute to grid stability by supplying energy back to the grid. The EMS monitors and manages the energy flow between the grid, the charging station, and connected EVs. V2G integration allows EVs to function as mobile energy storage units. When connected to charging station 130, they can either receive energy for charging or supply it back to the grid during peak demand periods, depending on the grid's needs and the vehicle's battery status. The EMS constantly communicates with the local energy grid and receives real-time data on grid demand and energy prices. It uses this information to determine the optimal times for EVs to supply or store energy. Upon connecting to the charging station, an EV transmits its battery status, including the current charge level and health, to the EMS. The EMS then sends commands to the EV, instructing it to either charge or supply energy back to the grid based on grid requirements and the owner's predefined preferences. EV owners interact with the system through a mobile application on a device associated with the vehicle or in-vehicle system, where they can set their preferences for V2G participation. They may receive notifications about their vehicle's V2G activities, including when their vehicle supplies energy to the grid and the compensation or credits they earn for this service.

The compensation mechanism for EV owners participating in V2G may provide a significant incentive. Owners are remunerated for the energy their vehicles supply to the grid, which may be through financial payments, energy credits, or reduced future charging costs. The EMS keeps track of each vehicle's energy to calculate this compensation accurately.

Moreover, the billing system within the EMS is designed to account for energy consumed (for charging the EV) and energy supplied (to the grid). It provides a net energy usage bill, reflecting the energy exchange dynamics for each vehicle. The system also maintains detailed records of energy transactions, aiding in precise billing and offering valuable data for grid operators about the V2G system's impact.

In one embodiment of the EV charging station management system, users create personalized profiles through a mobile application or their vehicle's system, including details such as preferred charging times, typical travel schedules, and battery maintenance preferences. Server 142 analyzes these profiles to recommend optimal charging times, considering factors like station occupancy, grid demand, and availability of lower energy rates during off-peak hours.

The system enhances user communication through timely notifications and alerts via the application or in-vehicle systems. These alerts inform users of the best times to charge based on their personalized profiles and current station conditions. When users schedule a charging session, the system sends a confirmation message to secure their spot and provides reminders as the scheduled time approaches. The system dynamically adjusts scheduled charging sessions to adapt to real-time conditions, keeping users informed of any changes through real-time updates. Users can provide feedback on their charging experience, which the system uses to refine its scheduling algorithms and further personalize the service. The system keeps users updated on the charging station's status, including the availability of charging points and any maintenance or outage issues. Smart charging management optimizes resource use, prioritizing sessions based on user needs, battery health, and station capacity, thus reducing wait times and improving overall efficiency. Users are billed based on actual charging session times and applicable rates, with the system automatically processing payments and providing detailed billing information. Regular users might receive customized offers or rewards based on their charging patterns, encouraging efficient charging habits and fostering user loyalty.

In one embodiment of the EV charging station management system, Augmented Reality (AR) technology is utilized in the user experience at charging stations. This approach involves integrating an AR interface, accessible through smartphones or AR glasses, which provides users with immersive navigation and detailed information about the charging station. The AR interface activates as users approach the charging station, offering navigational cues overlaid in the real-world environment. This system guides them directly to available charging bays, with visual highlights and directional arrows simplifying finding a spot. Each charging point is detailed in the AR display, showing compatibility with the user's vehicle, charging speeds, and occupancy status, allowing users to make informed decisions quickly. The charging station's server sends real-time data to the AR interface, including information about bay availability, wait times, and any relevant alerts or instructions. Users interact with this interface to input their preferences or select a charging bay, and the system responds with confirmations or further guidance. User feedback is also collected through the interface, enabling continuous improvements to the AR experience and the overall services of the station.

In one embodiment, server 142, now referred to as the charging station server (CSS), which serves as the central processing unit, starts by collecting real-time data from an Arrival Time Predictor (ATP). The ATP is a computing module that may execute in the CSS and calculates the estimated arrival times of approaching vehicles based on their current location, speed, and traffic conditions received from the vehicles' onboard navigation systems.

Simultaneously, each charging point at each charging bay 132, 134, and 136 continuously monitors its status, reporting whether it is occupied, the expected completion time of any ongoing charging session, and the anticipated time it will become available. This data is transmitted to the CSS. Upon receiving a vehicle's estimated arrival time and the status reports from the charging points, a Reservation System (RS) within the CSS evaluates which charging point can be reserved. The RS logic checks for an available charging point for the arriving vehicle and another charging point that is predicted to be available within a set threshold time after the arrival of the first vehicle. Once the RS confirms these conditions are met, it proceeds to reserve the appropriate charging point for the arriving vehicle. A confirmation message is then dispatched from the Notification System (NS), a component designed to communicate with the drivers. The NS sends a message to the driver's mobile device or the vehicle's onboard communication system, stating that a charging point has been successfully reserved for their vehicle at the predicted arrival time. The CSS is also responsible for real-time adjustments based on the continuous data flow. If a reserved charging point unexpectedly becomes unavailable or if a vehicle's arrival time changes, the CSS reacts by recalculating the reservations. The NS promptly sends out updated notifications to the drivers to direct them to the appropriate charging point or inform them of any changes in their reservation status.

For example, as Vehicle A nears the charging station, the ATP forecasts its arrival time at 2:00 pm. Charging Point 1 (CP1) is currently unoccupied, whereas Charging Point 2 (CP2) is servicing another vehicle, with an expected availability at 2:10 pm. The RS opts to allocate CP1 for Vehicle A. This decision is due to CP2's expected availability falling within a threshold of time post the arrival of Vehicle A. Subsequently, the system communicates a reservation confirmation to Vehicle A, advising: "Your charging point CP1 is reserved for 2:00 pm. Please proceed to CP1 upon arrival." This protocol ensures that Vehicle A is guaranteed a charging point upon arrival, and there is a contingency in place for servicing another vehicle shortly thereafter, optimizing the station's operational efficiency and enhancing customer satisfaction.

In one embodiment, the charging points monitor and report their occupancy status to the CSS. When a charging point becomes available, the CSS, having already reserved a charging point for an incoming vehicle, activates the NS to inform the next waiting vehicle, referred to as the 'one other vehicle,' that a charging point is ready for use. The NS dispatches a message to the communication interface within the other vehicle, which may be an onboard system or the driver's mobile device, prompting the driver to proceed to the now-available charging point.

Conversely, if the charging point does not become available as anticipated, the CSS instructs the NS to send a different message to the other vehicle advising the driver to wait for the charging point to become available within the predefined threshold time. This message ensures the driver knows the slight delay and provides an updated expectation of when the charging point will be ready. The CSS updates the status of charging points and communicates these changes. For example, if a vehicle occupies a charging point for longer than expected, the CSS receives this information from the charging point's sensors and recalibrates the reservation timings. The NS then sends real-time updates to the waiting vehicles, ensuring they receive up-to-the-minute information on the charging point's status and minimizing any inconvenience caused by delays.

For example, Vehicle A is en route to the charging station, and the CSS has reserved charging point CP1 for its arrival at 3:00 pm. Vehicle B is also approaching and is informed that charging point CP2, currently in use, is expected to be available shortly after Vehicle A's arrival. As soon as CP2 is available, the NS sends a notification to Vehicle B: "CP2 is now available for charging. Please proceed to the designated point." If CP2's occupant extends their session and it becomes clear that CP2 won't be available within the predetermined threshold time, the NS informs Vehicle B: "CP2 will be delayed by an additional 10 minutes. Please standby for further updates."

In one embodiment, the CSS, which houses ATP and the RS, forms the core of this system. The ATP uses real-time traffic data, vehicle telemetry, and historical patterns to predict when vehicles arrive at the station. This predictive information feeds into the RS, which manages charging point allocation. When a vehicle approaches the charging station, the ATP assesses its expected arrival time and communicates this to the RS. If the ATP predicts that another vehicle will arrive before the first vehicle, the RS reserves a charging point for the other vehicle based on this prediction. Once a charging point is reserved, the NS sends a confirmation message to the approaching vehicle's Communication Interface (VCI), an onboard system, or a mobile device application. This message informs the driver of the reservation details, including which charging point has been reserved and when it will become available. The CSS continuously receives status updates from the charging points and the ATP. If changes affect the reservation timings or the predicted arrival times, the CSS recalibrates and updates the reservations. The NS then sends out new messages to the affected vehicles, ensuring drivers receive accurate and up-to-date information regarding their charging point reservations. For example, if the other vehicle is predicted to arrive at 1:30 pm and a charging point is available at that time with another expected to become available shortly after, the RS reserves the current available point for the other vehicle. The NS informs the driver of the other vehicle about the reservation. If the situation changes due to earlier-than-expected departures or delays at the charging points, the NS updates all impacted drivers to reflect the new charging schedule.

For example, the ATP predicts that Vehicle B will arrive at the charging station at 2:15 pm. Vehicle A has a reservation for a charging point (CP1) at 2:00 pm, and another point (CP2) is expected to become available at 2:10 pm. The RS decides to reserve CP2 for Vehicle B, based on the prediction that it will arrive before Vehicle A. The NS sends a message to Vehicle B: "CP2 is expected to be available for you at 2:10 pm. Please proceed to the designated point upon arrival." If Vehicle A arrives early or the status of CP2 changes, the CSS instructs the NS to update both vehicles with the new information to manage their expectations and charging station flow efficiently.

In one embodiment, the ATP initially predicts the arrival times of vehicles and communicates this information to the RS, which reserves charging points accordingly. When a vehicle is delayed beyond a predefined time limit, the CSS, which continuously monitors actual arrivals against predictions, instructs the RS to reassign the reserved charging point to another vehicle.

The RS then identifies a waiting vehicle and reallocates the charging point. The NS immediately notifies the delayed vehicle, informing the driver through their VCI that due to their delay, their reservation has been reassigned to ensure the efficient use of charging station resources. The NS sends a message to the VCI of the vehicle now allocated to the charging point, prompting the driver to initiate the charging process. For example, if Vehicle A does not arrive by the specified reservation time plus the allowed delay margin, the CSS triggers the RS to reassign Vehicle A's charging point to Vehicle B, which is present at the station. The NS communicates this update, sending a message to Vehicle A that the reservation has been reassigned and simultaneously notifying Vehicle B to connect to the now available charging point.

For example, Vehicle A has a reserved charging point at 3:00 pm but has not arrived by 3:15 pm, beyond the allowable delay time set by the system. The RS detects this delay and checks for other vehicles that are present and waiting. Vehicle B is at the charging station and awaiting a charging point. The RS reassigns the charging point reserved for Vehicle A to Vehicle B. The NS sends a notification to Vehicle A, indicating that the charging point has been reassigned due to their delay. Another message is sent to Vehicle B: "Your charging point is now ready. Please proceed to charging point X." This series of actions allows the charging station to maintain a high level of service and efficiency, ensuring that charging points are not left idle while other vehicles are waiting, thus optimizing the station's resources.

In one embodiment, initially, the ATP assesses the expected arrival times of vehicles and communicates this data to the RS, which then reserves charging points based on these predictions. The NS confirms these reservations to the vehicles via their VCIs. However, the process involves continuous monitoring of actual arrivals against the predicted times. When a vehicle, Vehicle A, arrives later than its scheduled reservation time but within a predetermined grace period, the RS reviews the situation. Instead of reassigning the reserved charging point to another vehicle, the RS maintains the reservation for Vehicle A. This decision considers the current availability of other charging points and the arrival predictions for other vehicles. When the decision to maintain Vehicle A's reservation is made, the NS informs Vehicle A through its VCI with a typical message such as, "Your charging point reservation at charging point number X is maintained. Please proceed to your designated charging point." In case another vehicle, like Vehicle B, was waiting to potentially occupy Vehicle A's charging point, the NS also sends an update to Vehicle B. This message may indicate that the expected charging point is no longer available and provide the new estimated wait time or direct Vehicle B to an alternative charging point if one is available.

For example, Vehicle A is predicted to arrive at 2:00 pm and has a charging point reserved. However, Vehicle A arrives at 2:05 pm, within a grace period the RS allows before reassigning the reserved charging point. After noting the delay but recognizing it is within the allowable margin, the RS maintains Vehicle A's reservation. The NS sends a message to Vehicle A: "Your charging point reservation is maintained. Please proceed to charging point number 3." Simultaneously, if Vehicle B was approaching and may have been reassigned to Vehicle A's charging point, the NS sends a message to Vehicle B: "Charging point number 3 is no longer available. Please wait for the next available charging point." This system ensures that the charging station adapts to real-world conditions, such as slight delays in arrival times, without penalizing drivers who are only marginally late, thus balancing efficiency and customer service.

In one embodiment, a Time Analysis Module (TAM), a component within the CSS, calculates the average time taken for vehicles to charge at the station. It gathers data on the duration of each charging session and updates the average charging time in real-time. When a new vehicle approaches the charging station, the RS evaluates if it can be accommodated without exceeding a pre-established threshold time based on the average charging time computed by the TAM. If the average time for all vehicles charging or waiting to charge is equal to or less than this threshold, the RS reserves a charging point for the incoming vehicle. Upon successful reservation, the NS sends a confirmation message to the incoming vehicle's VCI. This message includes essential details like the assigned charging point number and the expected wait time until the point becomes available. The CSS ensures that this reservation aligns with the station's operational efficiency and the threshold time criteria. However, the charging dynamics at the station can change, for example, due to unexpected delays in charging sessions. When such variations occur, the TAM updates the average charging time, prompting the RS to reassess its current reservations. The NS then relays any changes in reservation status to the vehicles affected by these adjustments, such as when a vehicle is approaching and the updated average charging time still falls within the threshold limit. In this case, the RS maintains the reservation, and the NS informs the driver about their confirmed charging point. Conversely, if the updated average time exceeds the threshold, the RS may need to delay or alter reservations, with the NS notifying the drivers accordingly.

For example, the TAM calculates the current average charging time at the station as 30 minutes. A vehicle approaches the station, and the RS determines that adding this vehicle to the queue will not exceed the threshold time, set at 45 minutes. The RS reserves a charging point for the incoming vehicle, and the NS sends a message to the vehicle's VCI: "Your charging point is reserved and will be available in approximately 40 minutes." If the average charging time changes due to unforeseen delays, the TAM updates this information, and the RS and NS work together to adjust reservations and notify drivers of any changes. This system ensures the efficient allocation of charging points at the station, basing decisions on real-time data and statistical analysis to maintain a smooth flow of vehicles and minimize waiting times.

In one embodiment, interactions between the CSS, Charging Point Monitoring System (CPMS), Vehicle Queue Management System (VQMS), NS, and Vehicle Communication Interfaces (VCI) are presented. The VQMS is a subsystem in the software of the instant solution. A CPMS plays a crucial role in monitoring each vehicle's charging duration and state of charge (SoC) at the charging points, while the VQMS tracks the queue of vehicles waiting to charge, including their waiting times and the total number of vehicles in the queue. When specific conditions arise, such as the number of waiting vehicles exceeding a threshold, waiting times becoming excessively long, a vehicle occupying a charging point for longer than average, or a vehicle reaching a higher SoC than others, the CSS evaluates the situation. Based on this evaluation, the CSS may decide to terminate the charging session for a vehicle to free up the charging point for others in the queue. The NS then communicates this decision to the affected vehicle through its VCI, sending a notification that the charging session will soon be stopped. This message explains the reason for the termination, such as the need to manage station congestion or adhere to fairness policies. Following the notification, the CPMS implements the command to stop the charging session for the specified vehicle, making the charging point available for the next vehicle in line. For example, if Vehicle A reaches a higher SoC while other vehicles are waiting at a charging point, the queue exceeds the predefined threshold. The CPMS informs the CSS of Vehicle A's high SoC, and the VQMS reports the queue status. The CSS then instructs Vehicle A to stop charging. The NS sends a message to Vehicle A, informing the driver of the imminent end of their charging session due to high demand and station congestion. After a brief grace period, the CPMS stops the charge, and the NS alerts the next vehicle in the queue that a charging point is now available.

For example, Vehicle A has been charging and reaches a high SoC, while several other vehicles are waiting. The CPMS notifies the CSS that Vehicle A's SoC is higher than others at the station. The VQMS reports to the CSS that the queue of waiting vehicles has exceeded the threshold number. The CSS stops charging Vehicle A to free up the charging point. The NS sends a message to Vehicle A: "Your charging session will end in 5 minutes due to high demand and station congestion." After 5 minutes, the CPMS stops the charge to Vehicle A, and the NS notifies the next vehicle in the queue that a charging point is now available.

This system ensures that the charging station operates efficiently and fairly, managing resources to accommodate as many vehicles as possible while maintaining a high level of service and minimizing wait times.

Figure 1C:
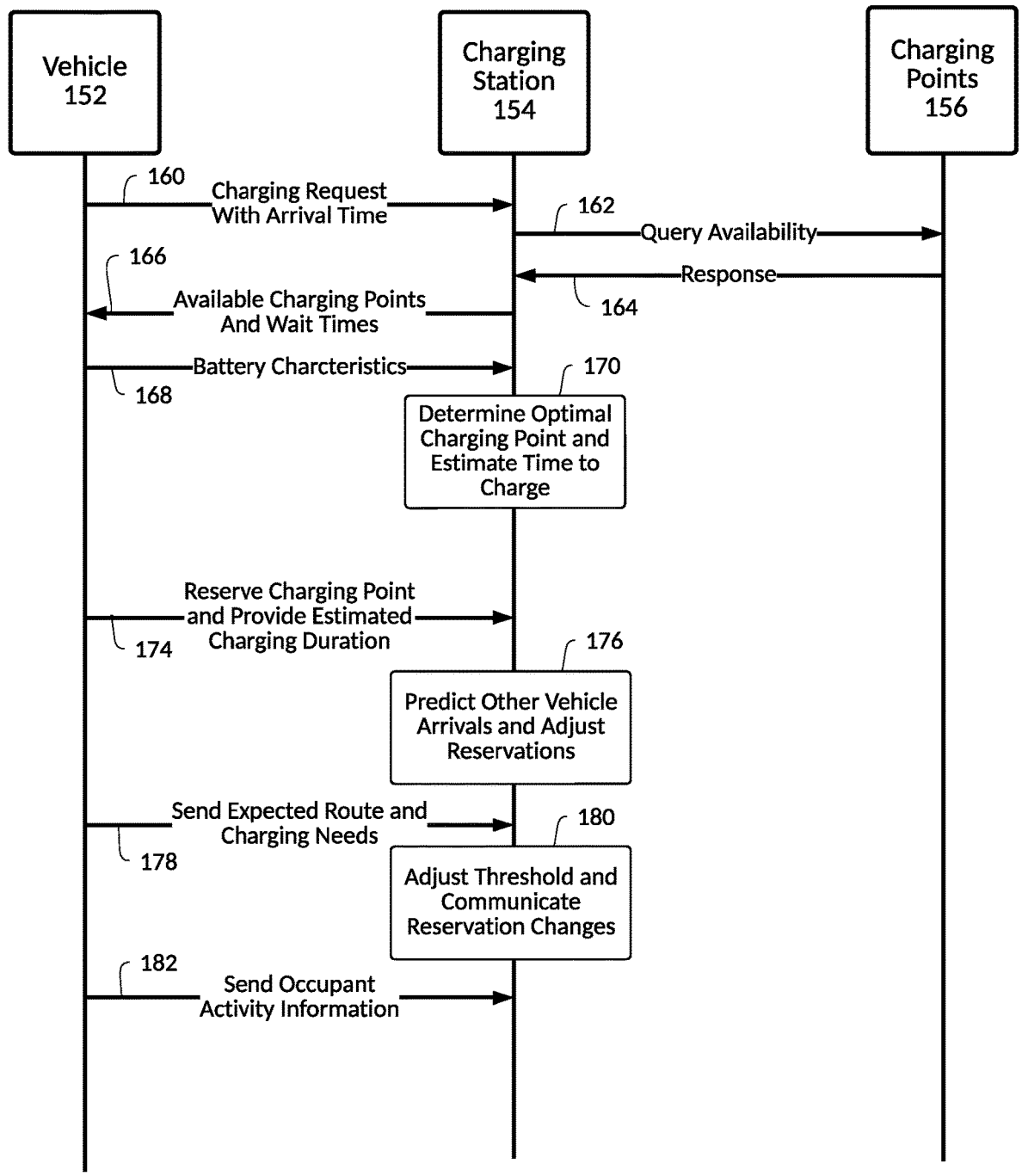
FIG. 1C illustrates an example flow diagram, according to example embodiments.

FIG. 1C illustrates an example flow diagram 150, according to example embodiments. Vehicle 152 may send a "charging request" upon nearing a charging station and/or choosing the charging station as a desired location for receiving a charge. The message may also include a predicted arrival time 160. The message may be sent via cellular communication, for example. Charging station 154 receives the request and returns data on the current charging point availability. The availability may be determined when the charging station queries 162 the charging points at the charging station and receives a response 164. The charging station's system checks for an available charging point at the requested arrival time. If there is no immediate availability, the system calculates if another vehicle can finish charging and leave before the threshold, making a charging point available. Vehicle 152 sends its battery characteristics 168 (e.g., capacity, current charge level) to the charging station 154. A processor in the vehicle may query other processors in the vehicle, such as the battery management system associated with the battery in the vehicle, to ascertain the battery characteristics.

The charging station 154 selects the most suitable charging point 156 to deliver the quickest charge based on the vehicle's battery characteristics. The charging station 154 calculates the estimated time to charge for each available charging point and may include a query 162 to each of the charging points 156 and may receive a response 164 from each of the charging points. It then selects the charging point with the optimal charging time for reservation 170. The charging station system predicts other vehicle arrivals using historical data, time of day, and possibly connected vehicle data 176. Based on predictions, it reserves a charging point for the initial vehicle while ensuring availability for upcoming vehicles and may provide an estimated charging duration 174. Vehicle 152 may send charging station 154 a route to the charging station 154 and charging needs, including a current state of charge, a supported connection speed, and the like 178. In one embodiment, a charging point will not be reserved by vehicle 152 unless another charging point 156 is available for another vehicle in a threshold time. For example, if the threshold time is 3 minutes, then another charging point 156 needs to be predicted to become available within 3 minutes of the time that vehicle 152 connects to the reserved charging point 156. The system may adjust the threshold time if the next charging station on the vehicle's route has a longer connecting time or is farther away 180. This information is communicated back to vehicle 152, adjusting its charging schedule if necessary. The system calculates if the threshold time is less than it would take for the vehicle to connect to the next charging point on its route. If the next charging point is at another station, travel and connection times are estimated, and the reservation is adjusted accordingly. The vehicle may send data about the occupant's activities 182 (such as if they plan to shop or eat nearby). The system may obtain this data from communication with a device associated with the occupant, such as a mobile device, a tablet, and/or any computing device. The system considers these activities and adjusts charging point allocation based on the estimated duration the charging vehicle will occupy the charging point.

In one embodiment, referring to FIG. 1B, the system includes a feature that enhances communication and acknowledgment of messages between server 142 associated with charging station 130 and occupants of vehicle 126. This feature may be activated when vehicle 126 reserves the charging bay 132. Upon successful reservation of a charging bay, the system sends a confirmation message to the vehicle's onboard processor, which may include a variety of communication processors such as a navigation processor, a head unit processor, or an electronic control unit (ECU). This confirmation message can be relayed to an occupant device associated with the driver, such as a smartphone, through wireless communication media like Wi-Fi, Bluetooth, or cellular networks. The occupant device may run a dedicated application or software interface interacting with the charging station's server in an alternate embodiment. The system requests acknowledgment of the confirmation message as part of the reservation process. Upon receiving this message on their vehicle's system or occupant device, the driver acknowledges it, confirming the successful reservation. The acknowledgment confirms the occupant's awareness of the reservation and sets the stage for subsequent communications. For example, the system may later need to send updates regarding the charging bay status, such as a notification if a bay becomes available earlier than expected or if there is a change in the charging station's status. By establishing a reliable communication protocol through the initial acknowledgment, the system ensures a higher probability that the occupant will receive and acknowledge future messages. Additionally, this acknowledgment process can be integrated with the server's predictive models and real-time data analytics. For instance, if the system detects a change in the charging station's status that affects the reserved bay, it communicates this change to the occupant. Since the occupant has previously interacted with the system, there is a higher likelihood that these messages will be promptly received and acknowledged, allowing for real-time adjustments in the occupant's charging schedule or bay allocation.

In one embodiment, once an occupant successfully reserves a charging bay 132, the system, leveraging its network of processors and sensors in the charging points 106-108, vehicles 126/128, and charging station 130, monitors the occupancy status of each bay. It communicates this information to server 142, which then processes it to manage the bay allocations dynamically. The server, connected to network 140, receives data from the vehicles' processors, including their estimated time of arrival (ETA) at the charging station and desired charge level. The reservation process starts with a request received at server 142 from vehicle 126 or a device associated with an occupant of the vehicle. The server assesses the current and predicted availability of charging bays, considering factors like ongoing charging sessions, expected departure times of currently charging vehicles, and the ETA of incoming vehicles. When a bay aligns with the occupant's ETA, the server reserves it and sends a confirmation message to its vehicle processor and/or mobile device. This confirmation message may include the reserved bay number and expected availability time. The system's ability to predict and allocate bays in advance reduces the likelihood of queues or waiting times at the charging station, thereby minimizing frustration among drivers. As the occupant is assured of a spot upon arrival, it alleviates the anxiety of finding an available charging bay, especially during peak hours. Furthermore, this reservation system creates a positive feedback loop regarding occupant interaction with the charging station's communication system. As occupants experience the convenience and reliability of the reservation system, they may become more receptive to receiving future notifications from the charging station. These may include updates on charging bay availability, changes in station status, or even promotional messages. The occupant's willingness to engage with these communications enhances their overall experience and can lead to more efficient use of the charging station's resources.

In one embodiment, referring to FIG. 1B, the system determines the availability of charging points at an EV charging station 130 based on analyzing the characteristics of the batteries of all vehicles present at the station, including the vehicle 126 approaching for charging. The process begins with the system collecting data on the battery characteristics of each vehicle at the charging station and any incoming vehicles 126-128. This data collection is facilitated through communication between the vehicles' processors (such as the ECU) and the server 142 associated with the charging station. The vehicles' processors can communicate over various wireless networks to transmit battery data to the server, including Wi-Fi, Bluetooth, and cellular connections. A state of charge (SoC) of a vehicle battery indicates the current charge level of the battery, which is crucial for understanding how much more charging is needed and how long a vehicle will occupy a charging bay. A desired SoC is the charge level the occupant wishes to achieve, providing the system with an endpoint for the charging session. A battery's health encompasses various factors like charge cycles, battery efficiency, and any degradation signs, giving insights into the battery's charging speed and capacity. Older batteries may have different charging behaviors than newer ones, affecting how quickly they can be charged and how much charge they can hold. Once this data is acquired, the server analyzes it to determine the expected duration each vehicle will require to reach its desired SoC. This analysis considers the varying charging rates of different batteries based on their health and age. For example, a battery with a lower health score might charge slower, thus occupying a charging bay for longer. Using this information, the server can predict when each charging point will become available based on the expected completion times of the ongoing charging sessions. This prediction is also applied to incoming vehicles. By assessing the battery characteristics of an approaching vehicle, the system can estimate its charging time and accordingly reserve a charging point that aligns with its anticipated needs and arrival time. This method enables the system to optimize the utilization of charging points by allocating them based on an understanding of each vehicle's battery needs. It not only improves the efficiency of the charging process but also enhances occupant satisfaction by reducing waiting times and ensuring that each vehicle receives an appropriate charge level according to its specific battery characteristics.

In one embodiment, the system incorporates a feature for selecting a charging station that enables charging an EV battery within a specified time threshold. Server 142 assesses and compares the charging capabilities of different charging stations 130 and the specific charging requirements of each EV 126. The process begins when an EV, equipped with various processors like an Electronic Control Unit (ECU) or a navigation processor, communicates its charging needs to the server. This communication can occur over various wireless networks (e.g., Wi-Fi, Bluetooth, cellular) and includes information about the vehicle's current battery state of charge (SoC), desired SoC, battery health, and age. Upon receiving this information, the server, which may be a part of a larger network or cloud system 140, processes it to determine the optimal charging station for the vehicle. This determination involves analyzing the charging capabilities of each station in the network, including the number of available charging points, their charging rates, and the current occupancy status. The server also considers the estimated travel time to each station based on the vehicle's current location and real-time traffic data. The selected charging station 130 must meet the criteria of being able to charge the vehicle's battery within a specified time threshold. This threshold is set based on factors, such as the driver's schedule, the urgency of the charging need, and the overall demand for charging points at various stations. The server calculates the expected charging duration for each station, factoring in the battery's characteristics and the station's charging rate, and then selects the one that can complete the charging process within the threshold time. When a suitable charging station is identified, the system communicates this information to the vehicle, providing directions and an ETA. Additionally, the system can reserve a charging point at the selected station, ensuring it is available when the vehicle arrives.

In one embodiment, the system enhances the occupant experience at EV charging station 130 by providing real-time notifications to vehicles waiting for an available charging bay 132. The server 142 continuously monitors the status of all charging bays. This monitoring is facilitated by sensors in each charging bay 132 that detect the presence or absence of vehicles and communicate with processors in the charging points. The server, which may be part of a larger network or cloud system 140, receives data on the occupancy status of the bays, the charging progress of the vehicles currently occupying them, and the estimated times until those vehicles complete charging. When a vehicle arrives at the charging station and finds all bays occupied, it communicates its presence and need for a charging bay to the server. This communication can occur through various wireless networks like Wi-Fi, Bluetooth, or cellular and is facilitated by the vehicle's onboard processors such as the ECU, a navigation processor, an overall vehicle processor, or any other processor associated with the vehicle. The server processes the real-time data to estimate when a charging bay will become available. It considers the current charging status of the occupied bays, the charging rates of the chargers, and the battery levels of the vehicles currently charging. Based on this data, the server predicts the approximate time until a bay becomes available and may notify the waiting vehicle with this information. For example, the message might be, "A bay will be ready in approximately 2 minutes." This notification is sent to the vehicle's processor and can be relayed to an occupant device associated with the driver, such as a mobile device, through wireless communication.

In one embodiment, the system manages the allocation of charging bays at an EV charging station 130 particularly in situations where a reserved bay is not immediately claimed by the reserving vehicle, and another vehicle is waiting. The system utilizes real-time data and predictive analytics to dynamically adjust reservations and communicate with vehicles at the charging station. For example, in this scenario, there are two cars: Car 1, which has made a prior reservation for a charging bay but has not yet arrived at the charging station, and Car 2, which arrives at the station without a reservation. The system, which includes a server 142 connected to a network (potentially cloud-based) 140, continuously monitors the status of all charging bays and the positions and estimated arrival times of vehicles approaching the station. When Car 2 arrives at the charging station, it communicates its presence and need for a charging bay to the server. This communication is facilitated by the vehicle's onboard processors, such as the ECU, and can occur over various wireless networks like Wi-Fi, Bluetooth, or cellular. Simultaneously, the system is aware that Car 1, despite having a reservation, has not yet arrived. The server then assesses the current situation based on several factors, including the occupancy status of the bays, the charging progress of the vehicles currently charging, and the predicted arrival time of Car 1. It also considers a predefined threshold time, for example, 6 minutes. This threshold represents the maximum time the system allows a reserved bay to remain unoccupied before reallocating it to another vehicle. Given that Car 1 has not arrived and the threshold time is approaching, the system calculates the expected availability of the next open bay. For example, it might determine that a charging bay will become available in the next 4 minutes, which is within the threshold. The system then sends a notification to Car 2, advising it to use the next open bay that will be available in 4 minutes. This notification is relayed to Car 2's onboard processors and can also be sent to an occupant device associated with the driver.

In one embodiment, the system incorporates a dynamic approach to manage the allocation of charging points at an EV charging station 130 by setting a threshold time. This threshold time is defined as the average wait time to utilize a charging point either at the specific charging station or in the geographic area where the station is located. The system includes a server 142 networked with various components like charging bays, vehicles' processors, and sensors at the charging station. This server is responsible for managing the real-time data regarding the status of charging bays, the charging progress of vehicles, and the arrival of new vehicles at the station. To establish the threshold time, the system may collect historical data on the utilization of charging points. This data includes the duration vehicles typically wait for a charging point at the specific station and may also encompass wait times at other stations in the same geographic area. The system analyzes this data to calculate an average wait time, which is then set as the threshold time. This time represents a benchmark for the system's decision-making process regarding charging point allocation and reservation. For example, if the average wait time (threshold time) is determined to be 15 minutes, the system uses this information to manage reservations and allocations. When a vehicle arrives and requests a charging point, the system evaluates the current and upcoming availability of charging points against this threshold. If a charging point is expected to become available within the threshold time, the system reserves this point for the vehicle. The threshold time may be utilized dynamically. The system continuously updates it based on the ongoing collection and analysis of wait time data. This ensures that the threshold time reflects current conditions, such as changes in station usage patterns, traffic fluctuations in the area, or upgrades to the charging station's infrastructure.

In one embodiment, the system at the EV charging station 130 manages charging bay reservations by accounting for the anticipated busyness of the station at the time of reservation. The server 142 is responsible for collecting and analyzing real-time data regarding the occupancy status of charging bays 132-136, the charging progress of vehicles 126 currently occupying the bays, and the projected arrival times of incoming vehicles 128. To determine the busyness of the station at future points in time, the system employs predictive models that synthesize various data inputs. These include real-time and historical data on the station's usage, current occupancy and reservation status of charging bays, vehicle arrival patterns, and possibly broader traffic and mobility trends in the geographic area surrounding the station. When a vehicle makes a reservation request, the server calculates the expected busyness of the station at the vehicle's estimated arrival time. This calculation considers the number of already reserved bays, the expected duration of ongoing charging sessions, and the likelihood of additional vehicles arriving based on historical patterns and real-time data. When the system predicts that the charging station will be at or near its maximum capacity at the requested reservation time, it may decide not to reserve a bay for the incoming vehicle. This decision is based on a strategic assessment to prevent overcommitment of the station's resources, ensuring that the charging station can efficiently serve both pre-reserved and spontaneously arriving vehicles. In such a scenario, the system might offer alternative options to the driver, such as reserving a charging bay later or suggesting nearby charging stations with available capacity. These alternatives are communicated to the vehicle's onboard processors or the driver's mobile device via wireless networks.

In one embodiment, the charging station is equipped with a plurality of charging points, each possibly having different charging capabilities and rates. The system, which includes a central server 142, is networked with various components, such as sensors in the charging bays 132-136, processors in the charging points, and communication interfaces with the vehicles 126-128 approaching the station. When a vehicle requests a charging point, its onboard processor communicates with the server over wireless networks (Wi-Fi, Bluetooth, cellular, etc.). The vehicle transmits essential data, including its current state of charge (SoC), desired SoC, battery health, and age. Upon receiving this information, the server calculates the estimated time to charge the vehicle at each available charging point. This calculation considers the specific capabilities of each charging point and the charging requirements of the vehicle, considering its battery characteristics. Factors such as the battery's health and age can significantly influence how quickly it can be charged. Based on these calculations, the system selects a charging point for the vehicle that offers the optimal estimated time to charge. For example, a vehicle with a high-capacity battery requiring a fast charge might be directed to a high-power charging point, while a vehicle with a smaller battery or one requiring only a top-up might be allocated to a standard charging point. After selecting the most suitable charging point, the system reserves it for the vehicle and communicates this reservation to the vehicle's onboard processor and/or the driver's mobile device. This reservation ensures that the vehicle is matched with a charging point that will charge its battery in the most efficient manner possible, considering the current status and capabilities of all available charging points at the station.

In one embodiment, the system encompasses a dynamic charging bay reservation system. As an EV approaches a charging station, it initiates communication with the station's system through the vehicle's onboard processor or Electronic Control Module (ECM). The vehicle transmits a 'charging request' to the charging station, including crucial data like predicted arrival time and specific battery characteristics, including current charge level and capacity. The request is sent via advanced wireless communication technologies like cellular networks to ensure timely data transmission. Upon receiving a charging request, the charging station's processor assesses the status of the charging bays, determining which ones are occupied or available. It then proceeds to predict the near-future availability of the bays based on ongoing charging sessions, estimated completion times, the current state of charge of the vehicles occupying the bays, and their charging rates. The system calculates when a charging bay will be available within a threshold time before the EV's predicted arrival. When the system identifies an available bay within the threshold, it reserves the bay for the incoming vehicle. The reservation is then communicated back to the vehicle's processor, providing the driver with a confirmation of the reserved charging bay. In scenarios where immediate availability is not possible, the system continues to monitor the charging bays and updates the reservation status as soon as a bay becomes available.

In one embodiment, the system facilitates real-time bay occupancy monitoring of an EV charging station. Each charging bay at the station is equipped with sensors capable of detecting the presence of a vehicle. When a vehicle arrives and parks in a bay, the sensor recognizes its presence and changes the status of the bay to 'occupied.' Conversely, the sensor updates the bay's status to 'unoccupied' when a vehicle leaves. The occupancy data from each bay's sensors is transmitted to a central server. The central server receives data from all the bay sensors and processes the information to maintain a real-time view of the occupancy status of each charging bay. The server performs real-time analysis to ensure the most current occupancy information is available. The real-time occupancy data feeds into the dynamic charging bay reservation system, allowing it to make informed decisions about bay allocations. For example, when a vehicle requests a charging bay, the system can instantly check the real-time occupancy data to determine availability or predict when a currently occupied bay will become available. The real-time bay occupancy monitoring system is integrated with the charging station's reservation system, ensuring the reservation system has the most up-to-date information on bay occupancy.

In one embodiment, the system utilizes historical data and connected vehicle information to predict future charging bay availability. The charging station's system analyzes historical usage patterns of the charging bays. The data includes peak usage times, average charging duration per vehicle, bay occupancy frequency, etc. The system identifies trends and patterns, predicting future bay usage and availability. The system also incorporates real-time data from connected vehicles. Vehicles equipped with communication technology (like cellular or dedicated short-range communication (DSRC) services) transmit data to the charging station as they approach. The data includes the vehicle's state of charge, estimated arrival time, and charging requirements, increasing the prediction accuracy of bay availability. The system uses historical and real-time data to forecast the availability of charging points at any given time. It can predict when a currently occupied bay will likely be vacated based on the charging progress of the connected vehicle currently using the bay. The system reserves a charging point for the incoming EV using the bay availability prediction. It ensures that as soon as a bay is predicted to become available, it can be reserved for a vehicle en route to the station. The system also incorporates time-of-day data and contextual factors, including holidays, weekends, and special events, in the predictions.

The system optimizes an EV charging experience based on battery characteristics in one embodiment. As the EV approaches a charging station, it transmits detailed information about its battery to the station's system. The information includes the battery's capacity, current state of charge, and specific charging capabilities. The EV sends a charging request to the charging station with detailed information about its battery, including capacity and current charge level. The charging station's system receives the battery data and processes it to determine the most suitable charging point for the vehicle. The system evaluates factors, including charging point availability, charging rates, and compatibility with the vehicle's battery specifications. The system dynamically allocates charging points to incoming vehicles based on the compatibility assessment. It matches the vehicle with a charging point that can deliver the fastest charge based on its unique battery characteristics. For example, when a vehicle has a high-capacity battery that supports rapid charging, the system will prioritize assigning it to a charging point that can provide a higher charging rate, ensuring a quicker charge. Conversely, the system may allocate charging points that match these requirements for vehicles with lower charging capacity or slower charging rates, optimizing overall station efficiency.

The system integrates occupant activities into the charging point allocation process in one embodiment. The system allows for the transmission of data about the driver's or occupants' planned activities while the vehicle is charging. For example, if the occupants plan to shop or dine nearby, they can input this information into the system. The system communicates with devices associated with the occupants, including smartphones and tablets, to gather data about their planned activities. The devices provide information based on calendar events, location services, and manual input by the occupants.

Using the data from the occupants' devices, the system estimates how long the vehicle will likely occupy the charging point. The estimation accounts for the duration of activities. The system dynamically adjusts the availability status of the charging point by the estimation duration. If the system anticipates a longer occupancy due to the occupants' activities, it can reserve the charging bay for longer, preventing other vehicles from reserving it prematurely. With data on the occupant's activities, the system can ensure that charging bays are used efficiently, avoiding situations where a bay remains reserved but unoccupied because the occupants returned later than expected. By predicting the actual time, a charging bay will be occupied, the system optimizes the turnover rate of charging points, accommodating more vehicles and reducing waiting times for other EV drivers.

In one embodiment, the system ensures efficient allocation and reservation of charging points for EVs based on predicted availability and real-time data processing. The system comprises several interconnected components, including charging bays at a charging station, individual charging devices, EVs, a server, and a network that facilitates communication among these elements. A charging bay is equipped with sensors to detect the presence or absence of a vehicle and its occupancy status. The sensors are integrated into the charging station's network, enabling real-time monitoring of each bay's status. An EV approaching the charging station communicates wirelessly with the server through the network. The network exchanges information between the vehicle and the charging station. The vehicle processors send data, including the server's current location, state of charge, and anticipated arrival time. The server processes the information received from the vehicle and the charging station, using predictive algorithms to estimate the availability of charging points. The predictions are based on real-time data, historical patterns, and driver preferences. The server's role is to manage the allocation of charging bays, continuously updating the reservation status as vehicles arrive and depart. When an EV sends a charging request to the server, the system assesses the availability of charging bays and predicts whether a bay will become available shortly. Upon predicting a bay is available within the predetermined threshold time after the EV's arrival, the server reserves the bay for the EV. The system can modulate the threshold time for charging point reservation due to the availability of subsequent charging stations along the EV's route and the travel time to these stations.

In one embodiment, the system determines the characteristics of a vehicle's battery and selects the most suitable charging point to provide the quickest charge. An EV is equipped with a battery management system that monitors and reports on various vehicle battery characteristics. The characteristics include the battery's age, current state of charge, temperature, and the number of charge cycles it has undergone. When an EV approaches a charging station, it sends a request for charging. The request includes data about the battery's characteristics gathered by the vehicle's battery management system. The communication can occur over standard wireless protocols such as cellular, Wi-Fi, or dedicated short-range communication services. Upon receiving the charging request, the server at the charging station processes the data from the vehicle. The server assesses the status of the various charging points at the station, each equipped with sensors to indicate availability and operational status. The server's role is to manage these charging points, utilizing the incoming data from the EVs. The server evaluates the battery characteristics provided by the EV and matches them with the most suitable charging point. The selection process is based on determining which charging point can deliver the fastest charge to the vehicle's specific battery type, considering its current state and other characteristics. For example, if the vehicle's battery is older or has specific temperature sensitivities, the system might select a charging point with a lower energy transfer rate to prevent potential damage to the battery. The server communicates the selection to the EV, guiding it to the appropriate charging point. The communication ensures that each vehicle is matched with the most efficient charging option available, considering both the needs of the vehicle's battery and the status of the charging station.

In one embodiment, the system selects the most appropriate charging point from a plurality of points based on estimated charging time. Each charging point at the station is fitted with sensors to relay its status (occupied, unoccupied, charging rate, etc.) to a server. When an EV approaches the charging station, it communicates with the server, transmitting data including its state of charge, battery capacity, and expected charging requirements. The server processes the incoming data, considering the current and projected availability of the charging points at the station. The server uses predictive algorithms and real-time information to assess which charging point among the plurality available would result in the most efficient charging time for the incoming EV. The assessment considers factors including the charging point's power output, compatibility with the vehicle's charging technology, and the current usage pattern of the charging station. Once the server identifies the most suitable charging point, it communicates the selection to the EV, guiding it to the chosen point for charging. The server continuously monitors each charging point's status and the incoming and outgoing EV traffic at the station. The dynamic monitoring and data processing allow the system to adaptively manage charging point allocation, ensuring that the charging infrastructure is utilized effectively and that EV drivers experience minimized wait times and optimized charging sessions.

In one embodiment, the system reserves a charging point based on the prediction of other vehicles arriving at the charging station after the arrival of an initial vehicle. Each charging point at the station has sensors to determine its status (occupied or available) and relay the information to the server. An EV communicates with the server and sends data, including its expected arrival time, battery status, and charging requirements. Upon receiving the data, the server, using predictive algorithms and real-time information, assesses charging point availability and predicts future availability based on the expected arrival of other EVs. The server considers historical data, current traffic conditions, and driver preferences to forecast the incoming traffic to the charging station. When the server predicts that a charging point will become available after the arrival of the initial EV, it reserves the charging point for the vehicle. The reservation ensures the EV has a charging point ready upon arrival, thus minimizing waiting time. The predictive aspect of the system also considers the estimated departure times of currently charging EVs and the anticipated arrival times of other EVs to optimize charging point allocation. When multiple EVs are approaching, the server dynamically adjusts the reservations, prioritizing based on various factors, including the battery charge level of the arriving vehicles or their estimated wait times. The server continuously updates these reservations as real-time data about vehicle arrivals and departures is received.

In one embodiment, the system manages EV charging at a station by adjusting the reservation threshold time for a charging point based on the proximity and availability of subsequent charging stations along the EV's route. Each charging point at the station is equipped with sensors that provide real-time information about their status (occupied, available, charging rate, etc.) to the server. When an EV approaches a charging station, it communicates with the server, sending the vehicle's current location, estimated arrival time, state of charge, and charging requirements. Upon receiving the data, the server employs advanced algorithms to analyze the status of the charging station and predict future charging point availability. Crucially, the system also considers the availability of subsequent charging stations along the EV's intended route. The server calculates the time it would take for the EV to travel to the next charging station and compares this to the expected waiting time for an available charging point at the current station. When a charging point at the current station is expected to become available within a shorter time than the travel time to the next station, the server adjusts the reservation threshold time accordingly. The adjustment is made by increasing the threshold by a first amount of time that is less than the time it would take for the vehicle to reach an alternative charging station. For example, when the next station is 30 minutes away, and a charging point is likely to become available in 20 minutes, the system might extend the threshold slightly, e.g., by 5 or 10 minutes, to allow the vehicle to charge at the current station with minimal wait. The dynamic adjustment of the reservation threshold is continuously recalculated as new data arrives, ensuring that the system remains adaptive to changing conditions at both the current and subsequent charging stations. The server communicates these adjustments to the approaching EV, enabling it to make informed decisions about waiting for a charging point at the current station or proceeding to the next one.

In one embodiment, the system optimizes the setting of a reservation threshold time. Each charging point has sensors that monitor its occupancy status and communicate this information to the server. When an EV approaches a charging station, it communicates with the server and transmits data, including its current location, estimated arrival time, battery status, and desired charge level. The server analyzes the data in conjunction with real-time traffic information, the current occupancy status of the charging points, and predictive models that account for typical traffic patterns and the expected availability of charging points. The server analyzes the data and determines the optimal threshold time for reserving a charging point for the EV. The threshold time is less than it would take for the EV to travel to and connect to a charging point at the next available station on its route. For example, if the travel time to the next station is 30 minutes, but a charging point at the current station is expected to become available within 20 minutes, the server would set the reservation threshold at the current station to 20 minutes. The threshold setting ensures the EV is directed to wait at the current station if a charging point will be available within a reasonable time frame, avoiding unnecessary travel to another station. When the expected wait time exceeds the threshold, indicating it would be quicker for the EV to travel to the next station, the server advises the vehicle to proceed to the next available charging point.

In one embodiment, the system considers the activity and location of occupants of a charging vehicle at a charging point, thereby enhancing the efficiency of charging point reservations. Each charging point at the station is integrated with sensors to determine its status and communicate this information to a server. As the vehicle approaches the charging station, it communicates with the server, transmitting data about its charging needs, state of charge, and estimated arrival time. Simultaneously, the system integrates location-based services and personal schedules from the occupants' connected mobile devices. It uses the information, combined with vehicle-to-infrastructure (V2I) communication technologies, to gain insights into the location and activities of the occupants. For example, if the occupants attend a nearby event, the system infers a likely duration for which the vehicle will occupy the charging point. Upon receiving the EV's data, the server processes it alongside the information about the occupants' activities and location. The server uses predictive algorithms and real-time data to assess the availability of charging points, adjusting the allocation based on the predicted duration of the current charging sessions. The predictive assessment considers the likelihood of an EV remaining at a charging point for longer due to the occupants' activities away from the vehicle. If the system determines that an EV at a charging point will likely be there for an extended period, it adjusts the reservation system for incoming vehicles accordingly. The adjustment ensures that new arrivals are allocated to charging points expected to be vacated sooner, optimizing the charging infrastructure's usage. The server communicates these charging point allocations to the approaching EVs, informing them where and when to charge.

Flow diagrams depicted herein, such as FIG. 1C, FIG. 2C, FIG. 2D, FIG. 2E, and FIG. 2F, are separate examples but may be the same or different embodiments. Any of the operations in one flow diagram may be adopted and shared with another flow diagram. No example operation is intended to limit the subject matter of any embodiment or corresponding claim.

It is important to note that all the flow diagrams and corresponding processes derived from FIG. 1C, FIG. 2C, FIG. 2D, FIG. 2E, and FIG. 2F may be part of a same process or may share sub-processes with one another thus making the diagrams combinable into a single preferred embodiment that does not require any one specific operation but which performs certain operations from one example process and from one or more additional processes. All the example processes are related to the same physical system and can be used separately or interchangeably.

The instant solution can be used in conjunction with one or more types of vehicles: battery electric vehicles, hybrid vehicles, fuel cell vehicles, internal combustion engine vehicles and/or vehicles utilizing renewable sources.

Figure 2A:
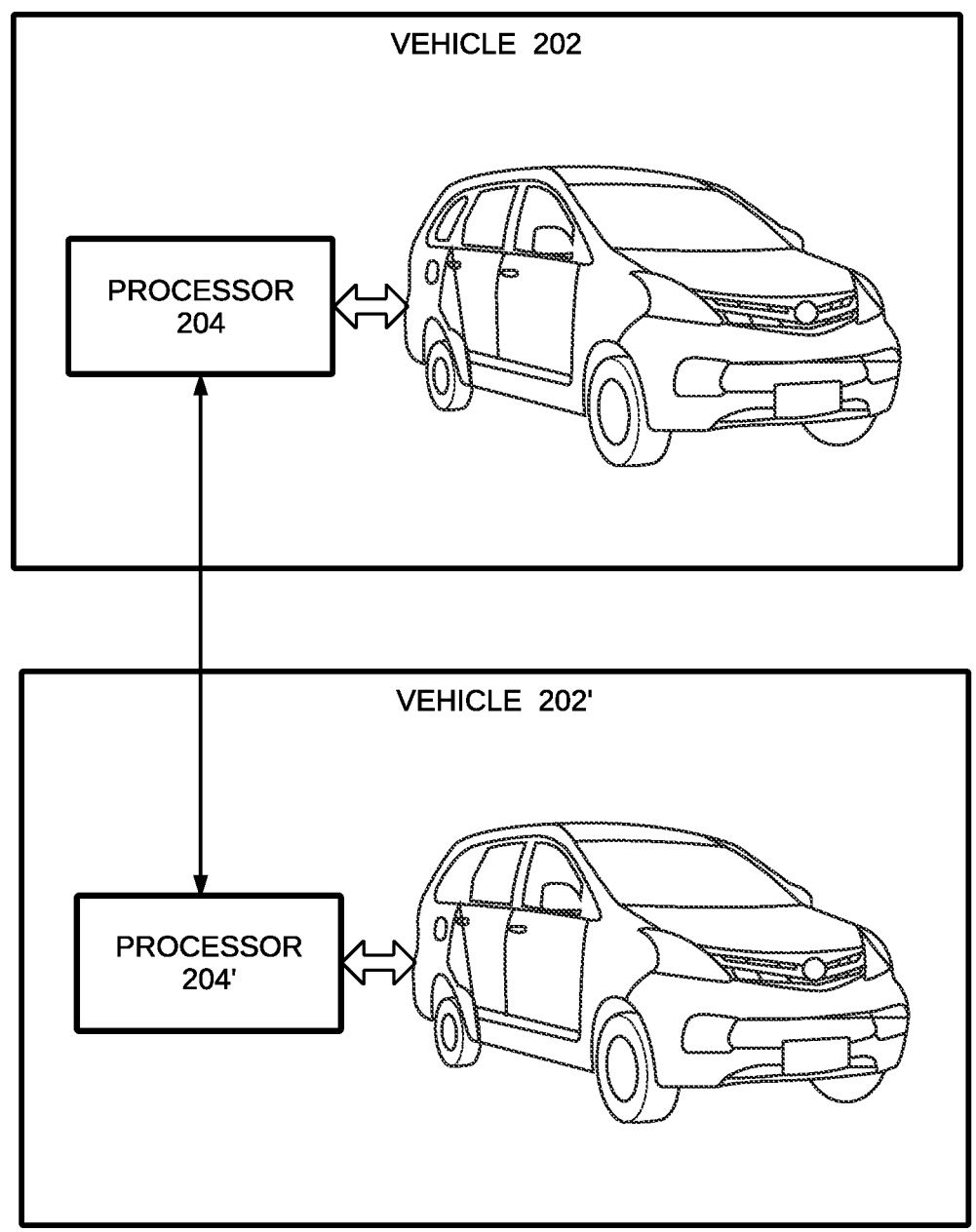
FIG. 2A illustrates a vehicle network diagram, according to example embodiments.

FIG. 2A illustrates a vehicle network diagram 200, according to example embodiments. The network comprises elements including a vehicle 202 including a processor 204, as well as a vehicle 202' including a processor 204'. The vehicles 202, 202' communicate with one another via the processors 204, 204', as well as other elements (not shown) including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and software. Although depicted as single vehicles and processors, a plurality of vehicles and processors may be present. One or more of the applications, features, steps, solutions, etc., described and/or depicted herein may be utilized and/or provided by the instant elements.

Figure 2B:
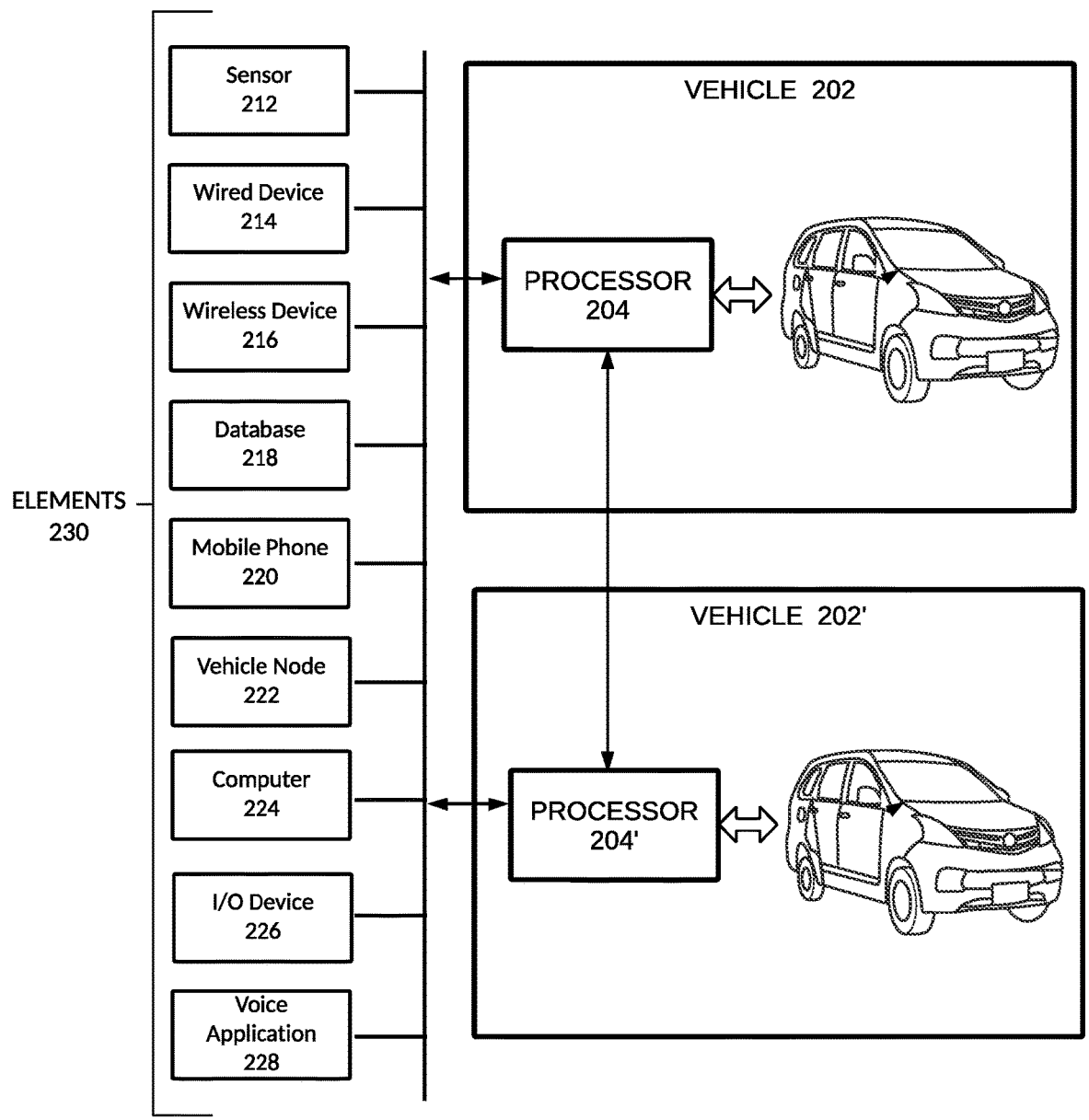
FIG. 2B illustrates another vehicle network diagram, according to example embodiments.

FIG. 2B illustrates another vehicle network diagram 210, according to example embodiments. The network comprises elements including a vehicle 202 including a processor 204, as well as a vehicle 202' including a processor 204'. The vehicles 202, 202' communicate with one another via the processors 204, 204', as well as other elements (not shown), including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and software. The processors 204, 204' can further communicate with one or more elements 230 including sensor 212, wired device 214, wireless device 216, database 218, mobile phone 220, vehicle 222, computer 224, I/O device 226, and voice application 228. The processors 204, 204' can further communicate with elements comprising one or more of a processor, memory, and software.

Although depicted as single vehicles, processors and elements, a plurality of vehicles, processors and elements may be present. Information or communication can occur to and/or from any of the processors 204, 204' and elements 230. For example, the mobile phone 220 may provide information to the processor 204, which may initiate the vehicle 202 to take an action, may further provide the information or additional information to the processor 204', which may initiate the vehicle 202' to take an action, may further provide the information or additional information to the mobile phone 220, the vehicle 222, and/or the computer 224. One or more of the applications, features, steps, solutions, etc., described and/or depicted herein may be utilized and/or provided by the instant elements.

Figure 2C:
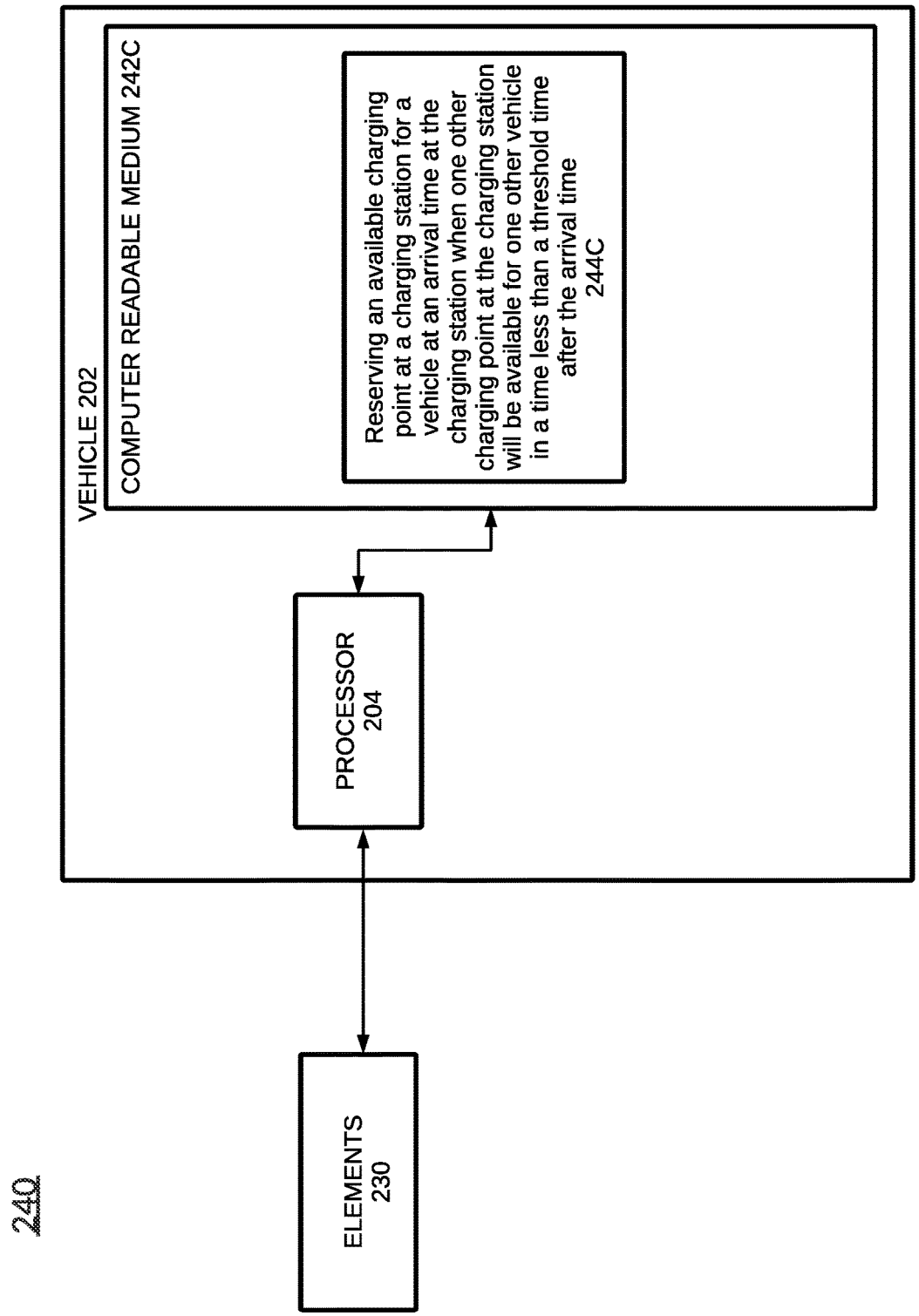
FIG. 2C illustrates yet another vehicle network diagram, according to example embodiments.

FIG. 2C illustrates yet another vehicle network diagram 240, according to example embodiments. The network comprises elements including a vehicle 202, a processor 204, and a non-transitory computer readable medium 242C. The processor 204 is communicably coupled to the computer readable medium 242C and elements 230 (which were depicted in FIG. 2B). The vehicle 202 may be a vehicle, server, or any device with a processor and memory.

The processor 204 performs one or more of reserving an available charging point at a charging station for a vehicle at an arrival time at the charging station when one other charging point at the charging station will be available for one other vehicle in a time less than a threshold time after the arrival time 244C.

Figure 2D:
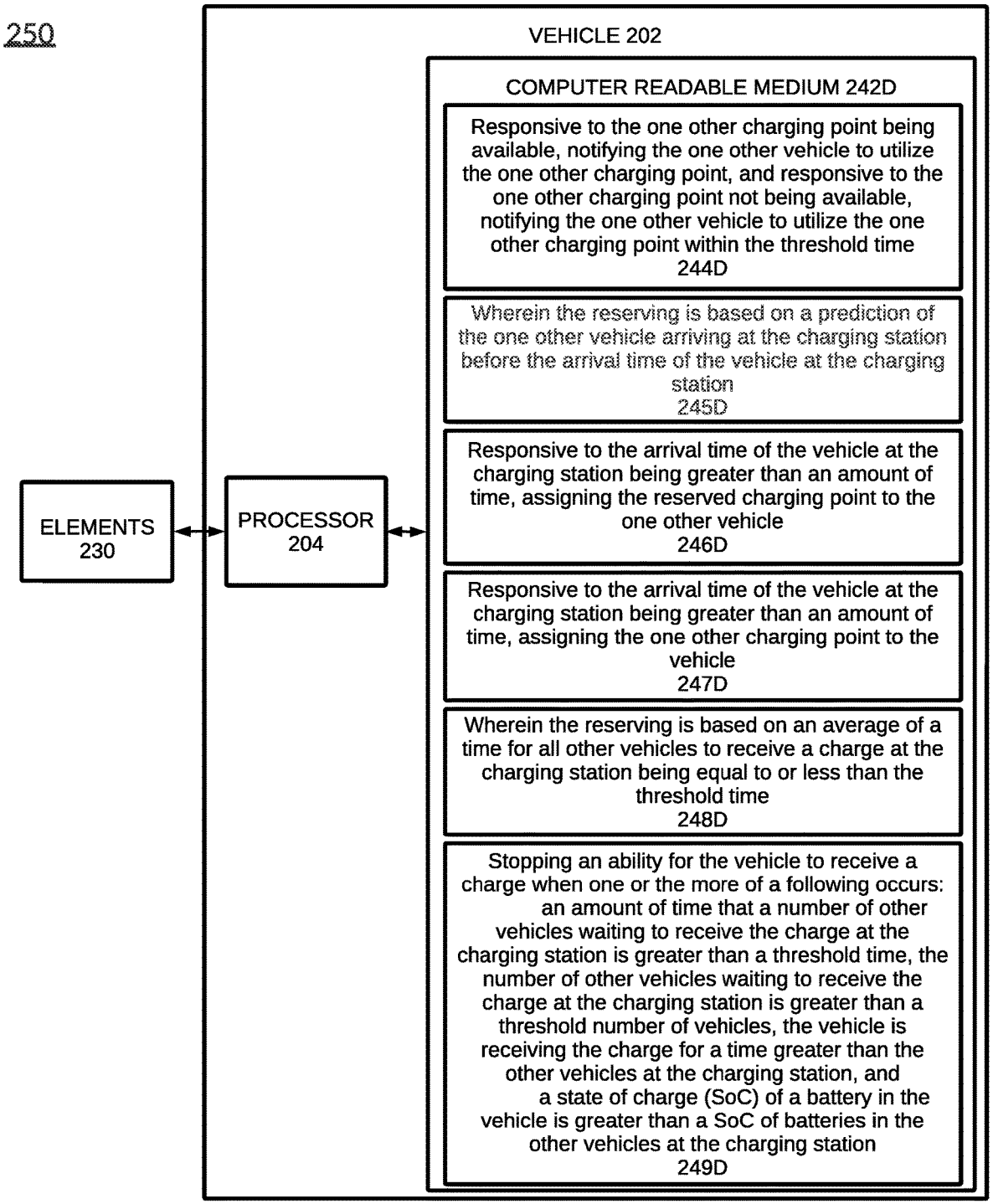
FIG. 2D illustrates a further vehicle network diagram, according to example embodiments.

FIG. 2D illustrates a further vehicle network diagram 250, according to example embodiments. The network comprises elements including a vehicle 202, a processor 204, and a non-transitory computer readable medium 242D. The processor 204 is communicably coupled to the computer readable medium 242D and elements 230 (which were depicted in FIG. 2B). The vehicle 202 may be a vehicle, server or any device with a processor and memory.

The processor 204 performs one or more of responsive to the one other charging point being available, notifying the one other vehicle to utilize the one other charging point, and responsive to the one other charging point not being available, notifying the one other vehicle to utilize the one other charging point within the threshold time 244D, wherein the reserving is based on a prediction of the one other vehicle arriving at the charging station before the arrival time of the vehicle at the charging station 245D, responsive to the arrival time of the vehicle at the charging station being greater than an amount of time, assigning the reserved charging point to the one other vehicle 246D, responsive to the arrival time of the vehicle at the charging station being greater than an amount of time, assigning the one other charging point to the vehicle 247D, wherein the reserving is based on an average of a time for all other vehicles to receive a charge at the charging station being equal to or less than the threshold time 248D, and stopping an ability for the vehicle to receive a charge when one or the more of a following occurs: an amount of time that a number of other vehicles waiting to receive the charge at the charging station is greater than a threshold time, the number of other vehicles waiting to receive the charge at the charging station is greater than a threshold number of vehicles, the vehicle is receiving the charge for a time greater than the other vehicles at the charging station, and a state of charge (SoC) of a battery in the vehicle is greater than a SoC of batteries in the other vehicles at the charging station 249D.

While this example describes in detail only one vehicle 202, multiple such nodes may be connected to the blockchain. It should be understood that the vehicle 202 may include additional components and that some of the components described herein may be removed and/or modified without departing from a scope of the instant application. The vehicle 202 may have a computing device or a server computer, or the like, and may include a processor 204, which may be a semiconductor-based microprocessor, a central processing unit (CPU), an application-specific integrated circuit (ASIC), a field-programmable gate array (FPGA), and/or another hardware device. Although a single processor 204 is depicted, it should be understood that the vehicle 202 may include multiple processors, multiple cores, or the like without departing from the scope of the instant application. The vehicle 202 may be a vehicle, server or any device with a processor and memory.

The processor 204 performs one or more of receiving a confirmation of an event from one or more elements described or depicted herein, wherein the confirmation comprises a blockchain consensus between peers represented by any of the elements and executing a smart contract to record the confirmation on a blockchain-based on the blockchain consensus. Consensus is formed between one or more of any element 230 and/or any element described or depicted herein, including a vehicle, a server, a wireless device, etc. In another example, the vehicle 202 can be one or more of any element 230 and/or any element described or depicted herein, including a server, a wireless device, etc.

The processors and/or computer readable media 242D may fully or partially reside in the interior or exterior of the vehicles. The steps or features stored in the computer readable media 242D may be fully or partially performed by any of the processors and/or elements in any order. Additionally, one or more steps or features may be added, omitted, combined, performed at a later time, etc.

Figure 2E:
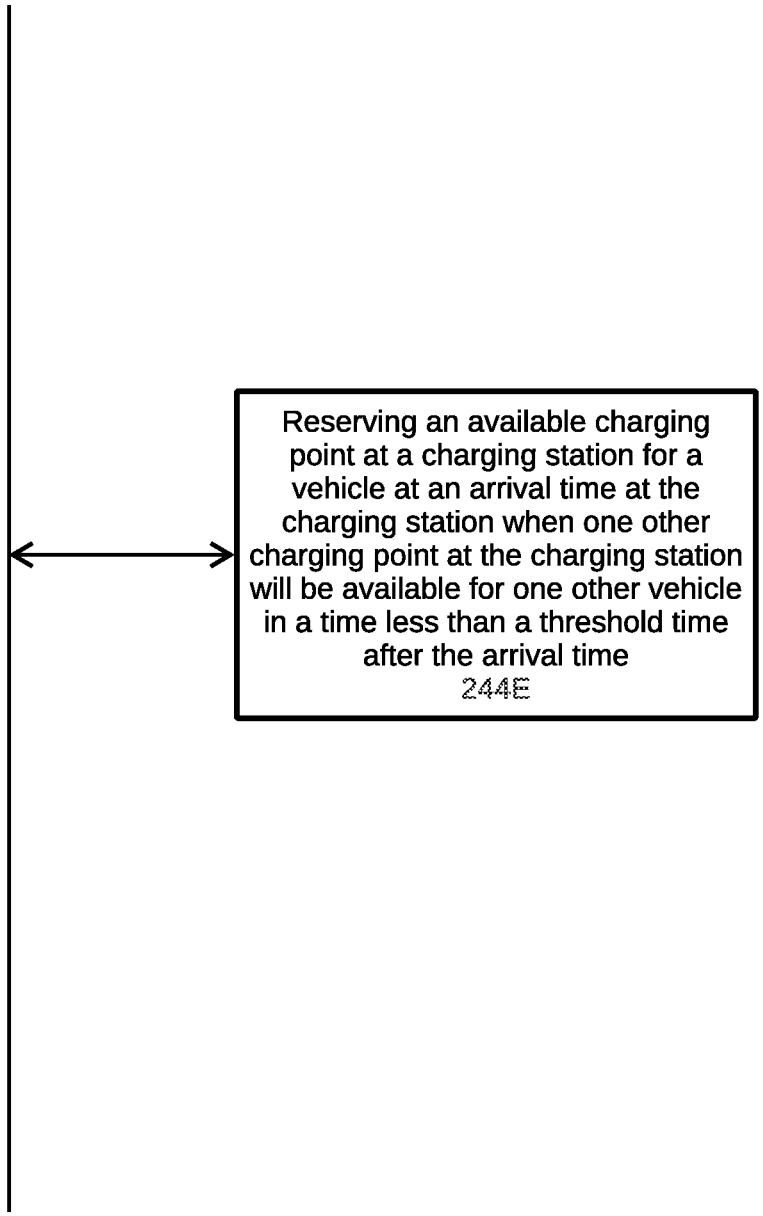
FIG. 2E illustrates a flow diagram, according to example embodiments.

FIG. 2E illustrates a flow diagram 260, according to example embodiments. Referring to FIG. 2E, the instant solution includes one or more of reserving an available charging point at a charging station for a vehicle at an arrival time at the charging station when one other charging point at the charging station will be available for one other vehicle in a time less than a threshold time after the arrival time 244E.

Figure 2F:
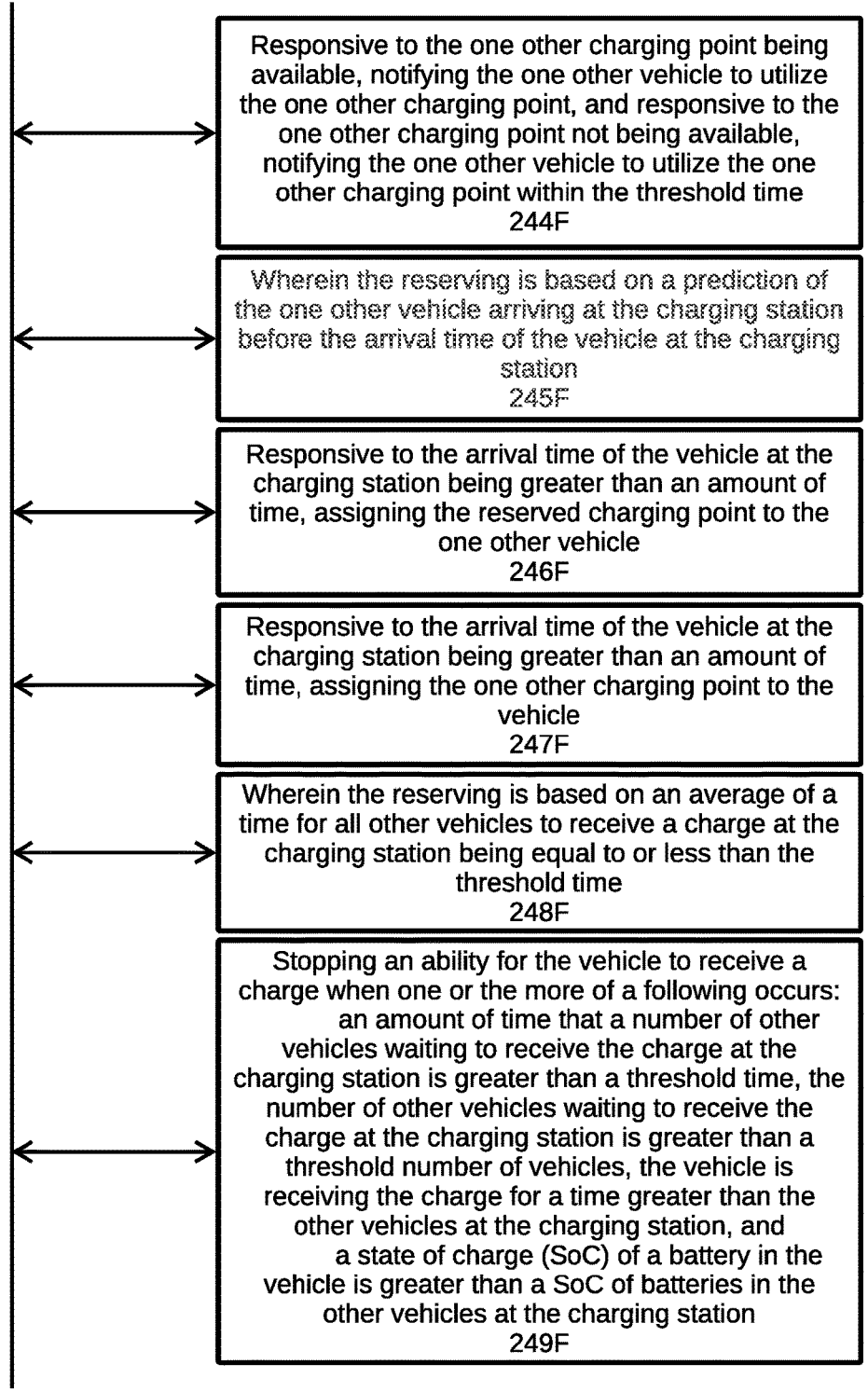
FIG. 2F illustrates another flow diagram, according to example embodiments.

FIG. 2F illustrates another flow diagram 270, according to example embodiments. Referring to FIG. 2F, the instant solution includes one or more of responsive to the one other charging point being available, notifying the one other vehicle to utilize the one other charging point, and responsive to the one other charging point not being available, notifying the one other vehicle to utilize the one other charging point within the threshold time 244F, wherein the reserving is based on a prediction of the one other vehicle arriving at the charging station before the arrival time of the vehicle at the charging station 245F, responsive to the arrival time of the vehicle at the charging station being greater than an amount of time, assigning the reserved charging point to the one other vehicle 246F, responsive to the arrival time of the vehicle at the charging station being greater than an amount of time, assigning the one other charging point to the vehicle 247F, wherein the reserving is based on an average of a time for all other vehicles to receive a charge at the charging station being equal to or less than the threshold time 248F, and stopping an ability for the vehicle to receive a charge when one or the more of a following occurs: an amount of time that a number of other vehicles waiting to receive the charge at the charging station is greater than a threshold time, the number of other vehicles waiting to receive the charge at the charging station is greater than a threshold number of vehicles, the vehicle is receiving the charge for a time greater than the other vehicles at the charging station, and a state of charge (SoC) of a battery in the vehicle is greater than a SoC of batteries in the other vehicles at the charging station 249F.

Figure 3A:
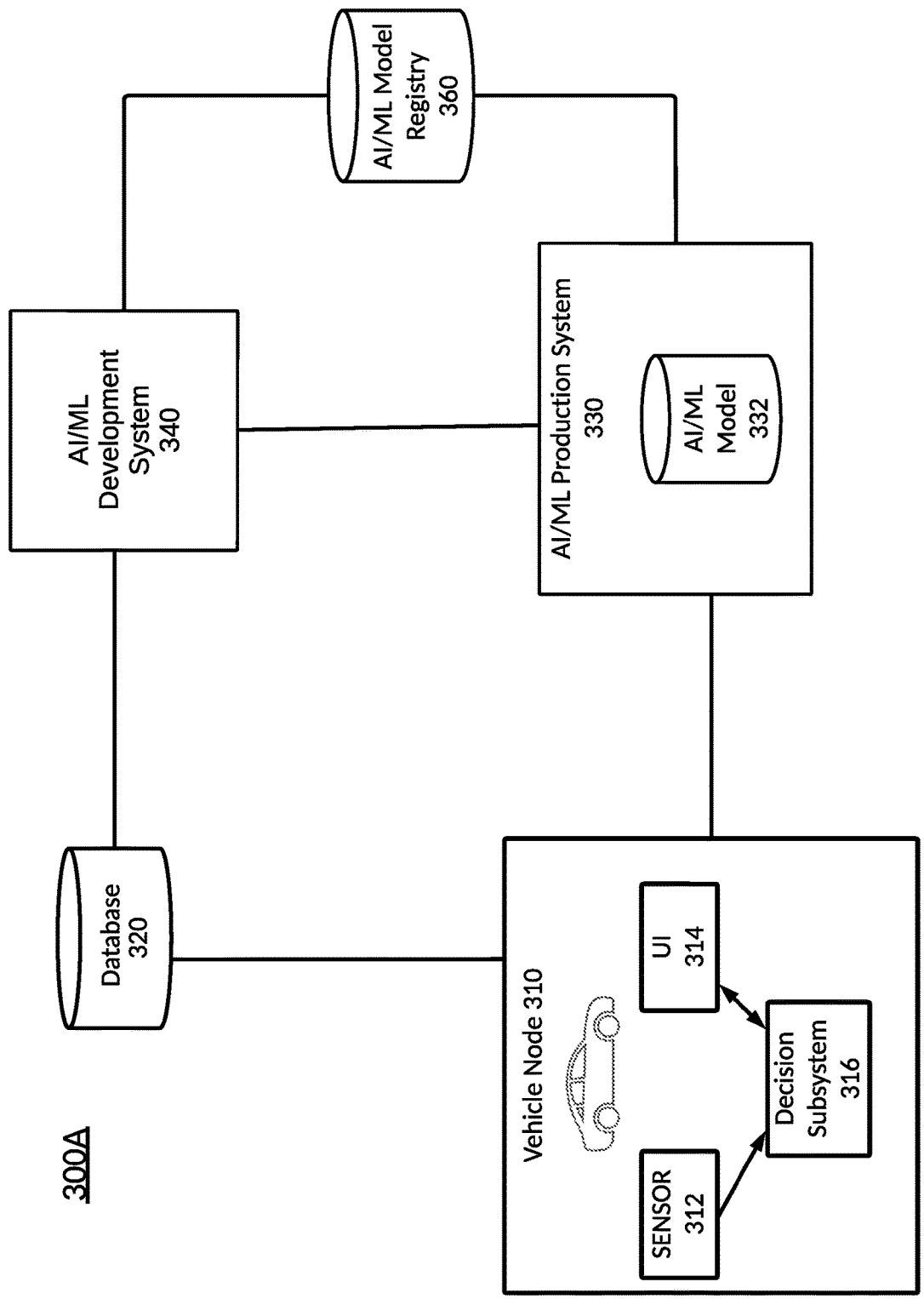
FIG. 3A illustrates a machine learning network diagram, according to example embodiments.

Referring now to FIG. 3A, a diagram depicting a machine learning vehicle network diagram 300A. The machine learning subsystem 306A contains a learning model 308A, which is an artifact created by a machine learning training system 310A that generates predictions by finding patterns in one or more training data sets. In some embodiments, the machine learning subsystem 306A resides in the vehicle node 302A. An artifact is used to describe an output created by a training process, such as a checkpoint, a file, or a model. In other embodiments, the machine learning subsystem 306A resides outside of the vehicle node 302A.

The vehicle 302A sends data from the one or more sensors 304A to the machine learning subsystem 306A. The machine learning subsystem 306A provides the one or more sensor 304A data to the learning model 308A, which returns one or more predictions. The machine learning subsystem 306A sends one or more instructions to the vehicle 302A based on the predictions from the learning model 308A.

In a further embodiment, the vehicle 302A may send the one or more sensor 304A data to the machine learning training system 310A. In yet another example, the machine learning subsystem 306A may send the sensor 304A data to the learning model 308A. One or more of the applications, features, steps, solutions, etc., described and/or depicted herein may utilize the machine learning network as described herein.

The example embodiments may communicate with a host platform 320, as shown in the examples of FIGS. 3B-3E. The system 302 may be hosted by or otherwise communicate with the host platform 320 shown in FIGS. 3B-3E. That is, the methods, systems, and processes described herein may interact with the processes and systems that are shown in the examples shown and described in FIGS. 3B-3E.

Figure 3B:
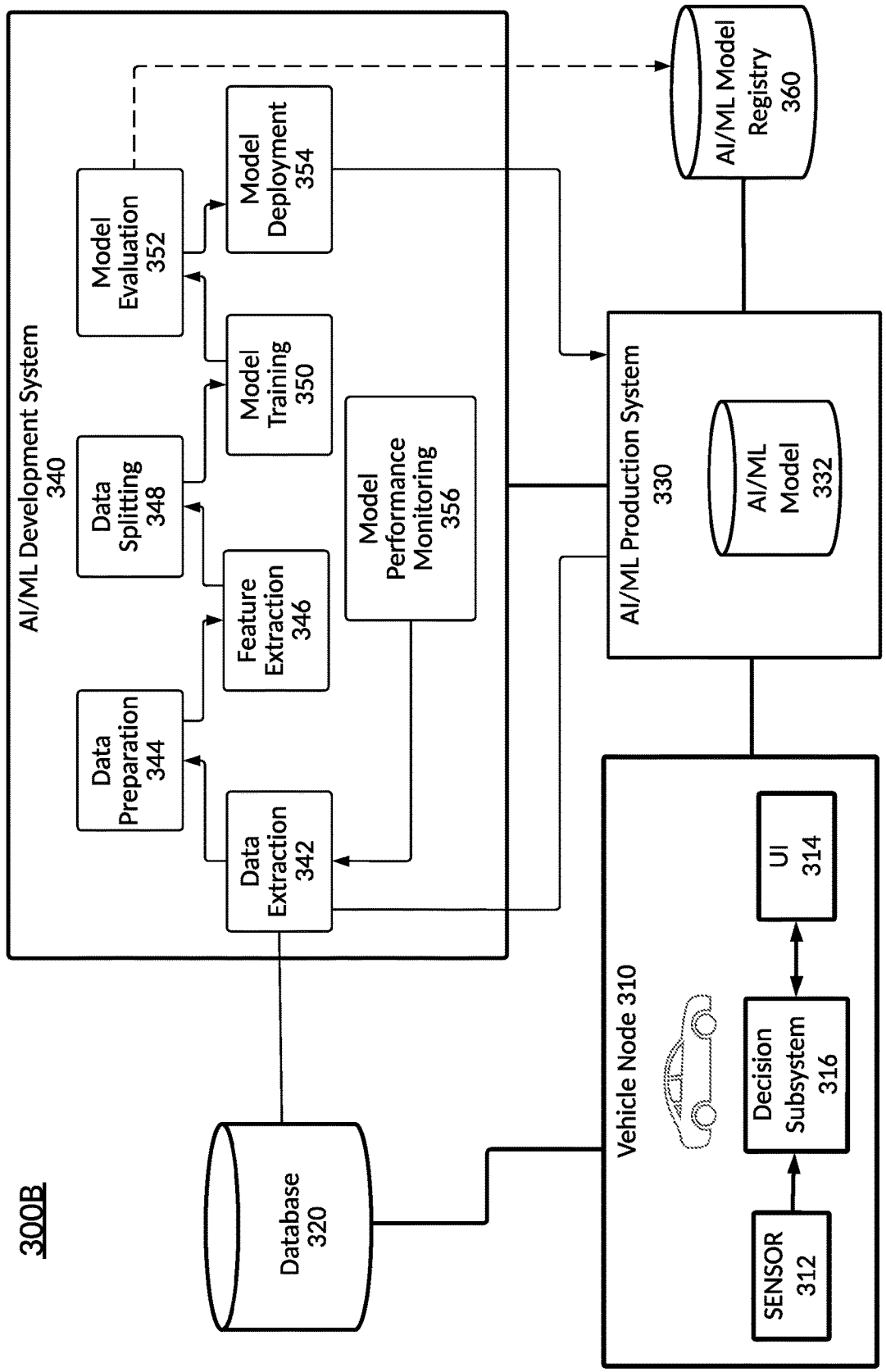
FIG. 3B illustrates another machine learning network diagram, according to example embodiments.

For example, FIG. 3B illustrates a process 300B of executing a machine learning model via the host platform 320. The host platform 320 may host a process 322 within a live runtime environment that is accessible to other software programs, applications, and the like, via a network such as the Internet. Here, the host process 322 may have a uniform resource locator (URL), endpoint, application programming interface (API), etc., which is publicly available on the Internet.

In this example, the host process 322 may control access to and execution of models that are stored within a model repository 323. For example, the models may include artificial intelligence (AI) models, machine learning (ML) models, neural networks, or the like. The system 302 may trigger the execution of a model from the model repository 323 via invocation of an application programming interface (API) 321 of the host process 322. The request may include an identifier of a model or models to be executed, a payload of data (e.g., to be input to the model during execution), and the like. The host process 322 may receive the invocation from the system 302 and retrieve the corresponding model from the model repository 323, deploy the model within a live runtime environment, execute the model on the input data, and return a result of the execution to the system 302. The result of the execution may include an output result from the execution of the model.

In some embodiments, the system 302 may provide feedback from the output provided by the model. For example, a user may input a confirmation that the prediction output by the model is correct or provide a notification that the model is incorrect. This information may be added to the results of execution and stored within a log 324. The log data may include an identifier of the input, an identifier of the output, an identifier of the model used, and feedback from the recipient. This information may be used to subsequently retrain the model, for example, using the model development environment shown in the example of FIG. 3C.

In one embodiment, the host process 322 may include Generative AI (GenAI), which may be used by the instant solution in the transformation of data. Vehicles may be equipped with diverse sensors, cameras, radars, and LIDARs, which collect a vast array of data, such as images, speed readings, GPS data, and acceleration metrics. However, raw data, once acquired, undergoes preprocessing that may involve normalization, anonymization, missing value imputation, or noise reduction to allow the data to be further used effectively.

The GenAI may execute data augmentation following the preprocessing of the data. Due to the limitation of datasets in capturing the vast complexity of real-world vehicle scenarios, augmentation tools are employed to expand the dataset. This might involve image-specific transformations like rotations, translations, or brightness adjustments. For non-image data, techniques like jittering can be used to introduce synthetic noise, simulating a broader set of conditions.

In the instant solution, data generation may be then performed on the data. Tools like Generative Adversarial Networks (GANs) and Variational Autoencoders (VAEs) are trained on existing datasets to generate new, plausible data samples. For example, GANs might be tasked with crafting images showcasing vehicles in uncharted conditions or from unique perspectives. As another example, the synthesis of sensor data may be performed to model and create synthetic readings for such scenarios, enabling thorough system testing without actual physical encounters.

A critical step in the use of GenAI, given the safety-critical nature of vehicles, is validation. This validation might include the output data being compared with real-world datasets or using specialized tools like a GAN's discriminator to gauge the realism of the crafted samples.

Figure 3C:
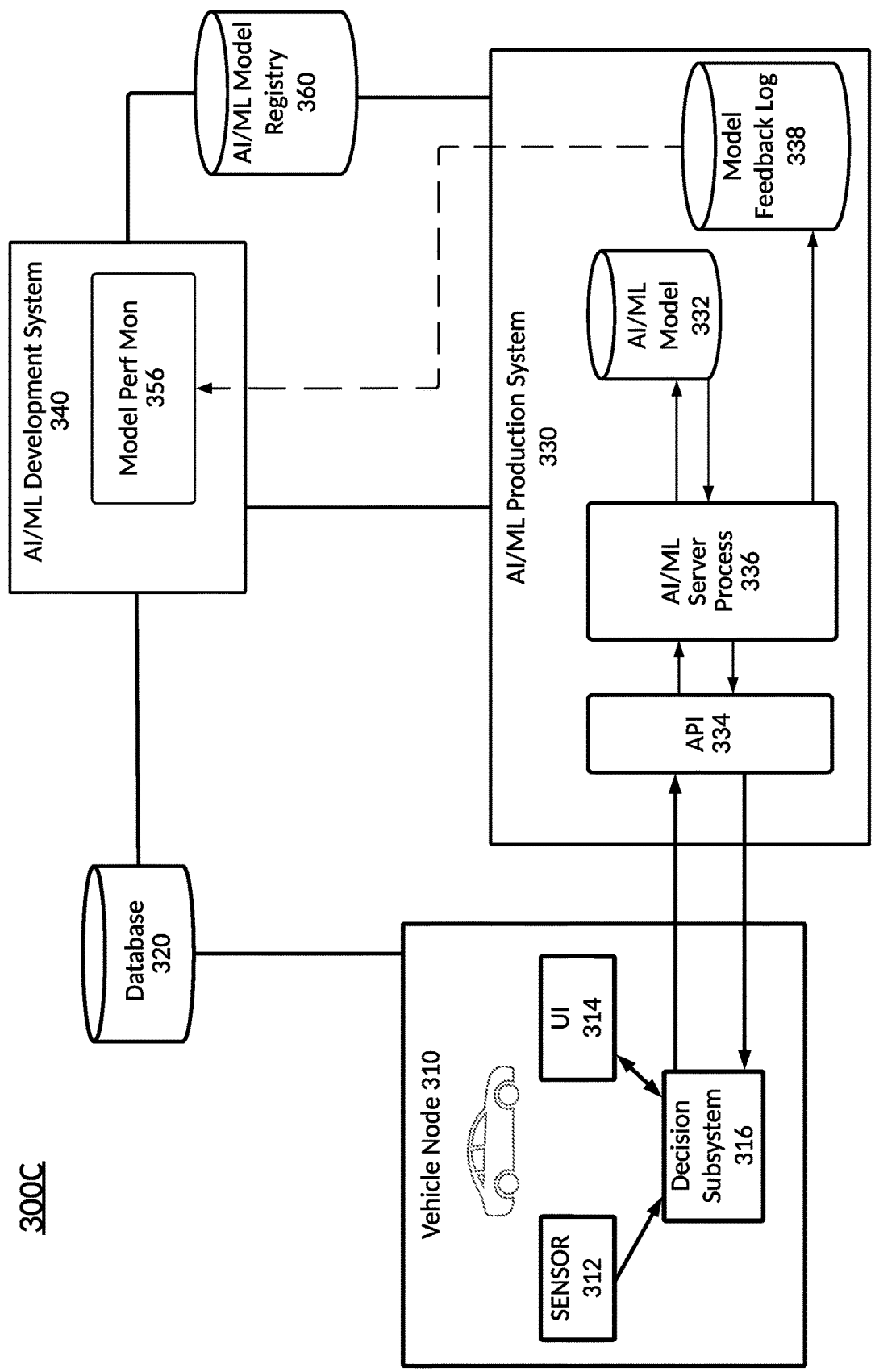
FIG. 3C illustrates yet another machine learning network diagram, according to example embodiments.

FIG. 3C illustrates a process 300C of training a machine learning model 330 according to example embodiments. Referring to FIG. 3C, the host platform 320 may host an integrated development environment (IDE) 340 where machine learning models, AI models, and the like may be developed, trained, retrained, and the like. In this example, the IDE 340 may include a software application with a user interface accessible by the system 302. For example, the IDE 340 may be embodied as a web application that can be accessed by a device at a network address, URL, etc. As another example, the IDE 340 may be locally or remotely installed on a computing device used by a user.

The process 300C may be used to design a model (via a user interface of the IDE), such as a machine learning model, etc. The model can then be executed/trained based on the training data established via the user interface. For example, the user interface may be used to build a new model. The training data for training such a new model may be provided from a training data store 325, which includes training samples from the web, from customers, and the like. Here, the model is executed on the training data via the host platform 320 to generate a result. The execution of the model causes the model to learn based on the input training data. When the model is fully trained, it may be stored within the model repository 323 via the IDE 340, or the like.

As another example, the IDE 340 may be used to retrain an existing model. Here, the training process may use executional results previously generated/output by the model 330 (including any feedback, etc.) to retrain the model 330. For example, predicted outputs that are identified as accurate, best, good, etc., may be distinguished from outputs that are inaccurate, incorrect, bad, etc. One or more of these types of outputs can be identified and used for retraining the model to help the model provide better outputs.

A number of the decisions/steps related to the instant solution include: reserving an available charging point at a charging station for a vehicle at an arrival time at the charging station when one other charging point at the charging station will be available for one other vehicle in a time less than a threshold time after the arrival time, responsive to the one other charging point being available, notifying the one other vehicle to utilize the one other charging point, and responsive to the one other charging point not being available, notifying the one other vehicle to utilize the one other charging point within the threshold time, wherein the reserving is based on a prediction of the one other vehicle arriving at the charging station before the arrival time of the vehicle at the charging station, responsive to the arrival time of the vehicle at the charging station being greater than an amount of time, assigning the reserved charging point to the one other vehicle, responsive to the arrival time of the vehicle at the charging station being greater than an amount of time, assigning the one other charging point to the vehicle, wherein the reserving is based on an average of a time for all other vehicles to receive a charge at the charging station being equal to or less than the threshold time, and stopping an ability for the vehicle to receive a charge when one or the more of a following occurs: an amount of time that a number of other vehicles waiting to receive the charge at the charging station is greater than a threshold time, the number of other vehicles waiting to receive the charge at the charging station is greater than a threshold number of vehicles, the vehicle is receiving the charge for a time greater than the other vehicles at the charging station, and a state of charge (SoC) of a battery in the vehicle is greater than a SoC of batteries in the other vehicles at the charging station. For any of these decisions/steps, the AI/ML production system 330, may be used to assist in its decision-making process, validating the decisions/steps and making them more efficient in the manner described or depicted herein.

Figure 3D:
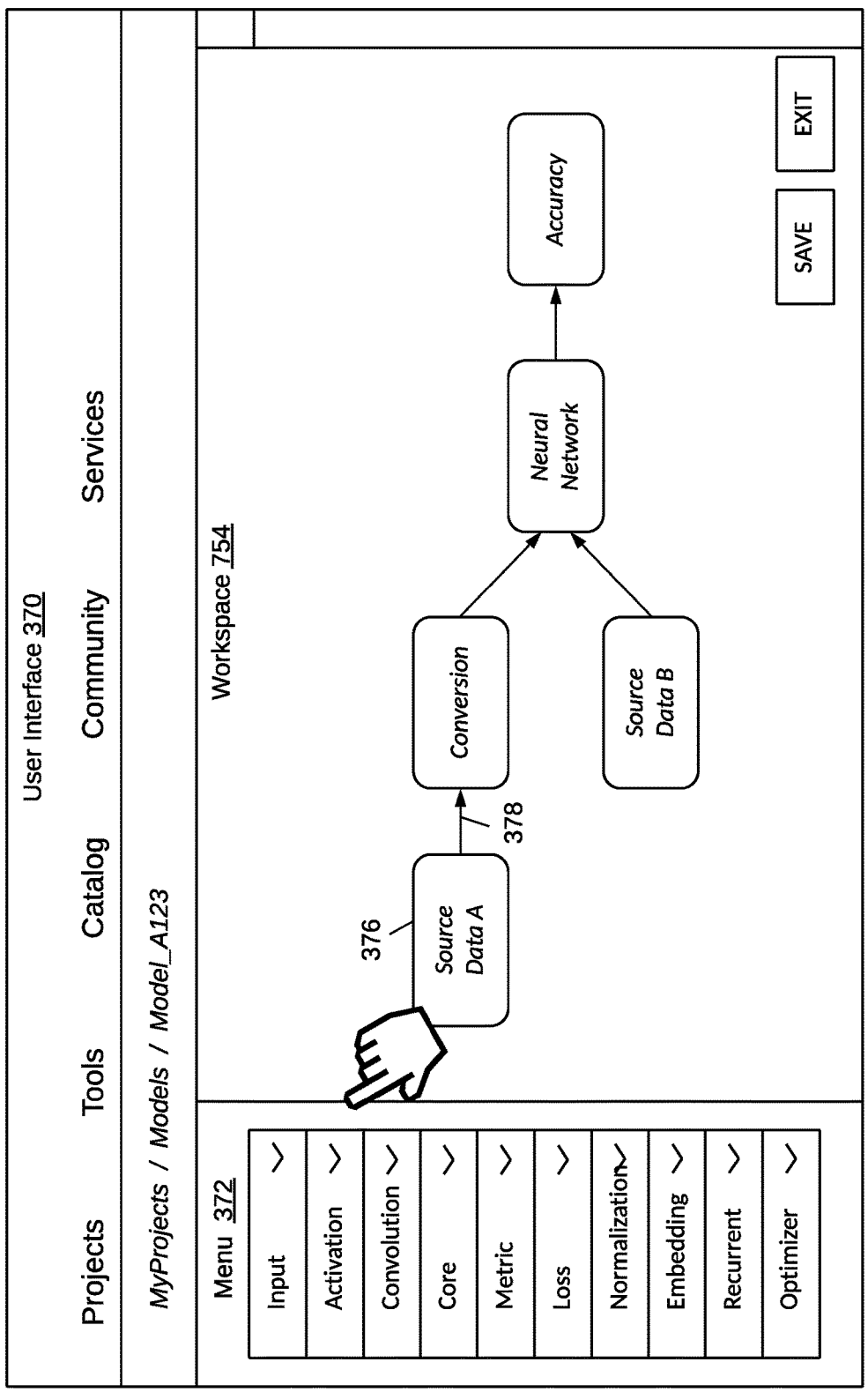
FIG. 3D illustrates a further machine learning network diagram, according to example embodiments.

FIG. 3D illustrates a process 300D of designing a new machine learning model via a user interface 370 of the system according to example embodiments. As an example, a model may be output as part of the AI/ML Development System 340. Referring to FIG. 3D, a user can use an input mechanism from a menu 372 of a user interface 370 to add pieces/components to a model being developed within a workspace 374 of the user interface 370.

The menu 372 includes a plurality of graphical user interface (GUI) menu options which can be selected to reveal additional components that can be added to the model design shown in the workspace 374. The GUI menu includes options for adding elements to the workspace, such as features which may include neural networks, machine learning models, AI models, data sources, conversion processes (e.g., vectorization, encoding, etc.), analytics, etc. The user can continue to add features to the model and connect them using edges or other means to create a flow within the workspace 374. For example, the user may add a node 376 to a flow of a new model within the workspace 374. For example, the user may connect the node 376 to another node in the diagram via an edge 378, creating a dependency within the diagram. When the user is done, the user can save the model for subsequent training/testing.

In another example, the name of the object can be identified from a web page or a user interface 370 where the object is visible within a browser or the workspace 374 on the user device. A pop-up within the browser or the workspace 374 can be overlayed where the object is visible, which includes an option to navigate to the identified web page corresponding to the alternative object via a rule set.

Figure 3E:
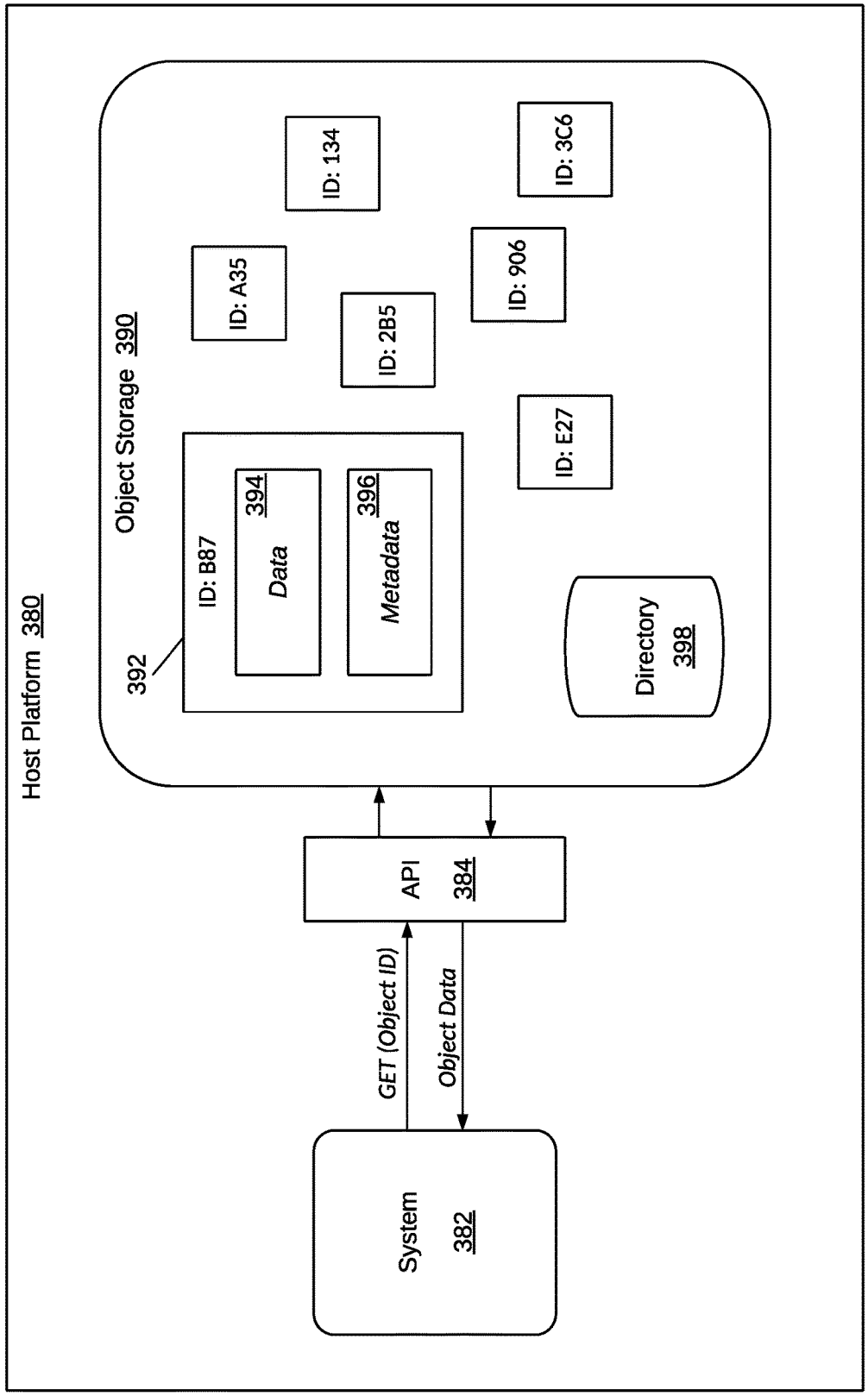
FIG. 3E illustrates a machine learning network diagram, according to example embodiments.

FIG. 3E illustrates a process 300E of accessing an object 392 from an object storage 390 of the host platform 380 according to example embodiments. For example, the object storage 390 may store data that is used by the AI models and machine learning (ML) models, training data, expected outputs for testing, training results, and the like. The object storage 390 may also store any other kind of data. Each object may include a unique identifier, a data section 394, and a metadata section 396, which provide a descriptive context associated with the data, including data that can later be extracted for purposes of machine learning. The unique identifier may uniquely identify an object with respect to all other objects in the object storage 390. The data section 394 may include unstructured data such as web pages, digital content, images, audio, text, and the like.

Instead of breaking files into blocks stored on disks in a file system, the object storage 390 handles objects as discrete units of data stored in a structurally flat data environment. Here, the object storage may not use folders, directories, or complex hierarchies. Instead, each object may be a simple, self-contained repository that includes the data, the metadata, and the unique identifier that a client application can use to locate and access it. In this case, the metadata is more descriptive than a file-based approach. The metadata can be customized with additional context that can later be extracted and leveraged for other purposes, such as data analytics.

The objects that are stored in the object storage 390 may be accessed via an API 384. The API 384 may be a Hypertext Transfer Protocol (HTTP)-based RESTful API (also known as a RESTful Web service). The API 384 can be used by the client application to query an object's metadata to locate the desired object (data) via the Internet from anywhere on any device. The API 384 may use HTTP commands such as "PUT" or "POST" to upload an object, "GET" to retrieve an object, "DELETE" to remove an object, and the like.

The object storage 390 may provide a directory 398 that uses the metadata of the objects to locate appropriate data files. The directory 398 may contain descriptive information about each object stored in the object storage 390, such as a name, a unique identifier, a creation timestamp, a collection name, etc. To query the object within the object storage 390, the client application may submit a command, such as an HTTP command, with an identifier of the object 392, a payload, etc. The object storage 390 can store the actions and results described herein, including associating two or more lists of ranked assets with one another based on variables used by the two or more lists of ranked assets that have a correlation above a predetermined threshold.

Figure 4A:
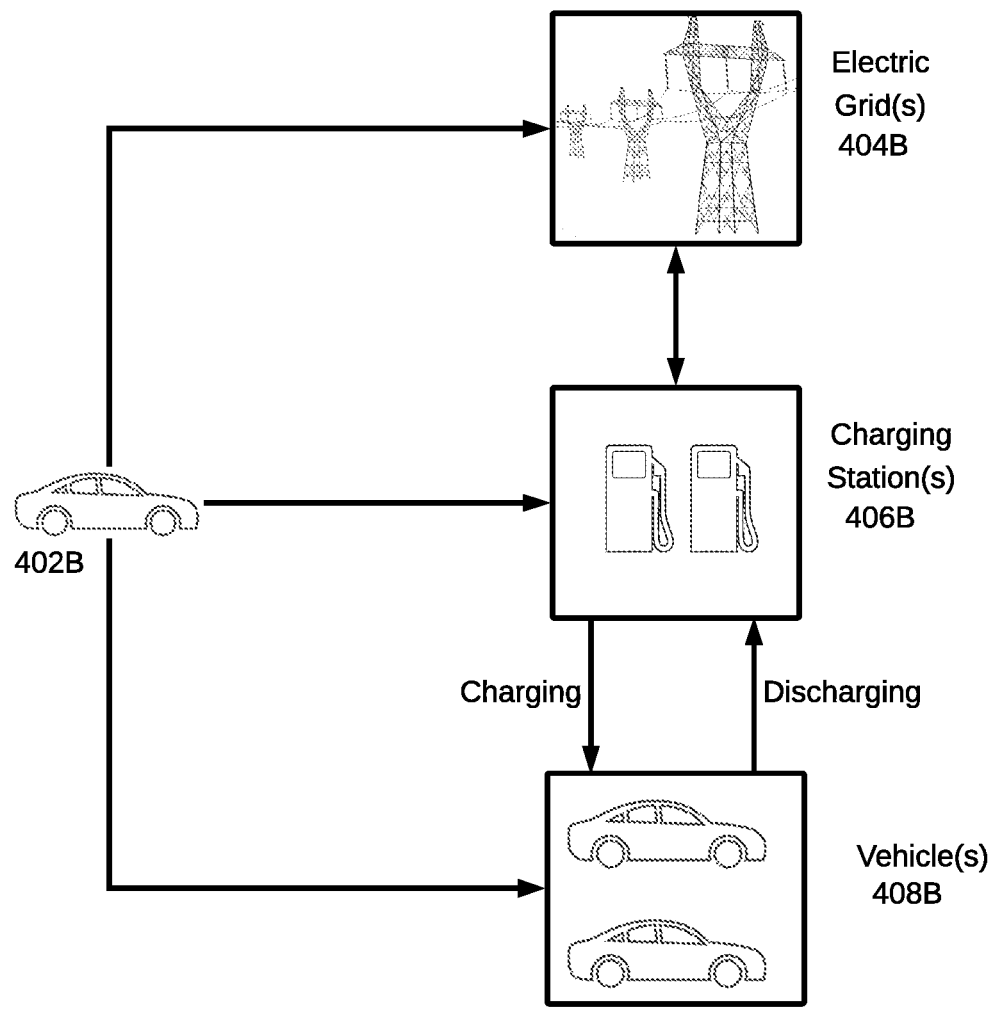
FIG. 4A illustrates a diagram depicting electrification of one or more elements, according to example embodiments.

FIG. 4A illustrates a diagram 400A depicting the electrification of one or more elements. In one example, a vehicle 402B may provide power stored in its batteries to one or more elements, including other vehicle(s) 408B, charging station(s) 406B, and electric grid(s) 404B. The electric grid(s) 404B is/are coupled to one or more of the charging stations 406B, which may be coupled to one or more of the vehicles 408B. This configuration allows the distribution of electricity/power received from the vehicle 402B. The vehicle 402B may also interact with the other vehicle(s) 408B, such as via Vehicle to Vehicle (V2V) technology, communication over cellular, Wi-Fi, and the like. The vehicle 402B may also interact wirelessly and/or wired with other vehicles 408B, the charging station(s) 406B and/or with the electric grid(s) 404B. In one example, the vehicle 402B is routed (or routes itself) in a safe and efficient manner to the electric grid(s) 404B, the charging station(s) 406B, or the other vehicle(s) 408B. Using one or more embodiments of the instant solution, the vehicle 402B can provide energy to one or more of the elements depicted herein in various advantageous ways as described and/or depicted herein. Further, the safety and efficiency of the vehicle may be increased, and the environment may be positively affected as described and/or depicted herein.

The term 'energy', 'electricity', 'power', and the like may be used to denote any form of energy received, stored, used, shared, and/or lost by the vehicles(s). The energy may be referred to in conjunction with a voltage source and/or a current supply of charge provided from an entity to the vehicle(s) during a charge/use operation. Energy may also be in the form of fossil fuels (for example, for use with a hybrid vehicle) or via alternative power sources, including but not limited to lithium-based, nickel-based, hydrogen fuel cells, atomic/nuclear energy, fusion-based energy sources, and energy generated during an energy sharing and/or usage operation for increasing or decreasing one or more vehicles energy levels at a given time.

In one example, the charging station 406B manages the amount of energy transferred from the vehicle 402B such that there is sufficient charge remaining in the vehicle 402B to arrive at a destination. In one example, a wireless connection is used to wirelessly direct an amount of energy transfer between vehicles 408B, wherein the vehicles may both be in motion. In one embodiment, wireless charging may occur via a fixed charger and batteries of the vehicle in alignment with one another (such as a charging mat in a garage or parking space). In one example, an idle vehicle, such as a vehicle 402B (which may be autonomous) is directed to provide an amount of energy to a charging station 406B and return to the original location (for example, its original location or a different destination). In one example, a mobile energy storage unit (not shown) is used to collect surplus energy from at least one other vehicle 408B and transfer the stored surplus energy at a charging station 406B. In one example, factors determine an amount of energy to transfer to a charging station 406B, such as distance, time, as well as traffic conditions, road conditions, environmental/weather conditions, the vehicle's condition (weight, etc.), an occupant(s) schedule while utilizing the vehicle, a prospective occupant(s) schedule waiting for the vehicle, etc. In one example, the vehicle(s) 408B, the charging station(s) 406B and/or the electric grid(s) 404B can provide energy to the vehicle 402B.

In one embodiment, a location such as a building, a residence, or the like (not depicted), communicably coupled to one or more of the electric grid 404B, the vehicle 402B, and/or the charging station(s) 406B. The rate of electric flow to one or more of the location, the vehicle 402B, the other vehicle(s) 408B is modified, depending on external conditions, such as weather. For example, when the external temperature is extremely hot or extremely cold, raising the chance for an outage of electricity, the flow of electricity to a connected vehicle 402B/408B is slowed to help minimize the chance for an outage.

In one embodiment, vehicles 402B and 408B may be utilized as bidirectional vehicles. Bidirectional vehicles are those that may serve as mobile microgrids that can assist in the supplying of electrical power to the grid 404B and/or reduce the power consumption when the grid is stressed. Bidirectional vehicles incorporate bidirectional charging, which in addition to receiving a charge to the vehicle, the vehicle can transfer energy from the vehicle to the grid 404B, otherwise referred to as "V2G". In bidirectional charging, the electricity flows both ways, to the vehicle and from the vehicle. When a vehicle is charged, alternating current (AC) electricity from the grid 404B is converted to direct current (DC). This may be performed by one or more of the vehicle's own converter or a converter on the charging station 406B. The energy stored in the vehicle's batteries may be sent in an opposite direction back to the grid. The energy is converted from DC to AC through a converter usually located in the charging station 406B, otherwise referred to as a bidirectional charger. Further, the instant solution as described and depicted with respect to FIG. 4B can be utilized in this and other networks and/or systems.

Figure 4B:
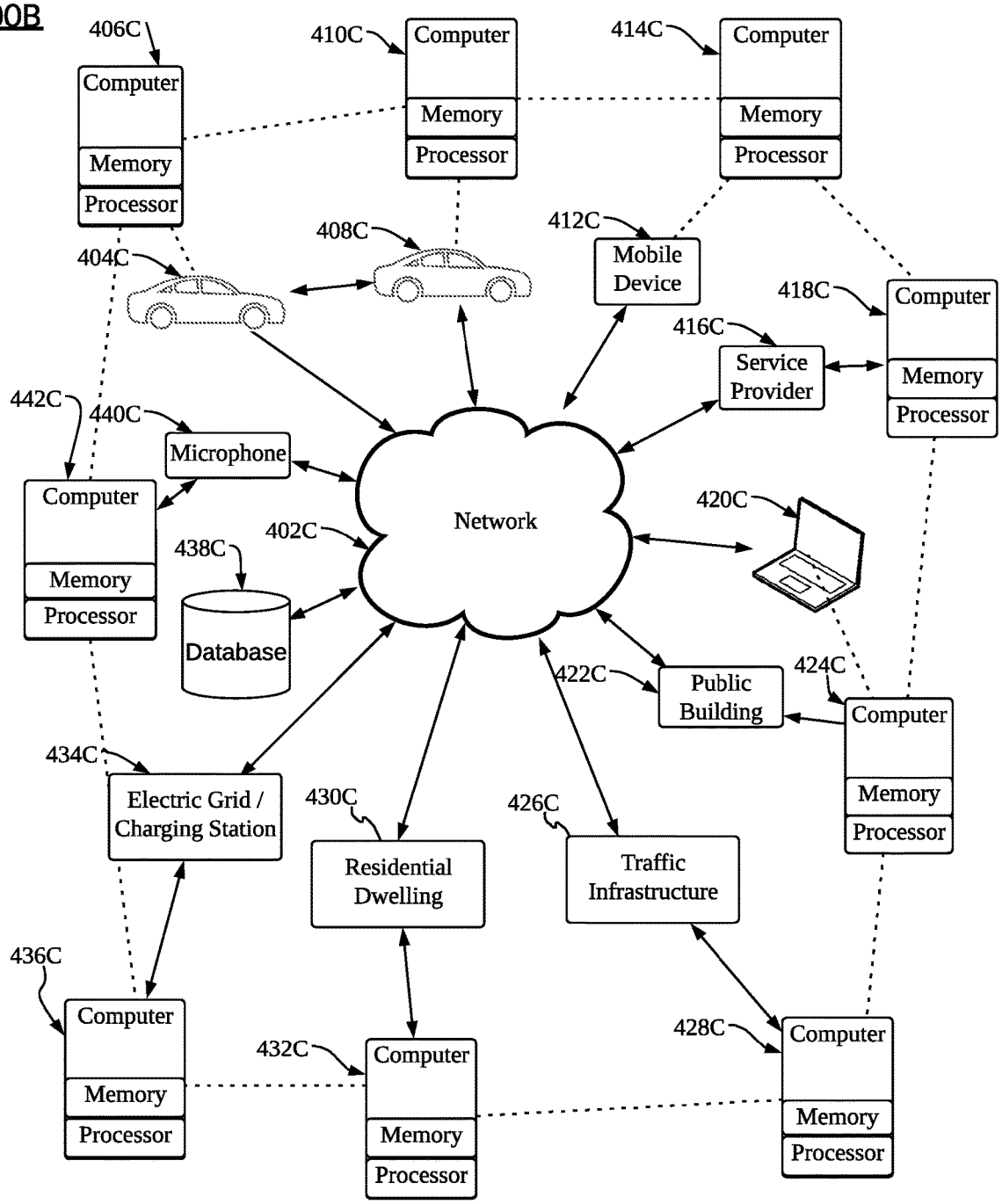
FIG. 4B illustrates a diagram depicting interconnections between different elements, according to example embodiments.

FIG. 4B is a diagram showing interconnections between different elements 400B. The instant solution may be stored and/or executed entirely or partially on and/or by one or more computing devices 414C, 418C, 424C, 428C, 432C, 436C, 406C, 442C, and 410C associated with various entities, all communicably coupled and in communication with a network 402C. A database 438C is communicably coupled to the network and allows for the storage and retrieval of data. In one example, the database is an immutable ledger. One or more of the various entities may be a vehicle 404C, one or more service provider 416C, one or more public buildings 422C, one or more traffic infrastructure 426C, one or more residential dwellings 430C, an electric grid/charging station 434C, a microphone 440C, and/or another vehicle 408C. Other entities and/or devices, such as one or more private users using a smartphone 412C, a laptop 420C, an augmented reality (AR) device, a virtual reality (VR) device, and/or any wearable device may also interwork with the instant solution. The smartphone 412C, laptop 420C, the microphone 440C, and other devices may be connected to one or more of the connected computing devices 414C, 418C, 424C, 428C, 432C, 436C, 406C, 442C, and 410C. The one or more public buildings 422C may include various agencies. The one or more public buildings 422C may utilize a computing device 424C. The one or more service provider 416C may include a dealership, a tow truck service, a collision center, or other repair shop. The one or more service provider 416C may utilize a computing apparatus 418C. These various computer devices may be directly and/or communicably coupled to one another, such as via wired networks, wireless networks, blockchain networks, and the like. The microphone 440C may be utilized as a virtual assistant, in one example. In one example, the one or more traffic infrastructure 426C may include one or more traffic signals, one or more sensors including one or more cameras, vehicle speed sensors or traffic sensors, and/or other traffic infrastructure. The one or more traffic infrastructure 426C may utilize a computing device 428C.

In one embodiment, anytime an electrical charge is given or received to/from a charging station and/or an electrical grid, the entities that allow that to occur are one or more of a vehicle, a charging station, a server, and a network communicably coupled to the vehicle, the charging station, and the electrical grid.

In one example, a vehicle 408C/404C can transport a person, an object, a permanently or temporarily affixed apparatus, and the like. In one example, the vehicle 408C may communicate with vehicle 404C via V2V communication through the computers associated with each vehicle 406C and 410C and may be referred to as a car, vehicle, automobile, and the like. The vehicle 404C/408C may be a self-propelled wheeled conveyance, such as a car, a sports utility vehicle, a truck, a bus, a van, or other motor or battery-driven or fuel cell-driven vehicle. For example, vehicle 404C/408C may be an electric vehicle, a hybrid vehicle, a hydrogen fuel cell vehicle, a plug-in hybrid vehicle, or any other type of vehicle with a fuel cell stack, a motor, and/or a generator. Other examples of vehicles include bicycles, scooters, trains, planes, boats, and any other form of conveyance that is capable of transportation. The vehicle 404C/408C may be semi-autonomous or autonomous. For example, vehicle 404C/408C may be self-maneuvering and navigate without human input. An autonomous vehicle may have and use one or more sensors and/or a navigation unit to drive autonomously. All the data described or depicted herein can be stored, analyzed, processed and/or forwarded by one or more of the elements in FIG. 4B.

Figure 4C:
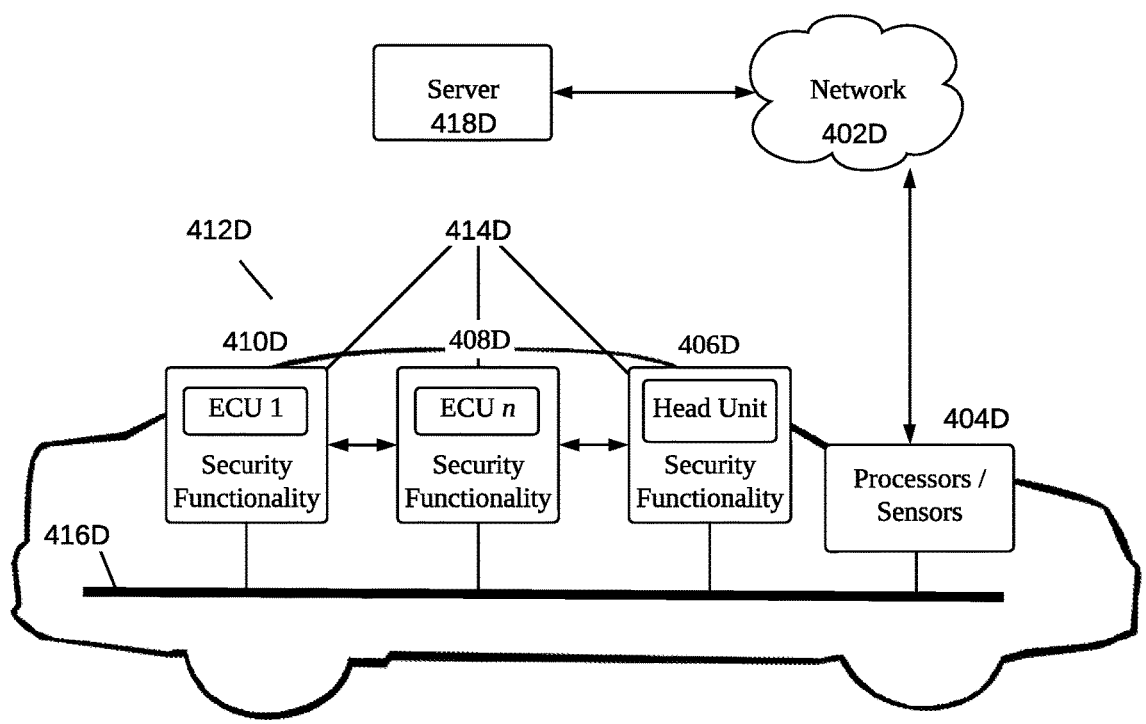
FIG. 4C illustrates a further diagram depicting interconnections between different elements, according to example embodiments.

FIG. 4C is another block diagram showing interconnections between different elements in one example 400C. A vehicle 412D is presented and includes ECUs 410D, 408D, and a Head Unit (otherwise known as an Infotainment System) 406D. An Electrical Control Unit (ECU) is an embedded system in automotive electronics controlling one or more of the electrical systems or subsystems in a vehicle. ECUs may include but are not limited to the management of a vehicle's engine, brake system, gearbox system, door locks, dashboard, airbag system, infotainment system, electronic differential, and active suspension. ECUs are connected to the vehicle's Controller Area Network (CAN) bus 416D. The ECUs may also communicate with a vehicle computer 404D via the CAN bus 416D. The vehicle's processors/sensors (such as the vehicle computer) 404D can communicate with external elements, such as a server 418D via a network 402D (such as the Internet). Each ECU 410D, 408D, and Head Unit 406D may contain its own security policy. The security policy defines permissible processes that can be executed in the proper context. In one example, the security policy may be partially or entirely provided in the vehicle computer 404D.

ECUs 410D, 408D, and Head Unit 406D may each include a custom security functionality element 414D defining authorized processes and contexts within which those processes are permitted to run. Context-based authorization to determine validity if a process can be executed allows ECUs to maintain secure operation and prevent unauthorized access from elements such as the vehicle's Controller Area Network (CAN Bus). When an ECU encounters a process that is unauthorized, that ECU can block the process from operating. Automotive ECUs can use different contexts to determine whether a process is operating within its permitted bounds, such as proximity contexts, nearby objects, distance to approaching objects, speed, and trajectory relative to other moving objects, and operational contexts such as an indication of whether the vehicle is moving or parked, the vehicle's current speed, the transmission state, user-related contexts such as devices connected to the transport via wireless protocols, use of the infotainment, cruise control, parking assist, driving assist, location-based contexts, and/or other contexts.

Figure 4D:
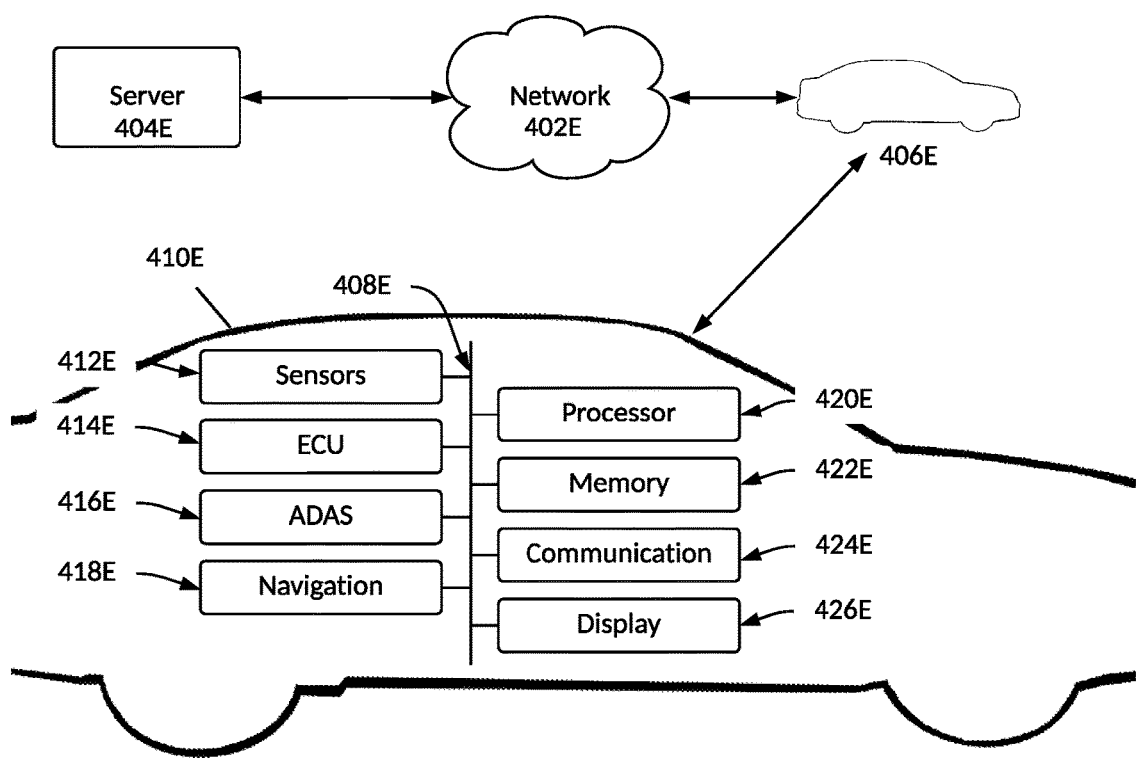
FIG. 4D illustrates yet a further diagram depicting interconnections between elements, according to example embodiments.

Referring to FIG. 4D, an operating environment 400D for a connected vehicle, is illustrated according to some embodiments. As depicted, the vehicle 410E includes a Controller Area Network (CAN) bus 408E connecting elements 412E-426E of the vehicle. Other elements may be connected to the CAN bus and are not depicted herein. The depicted elements connected to the CAN bus include a sensor set 412E, Electronic Control Units 414E, autonomous features or Advanced Driver Assistance Systems (ADAS) 416E, and the navigation system 418E. In some embodiments, the vehicle 410E includes a processor 420E, a memory 422E, a communication unit 424E, and an electronic display 426E.

The processor 420E includes an arithmetic logic unit, a microprocessor, a general-purpose controller, and/or a similar processor array to perform computations and provide electronic display signals to a display unit 426E. The processor 420E processes data signals and may include various computing architectures, including a complex instruction set computer (CISC) architecture, a reduced instruction set computer (RISC) architecture, or an architecture implementing a combination of instruction sets. The vehicle 410E may include one or more processors 420E. Other processors, operating systems, sensors, displays, and physical configurations that are communicably coupled to one another (not depicted) may be used with the instant solution.

Memory 422E is a non-transitory memory storing instructions or data that may be accessed and executed by the processor 420E. The instructions and/or data may include code to perform the techniques described herein. The memory 422E may be a dynamic random-access memory (DRAM) device, a static random-access memory (SRAM) device, flash memory, or another memory device. In some embodiments, the memory 422E also may include non-volatile memory or a similar permanent storage device and media, which may include a hard disk drive, a floppy disk drive, a compact disc read only memory (CD-ROM) device, a digital versatile disk read only memory (DVD-ROM) device, a digital versatile disk random access memory (DVD-RAM) device, a digital versatile disk rewritable (DVD-RW) device, a flash memory device, or some other mass storage device for storing information on a permanent basis. A portion of the memory 422E may be reserved for use as a buffer or virtual random-access memory (RAM). The vehicle 410E may include one or more memories 422E without deviating from the current solution.

The memory 422E of the vehicle 410E may store one or more of the following types of data: navigation route data 418E, and autonomous features data 416E. In some embodiments, the memory 422E stores data that may be necessary for the navigation application 418E to provide the functions.

The navigation system 418E may describe at least one navigation route including a start point and an endpoint. In some embodiments, the navigation system 418E of the vehicle 410E receives a request from a user for navigation routes wherein the request includes a starting point and an ending point. The navigation system 418E may query a real-time data server 404E (via a network 402E), such as a server that provides driving directions, for navigation route data corresponding to navigation routes, including the start point and the endpoint. The real-time data server 404E transmits the navigation route data to the vehicle 410E via a wireless network 402E, and the communication system 424E stores the navigation data 418E in the memory 422E of the vehicle 410E.

The ECU 414E controls the operation of many of the systems of the vehicle 410E, including the ADAS systems 416E. The ECU 414E may, responsive to instructions received from the navigation system 418E, deactivate any unsafe and/or unselected autonomous features for the duration of a journey controlled by the ADAS systems 416E. In this way, the navigation system 418E may control whether ADAS systems 416E are activated or enabled so that they may be activated for a given navigation route.

The sensor set 412E may include any sensors in the vehicle 410E generating sensor data. For example, the sensor set 412E may include short-range sensors and long-range sensors. In some embodiments, the sensor set 412E of the vehicle 410E may include one or more of the following vehicle sensors: a camera, a light detection and ranging (Lidar) sensor, an ultrasonic sensor, an automobile engine sensor, a radar sensor, a laser altimeter, a manifold absolute pressure sensor, an infrared detector, a motion detector, a thermostat, a sound detector, a carbon monoxide sensor, a carbon dioxide sensor, an oxygen sensor, a mass airflow sensor, an engine coolant temperature sensor, a throttle position sensor, a crankshaft position sensor, a valve timer, an air-fuel ratio meter, a blind spot meter, a curb feeler, a defect detector, a Hall effect sensor, a parking sensor, a radar gun, a speedometer, a speed sensor, a tire-pressure monitoring sensor, a torque sensor, a transmission fluid temperature sensor, a turbine speed sensor (TSS), a variable reluctance sensor, a vehicle speed sensor (VSS), a water sensor, a wheel speed sensor, a global positioning system (GPS) sensor, a mapping functionality, and any other type of automotive sensor. The navigation system 418E may store the sensor data in the memory 422E.

The communication unit 424E transmits and receives data to and from the network 402E or to another communication channel. In some embodiments, the communication unit 424E may include a dedicated short-range communication (DSRC) transceiver, a DSRC receiver, and other hardware or software necessary to make the vehicle 410E a DSRC-equipped device.

The vehicle 410E may interact with other vehicles 406E via V2V technology. V2V communication includes sensing radar information corresponding to relative distances to external objects, receiving GPS information of the vehicles, setting areas where the other vehicles 406E are located based on the sensed radar information, calculating probabilities that the GPS information of the object vehicles will be located at the set areas, and identifying vehicles and/or objects corresponding to the radar information and the GPS information of the object vehicles based on the calculated probabilities, in one example.

For a vehicle to be adequately secured, the vehicle must be protected from unauthorized physical access as well as unauthorized remote access (e.g., cyber-threats). To prevent unauthorized physical access, a vehicle is equipped with a secure access system such as a keyless entry in one example. Meanwhile, security protocols are added to a vehicle's computers and computer networks to facilitate secure remote communications to and from the vehicle in one example.

Electronic Control Units (ECUs) are nodes within a vehicle that control tasks such as activating the windshield wipers to tasks such as an anti-lock brake system. ECUs are often connected to one another through the vehicle's central network, which may be referred to as a controller area network (CAN). State-of-the-art features such as autonomous driving are strongly reliant on implementing new, complex ECUs such as advanced driver-assistance systems (ADAS), sensors, and the like. While these new technologies have helped improve the safety and driving experience of a vehicle, they have also increased the number of externally communicating units inside of the vehicle, making them more vulnerable to attack. Below are some examples of protecting the vehicle from physical intrusion and remote intrusion.

In one embodiment, a CAN includes a CAN bus with a high and low terminal and a plurality of electronic control units (ECUs), which are connected to the CAN bus via wired connections. The CAN bus is designed to allow microcontrollers and devices to communicate with each other in an application without a host computer. The CAN bus implements a message-based protocol (i.e., ISO 11898 standards) that allows ECUs to send commands to one another at a root level. Meanwhile, the ECUs represent controllers for controlling electrical systems or subsystems within the vehicle. Examples of the electrical systems include power steering, anti-lock brakes, air-conditioning, tire pressure monitoring, cruise control, and many other features.

In this example, the ECU includes a transceiver and a microcontroller. The transceiver may be used to transmit and receive messages to and from the CAN bus. For example, the transceiver may convert the data from the microcontroller into a format of the CAN bus and also convert data from the CAN bus into a format for the microcontroller. Meanwhile, the microcontroller interprets the messages and also decides what messages to send using ECU software installed therein in one example.

To protect the CAN from cyber threats, various security protocols may be implemented. For example, sub-networks (e.g., sub-networks A and B, etc.) may be used to divide the CAN into smaller sub-CANs and limit an attacker's capabilities to access the vehicle remotely. In one embodiment, a firewall (or gateway, etc.) may be added to block messages from crossing the CAN bus across sub-networks. If an attacker gains access to one sub-network, the attacker will not have access to the entire network. To make sub-networks even more secure, the most critical ECUs are not placed on the same sub-network, in one example.

In addition to protecting a vehicle's internal network, vehicles may also be protected when communicating with external networks such as the Internet. One of the benefits of having a vehicle connection to a data source such as the Internet is that information from the vehicle can be sent through a network to remote locations for analysis. Examples of vehicle information include GPS, onboard diagnostics, tire pressure, and the like. These communication systems are often referred to as telematics because they involve the combination of telecommunications and informatics. Further, the instant solution as described and depicted can be utilized in this and other networks and/or systems, including those that are described and depicted herein.

Figure 4E:
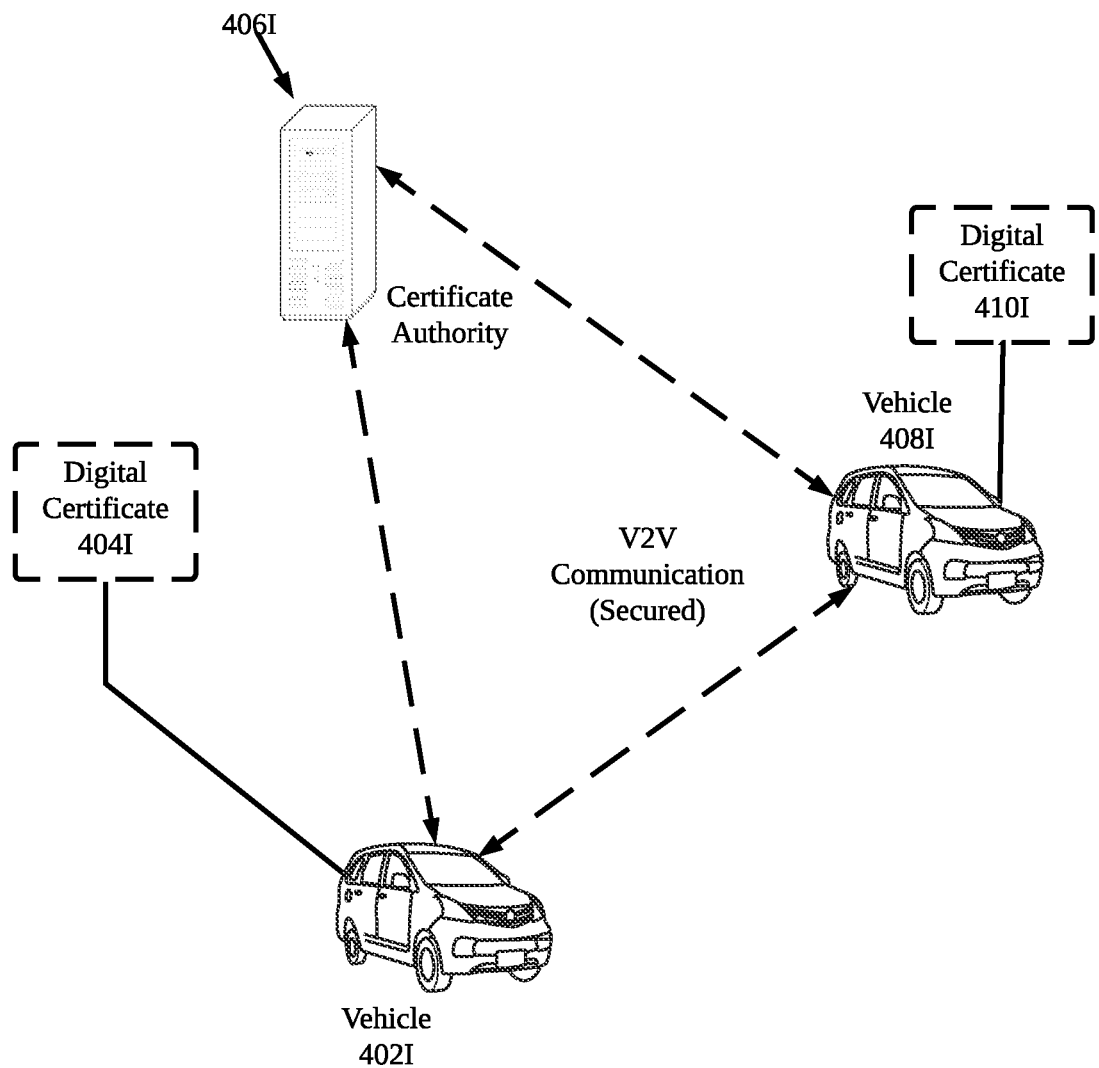
FIG. 4E illustrates yet a further diagram depicting an example of vehicles performing secured V2V communications using security certificates, according to example embodiments.

FIG. 4E illustrates an example 400E of vehicles 402I and 408I performing secured V2V communications using security certificates, according to example embodiments. Referring to FIG. 4E, the vehicles 402I and 408I may communicate via V2V communications over a short-range network, a cellular network, or the like. Before sending messages, the vehicles 402I and 408I may sign the messages using a respective public key certificate. For example, the vehicle 402I may sign a V2V message using a public key certificate 404I. Likewise, the vehicle 408I may sign a V2V message using a public key certificate 410I. The public key certificates 404I and 410I are associated with the vehicles 402I and 408I, respectively, in one example.

Upon receiving the communications from each other, the vehicles may verify the signatures with a certificate authority 406I or the like. For example, the vehicle 408I may verify with the certificate authority 406I that the public key certificate 404I used by vehicle 402I to sign a V2V communication is authentic. If the vehicle 408I successfully verifies the public key certificate 404I, the vehicle knows that the data is from a legitimate source. Likewise, the vehicle 402I may verify with the certificate authority 406I that the public key certificate 410I used by the vehicle 408I to sign a V2V communication is authentic. Further, the instant solution as described and depicted with respect to FIG. 4E can be utilized in this and other networks and/or systems including those that are described and depicted herein.

In some embodiments, a computer may include a security processor. In particular, the security processor may perform authorization, authentication, cryptography (e.g., encryption), and the like, for data transmissions that are sent between ECUs and other devices on a CAN bus of a vehicle, and also data messages that are transmitted between different vehicles. The security processor may include an authorization module, an authentication module, and a cryptography module. The security processor may be implemented within the vehicle's computer and may communicate with other vehicle elements, for example, the ECUs/CAN network, wired and wireless devices such as wireless network interfaces, input ports, and the like. The security processor may ensure that data frames (e.g., CAN frames, etc.) that are transmitted internally within a vehicle (e.g., via the ECUs/CAN network) are secure. Likewise, the security processor can ensure that messages transmitted between different vehicles and devices attached or connected via a wire to the vehicle's computer are also secured.

For example, the authorization module may store passwords, usernames, PIN codes, biometric scans, and the like for different vehicle users. The authorization module may determine whether a user (or technician) has permission to access certain settings such as a vehicle's computer. In some embodiments, the authorization module may communicate with a network interface to download any necessary authorization information from an external server. When a user desires to make changes to the vehicle settings or modify technical details of the vehicle via a console or GUI within the vehicle or via an attached/connected device, the authorization module may require the user to verify themselves in some way before such settings are changed. For example, the authorization module may require a username, a password, a PIN code, a biometric scan, a predefined line drawing or gesture, and the like. In response, the authorization module may determine whether the user has the necessary permissions (access, etc.) being requested.

The authentication module may be used to authenticate internal communications between ECUs on the CAN network of the vehicle. As an example, the authentication module may provide information for authenticating communications between the ECUs. As an example, the authentication module may transmit a bit signature algorithm to the ECUs of the CAN network. The ECUs may use the bit signature algorithm to insert authentication bits into the CAN fields of the CAN frame. All ECUs on the CAN network typically receive each CAN frame. The bit signature algorithm may dynamically change the position, amount, etc., of authentication bits each time a new CAN frame is generated by one of the ECUs. The authentication module may also provide a list of ECUs that are exempt (safe list) and that do not need to use the authentication bits. The authentication module may communicate with a remote server to retrieve updates to the bit signature algorithm and the like.

The encryption module may store asymmetric key pairs to be used by the vehicle to communicate with other external user devices and vehicles. For example, the encryption module may provide a private key to be used by the vehicle to encrypt/decrypt communications, while the corresponding public key may be provided to other user devices and vehicles to enable the other devices to decrypt/encrypt the communications. The encryption module may communicate with a remote server to receive new keys, updates to keys, keys of new vehicles, users, etc., and the like. The encryption module may also transmit any updates to a local private/public key pair to the remote server.

Figure 5A:
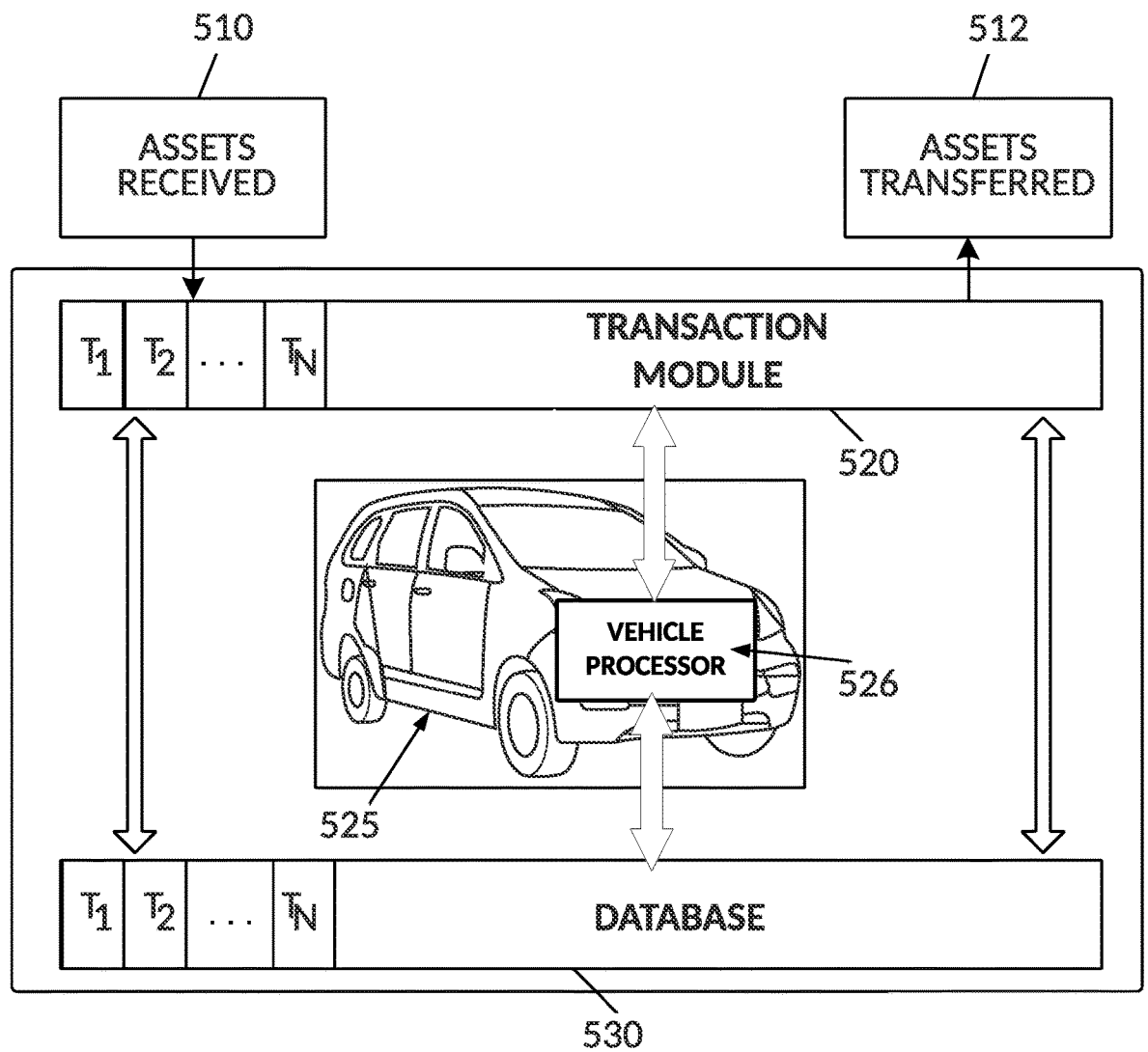
FIG. 5A illustrates an example vehicle configuration for managing database transactions associated with a vehicle, according to example embodiments.

FIG. 5A illustrates an example vehicle configuration 500A for managing database transactions associated with a vehicle, according to example embodiments. Referring to FIG. 5A, as a particular vehicle 525 is engaged in transactions (e.g., vehicle service, dealer transactions, delivery/pickup, transportation services, etc.), the vehicle may receive assets 510 and/or expel/transfer assets 512 according to a transaction(s). A vehicle processor 526 resides in the vehicle 525 and communication exists between the vehicle processor 526, a database 530, and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, a relational database management system (RDBMS), a relational database, a non-relational database, a blockchain, a distributed ledger, and may be on board the vehicle, may be off-board the vehicle, may be accessed directly and/or through a network, or be accessible to the vehicle.

In one embodiment, a vehicle may engage with another vehicle to perform various actions such as to share, transfer, acquire service calls, etc. when the vehicle has reached a status where the services need to be shared with another vehicle. For example, the vehicle may be due for a battery charge and/or may have an issue with a tire and may be in route to pick up a package for delivery. A vehicle processor resides in the vehicle and communication exists between the vehicle processor, a first database, and a transaction module. The vehicle may notify another vehicle, which is in its network and which operates on its blockchain member service. A vehicle processor resides in the other vehicle and communication exists between the vehicle processor, a second database, the vehicle processor, and a transaction module. The other vehicle may then receive the information via a wireless communication request to perform the package pickup from the vehicle and/or from a server (not shown). The transactions are logged in the transaction modules and of both vehicles. The credits are transferred from vehicle to the other vehicle and the record of the transferred service is logged in the first database, assuming that the blockchains are different from one another, or are logged in the same blockchain used by all members. The first database can be one of a SQL database, an RDBMS, a relational database, a non-relational database, a blockchain, a distributed ledger, and may be on board the vehicle, may be off-board the vehicle, may be accessible directly and/or through a network.

Figure 5B:
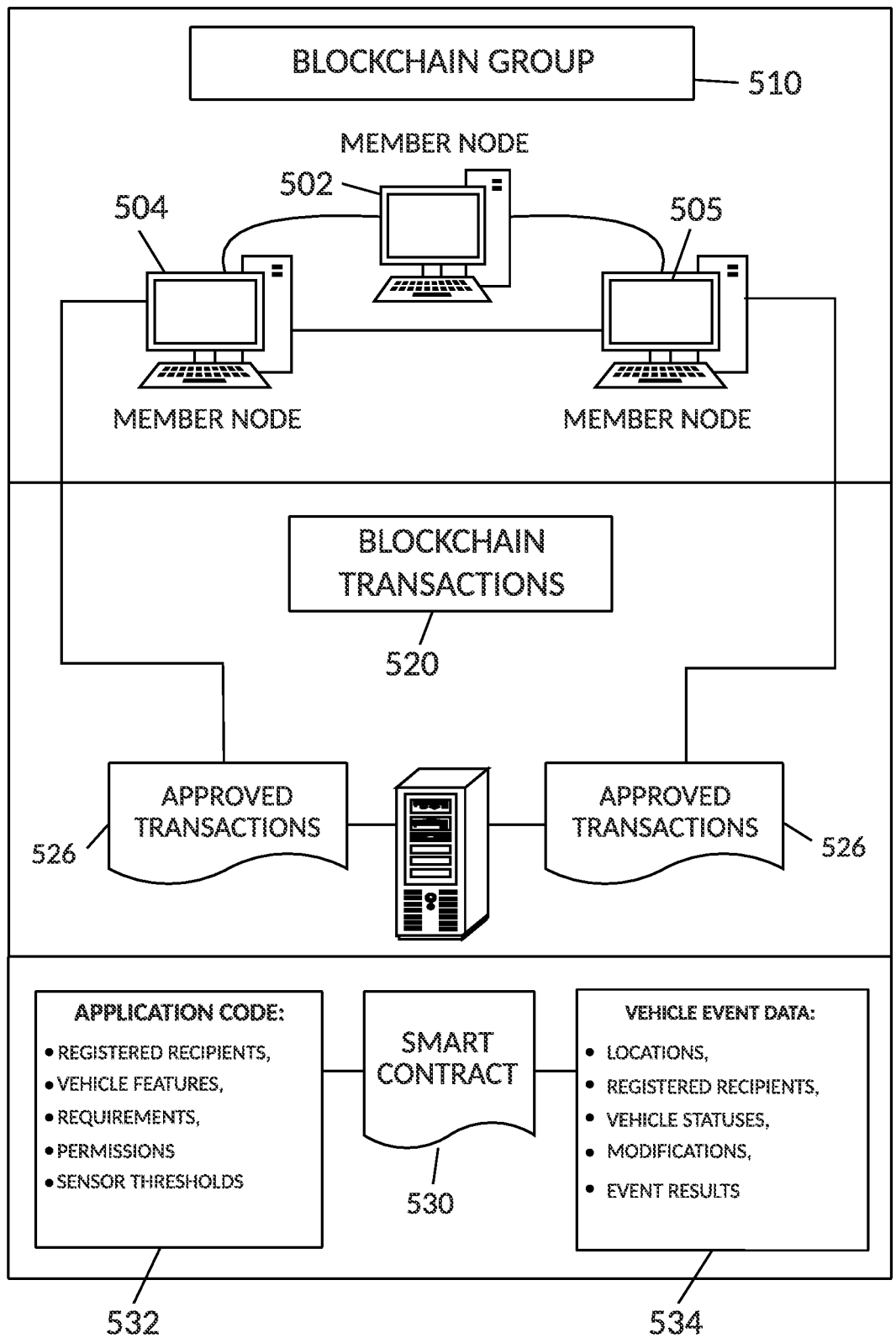
FIG. 5B illustrates an example blockchain group, according to example embodiments.

FIG. 5B illustrates a blockchain architecture configuration 500B, according to example embodiments. Referring to FIG. 5B, the blockchain architecture 500B may include certain blockchain elements, for example, a group of blockchain member nodes 502-505 as part of a blockchain group 510. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 520 are stored in memory of computers as the transactions are received and approved by the consensus model dictated by the members' nodes. Approved transactions 526 are stored in current blocks of the blockchain and committed to the blockchain via a committal procedure, which includes performing a hash of the data contents of the transactions in a current block and referencing a previous hash of a previous block. Within the blockchain, one or more smart contracts 530 may exist that define the terms of transaction agreements and actions included in smart contract executable application code 532, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 534, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 530, which are then stored in a blockchain. For example, sensor thresholds stored in the smart contract can be used as the basis for whether a detected service is necessary and when and where the service should be performed.

In one embodiment, a blockchain logic example includes a blockchain application interface as an API or plug-in application that links to the computing device and execution platform for a particular transaction. The blockchain configuration may include one or more applications, which are linked to application programming interfaces (APIs) to access and execute stored program/application code (e.g., smart contract executable code, smart contracts, etc.), which can be created according to a customized configuration sought by participants and can maintain their own state, control their own assets, and receive external information. This can be deployed as an entry and installed, via appending to the distributed ledger, on all blockchain nodes.

The smart contract application code provides a basis for the blockchain transactions by establishing application code, which when executed causes the transaction terms and conditions to become active. The smart contract, when executed, causes certain approved transactions to be generated, which are then forwarded to the blockchain platform. The platform includes a security/authorization, computing devices, which execute the transaction management and a storage portion as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors, which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 5A and 5B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code that is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 5C:
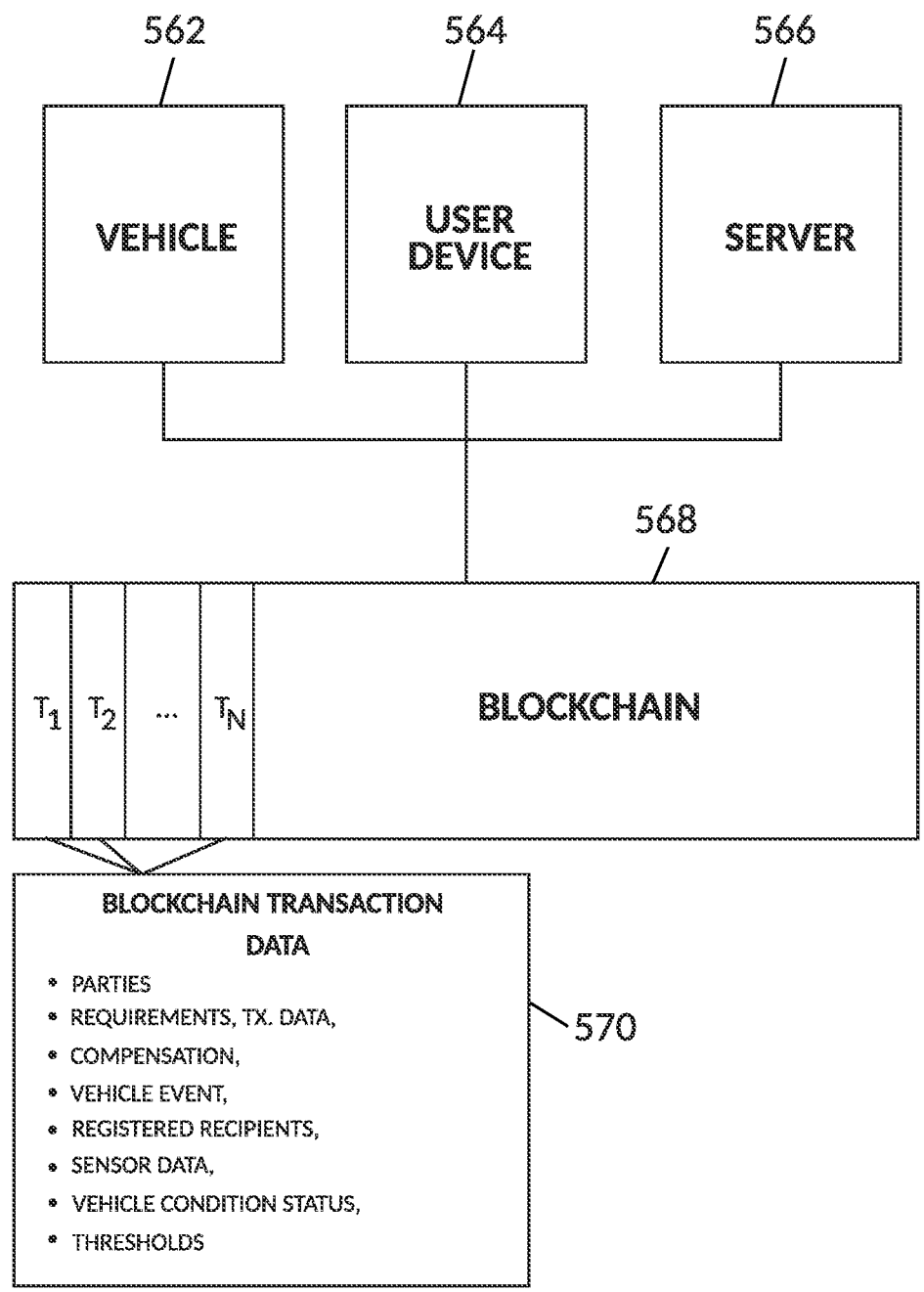
FIG. 5C illustrates an example interaction between elements and a blockchain, according to example embodiments.

FIG. 5C illustrates a blockchain configuration for storing blockchain transaction data, according to example embodiments. Referring to FIG. 5C, the example configuration 500C provides for the vehicle 562, the user device 564 and a server 566 sharing information with a distributed ledger (i.e., blockchain) 568. The server may represent a service provider entity inquiring with a vehicle service provider to share user profile rating information in the event that a known and established user profile is attempting to rent a vehicle with an established rated profile. The server 566 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 570 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 5D:
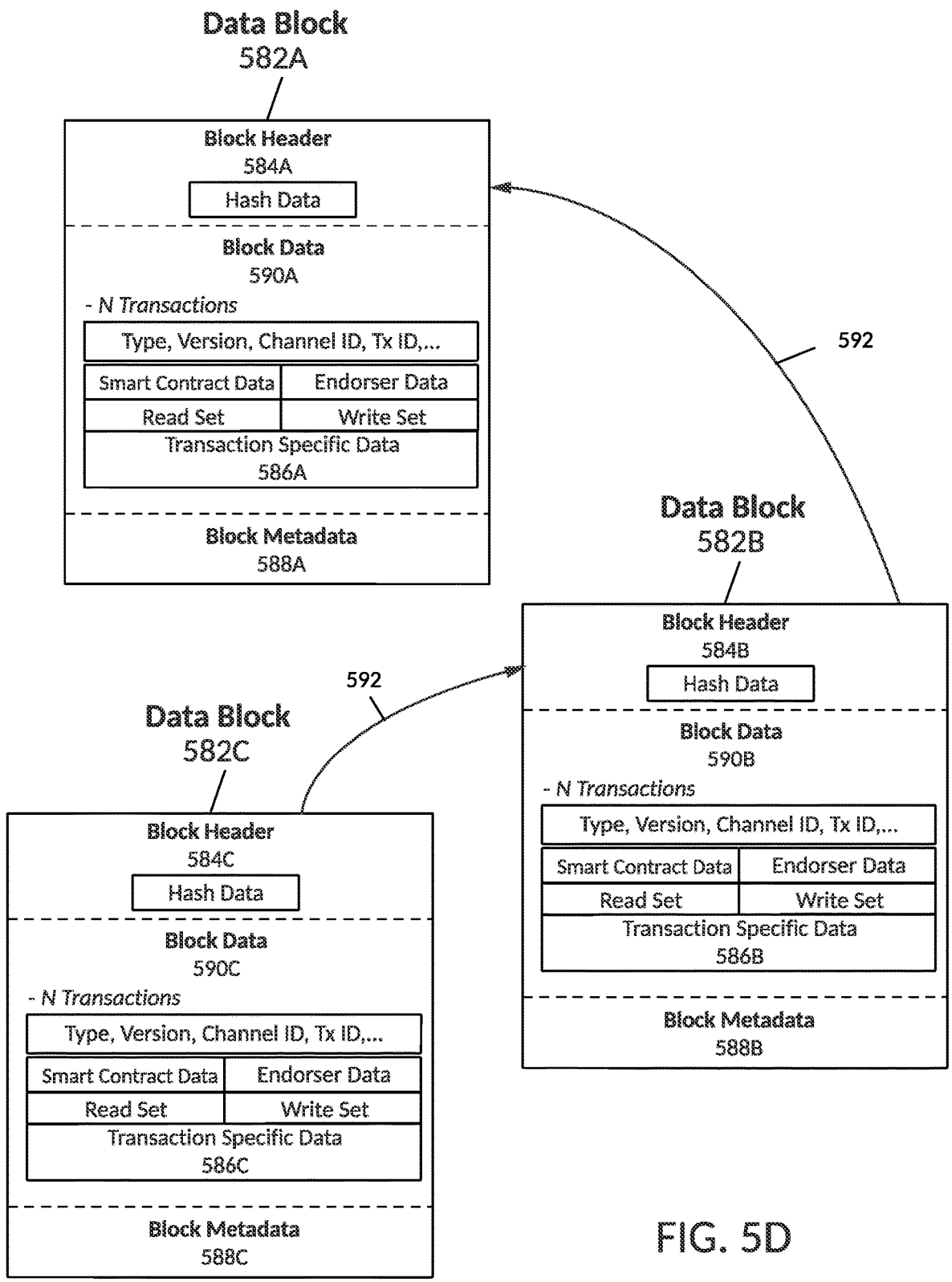
FIG. 5D illustrates an example data block interaction, according to example embodiments.

FIG. 5D illustrates blockchain blocks that can be added to a distributed ledger, according to example embodiments, and contents of block structures 582A to 582n. Referring to FIG. 5D, clients (not shown) may submit entries to blockchain nodes to enact activity on the blockchain. As an example, clients may be applications that act on behalf of a requester, such as a device, person, or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain that stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 5D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup before entries are accepted.

Endorsing nodes receive entries from clients and endorse the entry based on simulated results. Endorsing nodes hold smart contracts, which simulate the entry proposals. When an endorsing node endorses an entry, the endorsing nodes creates an entry endorsement, which is a signed response from the endorsing node to the client application indicating the endorsement of the simulated entry. The method of endorsing an entry depends on an endorsement policy that may be specified within smart contract executable code. An example of an endorsement policy is "the majority of endorsing peers must endorse the entry." Different channels may have different endorsement policies. Endorsed entries are forwarded by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 582A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' becomes a plug-gable component.

Entries are written to the distributed ledger in a consistent order. The order of entries is established to ensure that the updates to the state database are valid when they are committed to the network. Unlike a cryptocurrency blockchain system where ordering occurs through the solving of a cryptographic puzzle, or mining, in this example the parties of the distributed ledger may choose the ordering mechanism that best suits that network.

Referring to FIG. 5D, a block 582A (also referred to as a data block) that is stored on the blockchain and/or the distributed ledger may include multiple data segments such as a block header 584A to 584n, transaction-specific data 586A to 586n, and block metadata 588A to 588n. It should be appreciated that the various depicted blocks and their contents, such as block 582A and its contents are merely for purposes of an example and are not meant to limit the scope of the example embodiments. In some cases, both the block header 584A and the block metadata 588A may be smaller than the transaction-specific data 586A, which stores entry data; however, this is not a requirement. The block 582A may store transactional information of N entries (e.g., 100, 500, 1000, 2000, 3000, etc.) within the block data 590A to 590n. The block 582A may also include a link to a previous block (e.g., on the blockchain) within the block header 584A. In particular, the block header 584A may include a hash of a previous block's header. The block header 584A may also include a unique block number, a hash of the block data 590A of the current block 582A, and the like. The block number of the block 582A may be unique and assigned in an incremental/sequential order starting from zero. The first block in the blockchain may be referred to as a genesis block, which includes information about the blockchain, its members, the data stored therein, etc.

The block data 590A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 590A may also store transaction-specific data 586A, which adds additional information to the hash-linked chain of blocks in the blockchain. Accordingly, the data 586A can be stored in an immutable log of blocks on the distributed ledger. Some of the benefits of storing such data 586A are reflected in the various embodiments disclosed and depicted herein. The block metadata 588A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data and a validation code identifying whether an entry was valid/invalid.

The other blocks 582B to 582n in the blockchain also have headers, files, and values. However, unlike the first block 582A, each of the headers 584A to 584n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 592, to establish an auditable and immutable chain-of-custody.

Figure 5E:
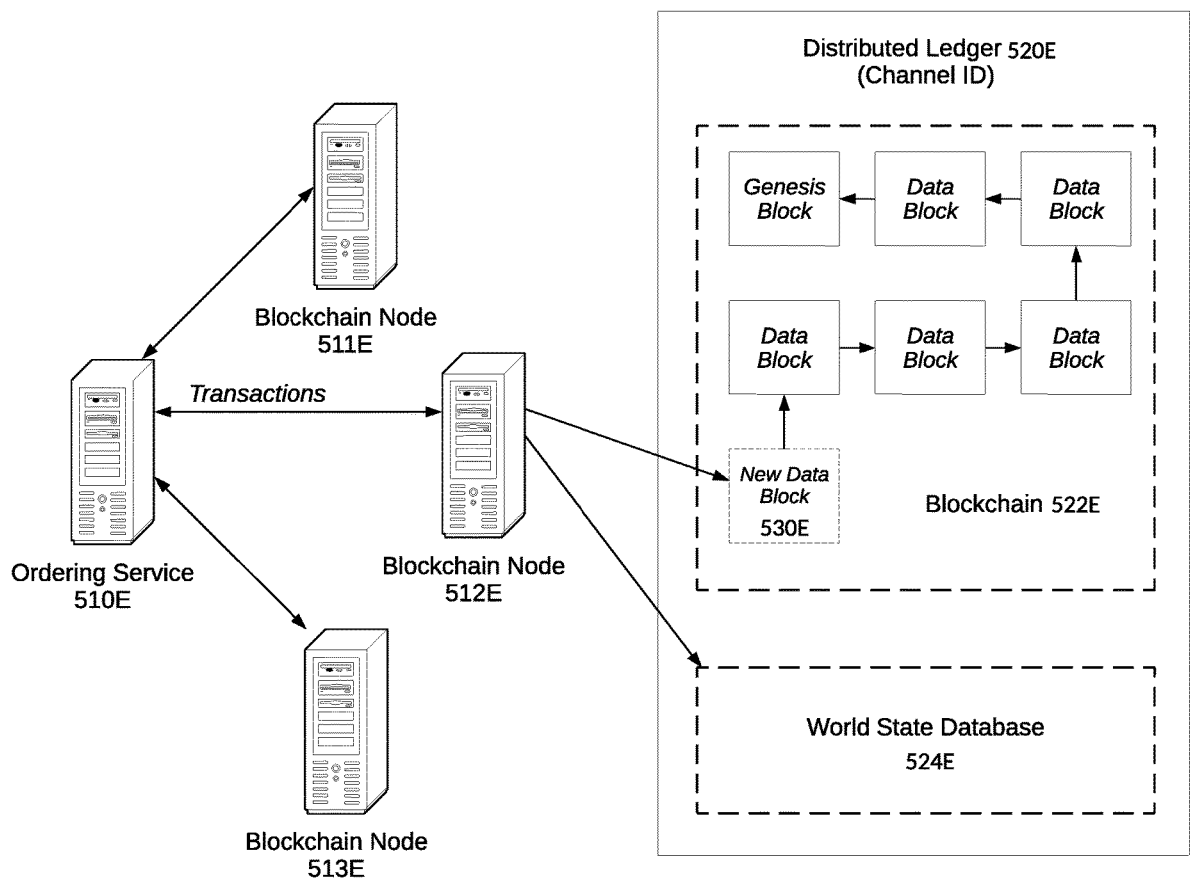
FIG. 5E illustrates a blockchain network diagram, according to example embodiments.

FIG. 5E illustrates a process 500E of a new block being added to a distributed ledger 520E, according to example embodiments, and FIG. 5D illustrates the contents of FIG. 5E's new data block structure 530E for blockchain, according to example embodiments. Referring to FIG. 5E, clients (not shown) may submit transactions to blockchain nodes 511E, 512E, and/or 513E. Clients may be instructions received from any source to enact activity on the blockchain 522E. As an example, clients may be applications that act on behalf of a requester, such as a device, person, or entity to propose transactions for the blockchain. The plurality of blockchain peers (e.g., blockchain nodes 511E, 512E, and 513E) may maintain a state of the blockchain network and a copy of the distributed ledger 520E. Different types of blockchain nodes/peers may be present in the blockchain network including endorsing peers which simulate and endorse transactions proposed by clients and committing peers which verify endorsements, validate transactions, and commit transactions to the distributed ledger 520. In this example, the blockchain nodes 511E, 512E, and 513E may perform the role of endorser node, committer node, or both.

The distributed ledger 520E includes a blockchain which stores immutable, sequenced records in blocks, and a state database 524E (current world state) maintaining a current state of the blockchain 522E. One distributed ledger 520E may exist per channel and each peer maintains its own copy of the distributed ledger 520E for each channel of which they are a member. The blockchain 522E is a transaction log, structured as hash-linked blocks where each block contains a sequence of N transactions. The linking of the blocks (shown by arrows in FIG. 5E) may be generated by adding a hash of a prior block's header within a block header of a current block. In this way, all transactions on the blockchain 522E are sequenced and cryptographically linked together preventing tampering with blockchain data without breaking the hash links. Furthermore, because of the links, the latest block in the blockchain 522E represents every transaction that has come before it. The blockchain 522E may be stored on a peer file system (local or attached storage), which supports an append-only blockchain workload.

The current state of the blockchain 522E and the distributed ledger 522E may be stored in the state database 524E. Here, the current state data represents the latest values for all keys ever included in the chain transaction log of the blockchain 522E. Chaincode invocations execute transactions against the current state in the state database 524E. To make these chaincode interactions extremely efficient, the latest values of all keys are stored in the state database 524E. The state database 524E may include an indexed view into the transaction log of the blockchain 522E, it can therefore be regenerated from the chain at any time. The state database 524E may automatically get recovered (or generated if needed) upon peer startup before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to the ordering service 510E.

The ordering service 510E accepts endorsed transactions, orders them into a block, and delivers the blocks to the committing peers. For example, the ordering service 510E may initiate a new block when a threshold of transactions has been reached, a timer times out, or another condition. In the example of FIG. 5E, blockchain node 512E is a committing peer that has received a new data block 530E for storage on blockchain 522E. The first block in the blockchain may be referred to as a genesis block which includes information about the blockchain, its members, the data stored therein, etc.

The ordering service 510E may be made up of a cluster of orderers. The ordering service 510E does not process transactions, smart contracts, or maintain the shared ledger. Rather, the ordering service 510E may accept the endorsed transactions and specifies the order in which those transactions are committed to the distributed ledger 520E. The architecture of the blockchain network may be designed such that the specific implementation of 'ordering' becomes a pluggable component.

Transactions are written to the distributed ledger 520E in a consistent order. The order of transactions is established to ensure that the updates to the state database 524E are valid when they are committed to the network. Unlike a cryptocurrency blockchain system where ordering occurs through the solving of a cryptographic puzzle, or mining, in this example the parties of the distributed ledger 520E may choose the ordering mechanism that best suits the network.

When the ordering service 510E initializes a new data block 530E, the new data block 530E may be broadcast to committing peers (e.g., blockchain nodes 511E, 512E, and 513E). In response, each committing peer validates the transaction within the new data block 530E by checking to make sure that the read set and the write set still match the current world state in the state database 524E. Specifically, the committing peer can determine whether the read data that existed when the endorsers simulated the transaction is identical to the current world state in the state database 524E. When the committing peer validates the transaction, the transaction is written to the blockchain 522E on the distributed ledger 520E, and the state database 524E is updated with the write data from the read-write set. If a transaction fails, that is, if the committing peer finds that the read-write set does not match the current world state in the state database 524E, the transaction ordered into a block will still be included in that block, but it will be marked as invalid, and the state database 524E will not be updated.

Figure 5F:
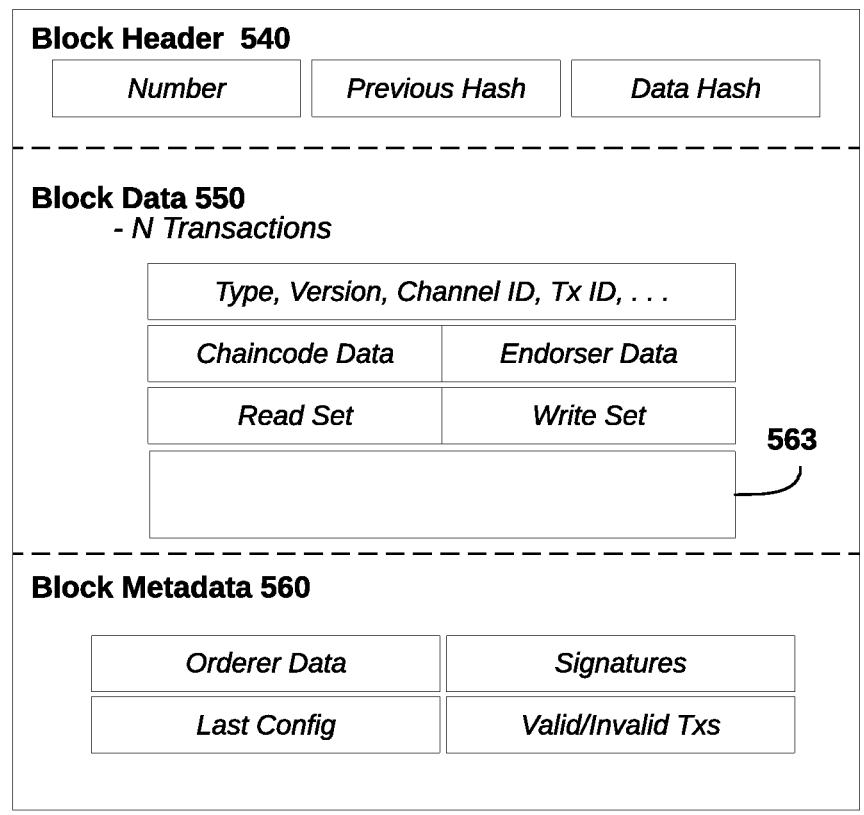
FIG. 5F illustrates an example new data block, according to example embodiments.

Referring to FIG. 5F 500F, a new data block 530 (also referred to as a data block) that is stored on the blockchain 522E of the distributed ledger 520E, shown in FIG. 5E, may include multiple data segments such as a block header 540, block data 550, and block metadata 560. It should be appreciated that the various depicted blocks and their contents, such as new data block 530 and its contents shown in FIG. 5F are merely examples and are not meant to limit the scope of the example embodiments. The new data block 530 may store transactional information of N transaction(s) (e.g., 1, 10, 100, 500, 1000, 2000, 3000, etc.) within the block data 550. The new data block 530 may also include a link to a previous block (e.g., on the blockchain 522E in FIG. 5E) within the block header 540. In particular, the block header 540 may include a hash of a previous block's header. The block header 540 may also include a unique block number, a hash of the block data 550 of the new data block 530, and the like. The block number of the new data block 530 may be unique and assigned in various orders, such as an incremental/sequential order starting from zero.

The block data 550 may store transactional information of each transaction that is recorded within the new data block 530. For example, the transaction data may include one or more of a type of the transaction, a version, a timestamp, a channel ID of the distributed ledger 520E (shown in FIG. 5E), a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In one embodiment of the instant solution, the block data 564 may include data comprising one or more of determining at least one available charging point at a charging station at an arrival time of a vehicle; and reserving the charging point for the vehicle at the arrival time when another charging point at the charging station will be available for another vehicle in a time less than a threshold after the arrival time.

Although in FIG. 5F the blockchain data 563 is depicted in the block data 550 but may also be located in the block header 540 or the block metadata 560.

The block metadata 560 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 510E in FIG. 5E. Meanwhile, a committer of the block (such as blockchain node 512E in FIG. 5E) may add validity/invalidity information based on an endorsement policy, verification of read/write sets, and the like. The transaction filter may include a byte array of a size equal to the number of transactions in the block data and a validation code identifying whether a transaction was valid/invalid.

The above embodiments may be implemented in hardware, in a computer program executed by a processor, in firmware, or in a combination of the above. A computer program may be embodied on a computer readable media, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
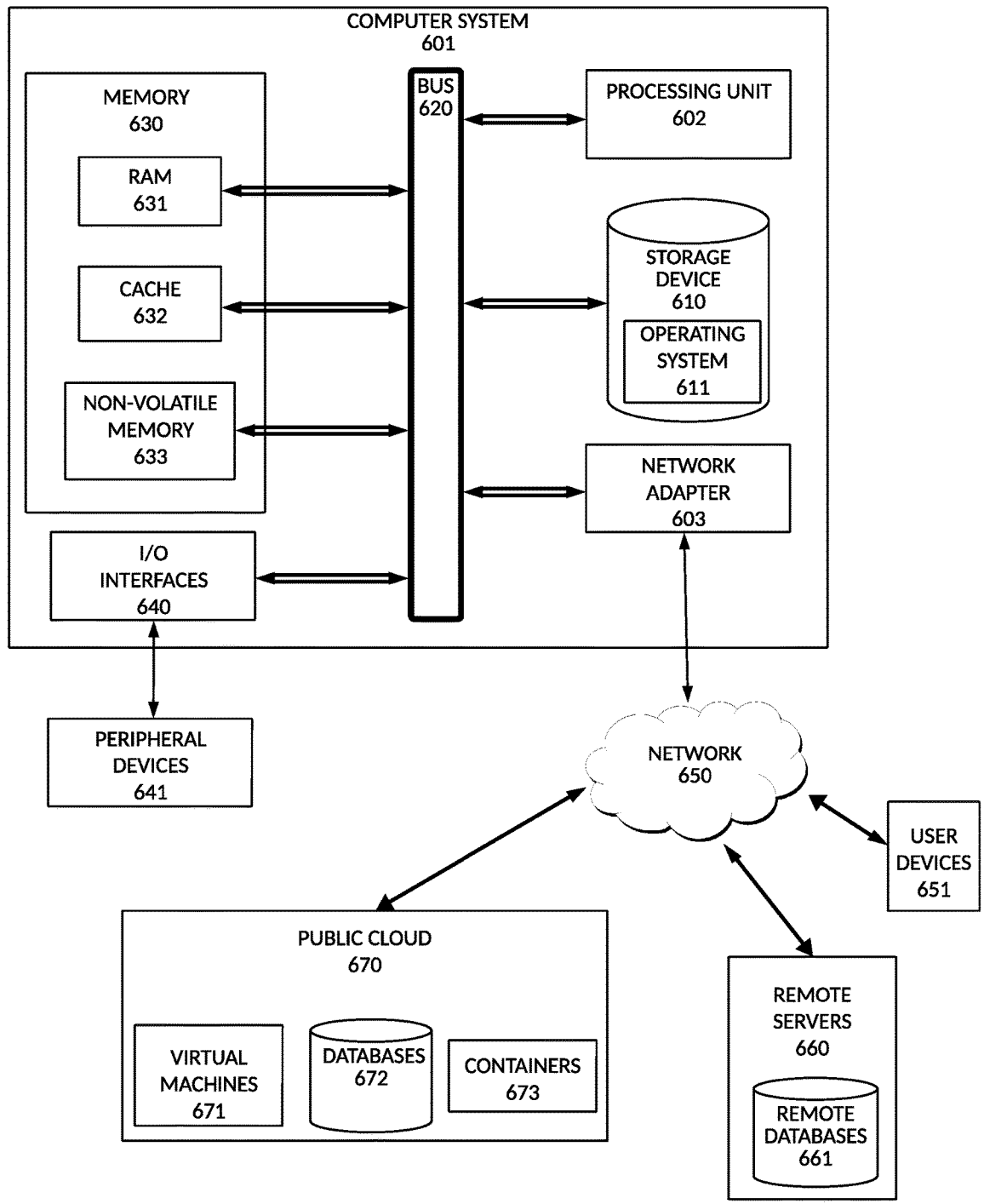
FIG. 6 illustrates an example system that supports one or more of the example embodiments.

FIG. 6 illustrates a computing environment according to example embodiments. FIG. 6 is not intended to suggest any limitation as to the scope of use or functionality of embodiments of the application described herein. Regardless, the computing environment 600 can be implemented to perform any of the functionalities described herein. In computer environment 600, computer system 601 is operational within numerous other general-purpose or special-purpose computing system environments or configurations.

Computer system 601 may take the form of a desktop computer, laptop computer, tablet computer, smartphone, smartwatch or other wearable computer, server computer system, thin client, thick client, network PC, minicomputer system, mainframe computer, quantum computer, and distributed cloud computing environment that include any of the described systems or devices, and the like or any other form of computer or mobile device now known or to be developed in the future that is capable of running a program, accessing a network 650 or querying a database. Depending upon the technology, the performance of a computer-implemented method may be distributed among multiple computers and between multiple locations. However, in this presentation of the computing environment 600, a detailed discussion is focused on a single computer, specifically computer system 601, to keep the presentation as simple as possible.

Computer system 601 may be located in a cloud, even though it is not shown in a cloud in FIG. 6. On the other hand, computer system 601 is not required to be in a cloud except to any extent as may be affirmatively indicated. Computer system 601 may be described in the general context of computer system-executable instructions, such as program modules, executed by a computer system 601. Generally, program modules may include routines, programs, objects, components, logic, data structures, and so on that perform tasks or implement certain abstract data types. As shown in FIG. 6, computer system 601 in computing environment 600 is shown in the form of a general-purpose computing device. The components of computer system 601 may include but are not limited to, one or more processors or processing units 602, a system memory 630, and a bus 620 that couples various system components, including system memory 630 to processor 602.

Processing unit 602 includes one or more computer processors of any type now known or to be developed. The processing unit 602 may contain circuitry distributed over multiple integrated circuit chips. The processing unit 602 may also implement multiple processor threads and multiple processor cores. Cache 632 is a memory that may be in the processor chip package(s) or located "off-chip," as depicted in FIG. 6. Cache 632 is typically used for data or code that the threads or cores running on the processing unit 602 should be available for rapid access. In some computing environments, processing unit 602 may be designed to work with qubits and perform quantum computing.

Network adapter 603 enables the computer system 601 to connect and communicate with one or more networks 650, such as a local area network (LAN), a wide area network (WAN), and/or a public network (e.g., the Internet). It bridges the computer's internal bus 620 and the external network, exchanging data efficiently and reliably. The network adapter 603 may include hardware, such as modems or Wi-Fi signal transceivers, and software for packetizing and/or de-packetizing data for communication network transmission. Network adapter 603 supports various communication protocols to ensure compatibility with network standards. For Ethernet connections, it adheres to protocols such as IEEE 802.3, while for wireless communications, it might support IEEE 802.11 standards, Bluetooth, near-field communication (NFC), or other network wireless radio standards.

Computer system 601 may include a removable/non-removable, volatile/non-volatile computer storage device 610. By way of example only, storage device 610 can be a non-removable, non-volatile magnetic media (not shown and typically called a "hard drive"). One or more data interfaces can connect it to the bus 620. In embodiments where computer system 601 is required to have a large amount of storage (for example, where computer system 601 locally stores and manages a large database), then this storage may be provided by peripheral storage devices 610 designed for storing very large amounts of data, such as a storage area network (SAN) that is shared by multiple, geographically distributed computers.

The operating system 611 is software that manages computer system 601 hardware resources and provides common services for computer programs. Operating system 611 may take several forms, such as various known proprietary operating systems or open-source Portable Operating System Interface type operating systems that employ a kernel.

The Bus 620 represents one or more of several types of bus structures, including a memory bus or memory controller, a peripheral bus, an accelerated graphics port, and a processor or local bus using various bus architectures. By way of example, and not limitation, such architectures include Industry Standard Architecture (ISA) buses, Micro Channel Architecture (MCA) buses, Enhanced ISA (EISA) buses, Video Electronics Standards Association (VESA) local buses, and Peripheral Component Interconnects (PCI) bus. The bus 620 is the signal conduction paths that allow the various components of computer system 601 to communicate with each other.

Memory 630 is any volatile memory now known or to be developed in the future. Examples include dynamic random-access memory (RAM 631) or static type RAM 631. Typically, the volatile memory is characterized by random access, but this is not required unless affirmatively indicated. In computer system 601, memory 630 is in a single package and is internal to computer system 601, but alternatively or additionally, the volatile memory may be distributed over multiple packages and/or located externally with respect to computer system 601. By way of example only, memory 630 can be provided for reading from and writing to a non-removable, non-volatile magnetic media (shown as storage device 610, and typically called a "hard drive"). Memory 630 may include at least one program product having a set (e.g., at least one) of program modules configured to carry out various functions. A typical computer system 601 may include cache 632, a specialized volatile memory generally faster than RAM 631 and generally located closer to the processing unit 602. Cache 632 stores frequently accessed data and instructions accessed by the processing unit 602 to speed up processing time. The computer system 601 may include non-volatile memory 633 in ROM, PROM, EEPROM, and flash memory. Non-volatile memory 633 often contains programming instructions for starting the computer, including the BIOS and information required to start the operating system 611.

Computer system 601 may also communicate with one or more peripheral devices 641 via an I/O interface 640. Such devices may include a keyboard, a pointing device, a display, etc.; one or more devices that enable a user to interact with computer system 601; and/or any devices (e.g., network card, modem, etc.) that enable computer system 601 to communicate with one or more other computing devices. Such communication can occur via input/output (I/O) interfaces 640. As depicted, IO interface 640 communicates with the other components of computer system 601 via bus 620.

Network 650 is any computer network that can receive and/or transmit data. Network 650 can include a WAN, LAN, private cloud, or public Internet, capable of communicating computer data over non-local distances by any technology that is now known or to be developed in the future. Any connection depicted can be wired and/or wireless and may traverse other components that are not shown. In some embodiments, a network 650 may be replaced and/or supplemented by LANs designed to communicate data between devices located in a local area, such as a Wi-Fi network. The network 650 typically includes computer hardware such as copper transmission cables, optical transmission fibers, wireless transmission, routers, firewalls, switches, gateway computers, and edge servers. Computer system 601 connects to network 650 via network adapter 603 and bus 620.

User devices 651 are any computer systems used and controlled by an end user in connection with computer system 601. For example, in a hypothetical case where computer system 601 is designed to provide a recommendation to an end user, this recommendation may typically be communicated from network adapter 603 of computer system 601 through network 650 to a user device 651, allowing user device 651 to display, or otherwise present, the recommendation to an end user. User devices can be a wide array of devices, including PCs, laptops, tablet, hand-held, mobile phones, etc.

Remote Servers 660 are any computers that serve at least some data and/or functionality over a network 650, for example, WAN, a virtual private network (VPN), a private cloud, or via the Internet to computer system 601. These networks 650 may communicate with a LAN to reach users. The user interface may include a web browser or an application that facilitates communication between the user and remote data. Such applications have been called "thin" desktops or "thin clients." Thin clients typically incorporate software programs to emulate desktop sessions, such as Microsoft RDP (Remote Desktop Protocol) or Citrix ICA (Independent Computing Architecture). Mobile applications can also be used. Remote servers 660 can also host remote databases 661, with the database located on one remote server 660 or distributed across multiple remote servers 660. Remote databases 661 are accessible from database client applications installed locally on the remote server 660, other remote servers 660, user devices 651, or computer system 601 across a network 650.

A Public Cloud 670 is an on-demand availability of computer system resources, including data storage and computing power, without direct active management by the user. Public clouds 670 are often distributed, with data centers in multiple locations for availability and performance. Computing resources on public clouds (670) are shared across multiple tenants through virtual computing environments comprising virtual machines 671, databases 672, containers 673, and other resources. A Container 673 is an isolated, lightweight software for running an application on the host operating system 611. Containers 673 are built on top of the host operating system's kernel and contain only apps and some lightweight operating system APIs and services. In contrast, virtual machine 671 is a software layer that includes a complete operating system 611 and kernel. Virtual machines 671 are built on top of a hypervisor emulation layer designed to abstract a host computer's hardware from the operating software environment. Public clouds 670 generally offer hosted databases 672 abstracting high-level database management activities. It should be further understood that one or more of the elements described or depicted in FIG. 6 can perform one or more of the actions, functionalities, or features described or depicted herein.

Although an exemplary embodiment of at least one of a system, method, and non-transitory computer readable media has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver, or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field-programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
receiving, via a charging station server, a reservation request from an electric vehicle (EV) which identifies a state of charge (SoC) of a battery in the EV, a desired charge level, and an estimated arrival time of the EV at a charging station;
receiving, via the charging station server, status information from a plurality of bays that are charging a plurality of other EVs:
determining, via the charging station server, a bay from among the plurality of bays that is available for charging the EV at the estimated arrival time based on the reservation request and the status information;
reserving, via the charging station server, the bay at the charging station for the EV at the estimated arrival time at the charging station;
transmitting, via the charging station server, a message to a graphical user interface (GUI) of a display system within the EV with an identifier of the bay:
occupying the bay by the EV;
transferring energy, via a charging point, to the EV at the bay to reach the desired charge level;
stopping, via the charging station server, an ability for the EV to receive energy when one or more of the following occurs:
an amount of time that a number of other EVs waiting to receive the energy at the charging station is greater than a threshold time;
the number of other EVs waiting to receive the energy at the charging station is greater than a threshold number of EVs;
the EV is receiving the energy for a time greater than the other EVs at the charging station; and
the SoC of a-the battery in the EV is greater than a SoC of batteries in the other EVs at the charging station.

2. The method of claim 1, comprising:
responsive to another bay at the charging station being available, notifying another EV to utilize the another bay at the charging station.

3. The method of claim 1, wherein the reserving is based on a prediction of at least one other EV arriving at the charging station before the estimated arrival time of the EV at the charging station.

4. The method of claim 1, comprising:
receiving telemetry data from the EV;
predicting an arrival time of the EV at the charging station based on execution of a machine learning model on the telemetry data; and
reserving the charging station based on the predicted arrival time.

5. The method of claim 1, comprising:
receiving age attributes of the battery of the EV from the EV; and
reserving the bay at the charging station based on the received age attributes of the battery of the EV.

6. The method of claim 1, wherein the reserving is based on an average of a time for all other EVs to receive energy at the charging station being equal to or less than the threshold time.

7. A system, comprising:
at least one processor; and
a memory,
wherein the at least one processor and the memory are communicably coupled, and wherein the at least one processor:
receives, via a charging station server, a reservation request from an electric vehicle (EV) which identifies a state of charge (SoC) of a battery in the EV, a desired charge level, and an estimated arrival time of the EV at a charging station;
receives, via the charging station server, status information from a plurality of bays that are charging a plurality of other EVs;
determines a bay from among the plurality of bays that is available for charging the EV at the estimated arrival time based on the reservation request and the status information;
reserves the bay at the charging station for a the EV at the estimated arrival time at the charging station
transmits a message to a graphical user interface (GUI) of a display system within the EV with an identifier of the bay and instructions to occupy the bay by the EV;
transfers energy, via a charging point, to the EV at the bay to reach the desired charge level; and
stops an ability for the EV to receive energy when one or more of the following occurs:
an amount of time that a number of other EVs waiting to receive the energy at the charging station is greater than a threshold time;
the number of other EVs waiting to receive the energy at the charging station is greater than a threshold number of EVs;
the EV receives the energy for a time greater than the other EVs at the charging station; and
the SoC of a-the battery in the EV is greater than a SoC of batteries in the other EVs at the charging station.

8. The system of claim 7, wherein the at least one processor:
responsive to another bay at the charging station being available, notifies another EV to utilize the another bay at the charging station.

9. The system of claim 7, wherein the reservation is based on a prediction of at least one other EV arriving at the charging station before the estimated arrival time of the EV at the charging station.

10. The system of claim 7, wherein the at least one processor:
- receives telemetry data from the EV;
- predicts an arrival time of the EV at the charging station based on execution of a machine learning model on the telemetry data; and
- reserves the charging station based on the predicted arrival time.

11. The system of claim 7, wherein the at least one processor:
- receives age attributes of the battery of the EV from the EV; and
- reserve the bay at the charging station based on the received age attributes of the battery of the EV.

12. The system of claim 7, wherein the reservation is based on an average of a time for all other EVs to receive energy at the charging station being equal to or less than the threshold time.

13. A non-transitory computer readable storage medium comprising instructions, that when read by a processor, cause the processor to perform:
- receiving, via a charging station server, a reservation request from an electric vehicle (EV) which identifies a state of charge (SoC) of a battery in the EV, a desired charge level, and an estimated arrival time of the EV at a charging station;
- receiving, via the charging station server, status information from a plurality of bays that are charging a plurality of other EVs:
- determining a bay from among the plurality of bays that is available for charging the EV at the estimated arrival time based on the reservation request and the status information;
- reserving the bay at the charging station for the EV at the estimated arrival time at the charging station;
- transmitting a message to a graphical user interface (GUI) of a display system within the EV with an identifier of the bay and instructions to occupy the bay by the EV;
- transferring energy, via a charging point, to the EV at the bay to reach the desired charge level; and
- stopping an ability for the EV to receive energy when one or more of the following occurs:
  - an amount of time that a number of other EVs waiting to receive the energy at the charging station is greater than a threshold time;
  - the number of other EVs waiting to receive the energy at the charging station is greater than a threshold number of EVs;
  - the EV is receiving the energy for a time greater than the other EVs at the charging station; and
  - the SoC of a-the battery in the EV is greater than a SoC of batteries in the other EVs at the charging station.

14. The non-transitory computer readable storage medium of claim 13, wherein the processor performs:
- responsive to another bay at the charging station being available, notifying another EV to utilize the another bay at the charging station.

15. The non-transitory computer readable storage medium of claim 13, wherein the reserving is based on a prediction of at least one other EV arriving at the charging station before the estimated arrival time of the EV at the charging station.

16. The non-transitory computer readable storage medium of claim 13, wherein the processor performs:
- receiving telemetry data from the EV;
- predicting an arrival time of the EV at the charging station based on execution of a machine learning model on the telemetry data; and
- reserving the charging station based on the predicted arrival time.

17. The non-transitory computer readable storage medium of claim 13, wherein the processor performs:
- receiving age attributes of the battery of the EV from the EV; and
- reserving the bay at the charging station based on the received age attributes of the battery of the EV.

18. The non-transitory computer readable storage medium of claim 13,
- wherein the reserving is based on an average of a time for all other EVs to receive energy at the charging station being equal to or less than the threshold time.

* * * * *